US012490908B2

(12) United States Patent
Wang et al.

(10) Patent No.: US 12,490,908 B2
(45) Date of Patent: Dec. 9, 2025

(54) INTEGRATED CHEMICAL/ULTRASONIC TRANSDUCER SENSOR

(71) Applicant: The Regents of the University of California, Oakland, CA (US)

(72) Inventors: Joseph Wang, La Jolla, CA (US); Sheng Xu, La Jolla, CA (US); Juliane Renata Sempionatto-Moreto, La Jolla, CA (US); Lu Yin, La Jolla, CA (US); Muyang Lin, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 867 days.

(21) Appl. No.: 17/506,263

(22) Filed: Oct. 20, 2021

(65) Prior Publication Data

US 2022/0117503 A1  Apr. 21, 2022

Related U.S. Application Data

(60) Provisional application No. 63/094,169, filed on Oct. 20, 2020.

(51) Int. Cl.
*A61B 5/0205* (2006.01)
*A61B 5/00* (2006.01)
(Continued)

(52) U.S. Cl.
CPC ...... *A61B 5/02055* (2013.01); *A61B 5/02133* (2013.01); *A61B 5/026* (2013.01);
(Continued)

(58) Field of Classification Search
CPC . A61B 5/02055; A61B 5/02133; A61B 5/026; A61B 5/14521; A61B 5/14532;
(Continued)

(56) References Cited

U.S. PATENT DOCUMENTS 9,820,692 B2  11/2017  Wang et al.
2014/0303452 A1*  10/2014  Ghaffari ............ H01L 27/14687
601/3

(Continued)

FOREIGN PATENT DOCUMENTS

WO  2018/132443 A1  7/2018

OTHER PUBLICATIONS

Arndt, J. O., et al.; "The diameter of the intact carotid artery in man and its change with pulse pressure" Pflugers Arch. Gesamte Physiol. Menschen Tiere, 301, 230-240 (1968).
(Continued)

*Primary Examiner* — Carl H Layno
*Assistant Examiner* — Aya Ziad Bakkar
(74) *Attorney, Agent, or Firm* — Perkins Coie LLP

(57) ABSTRACT

Disclosed are devices, systems, and methods for multimodal, wearable sensors, including an electrochemical-ultrasonic transducer-based sensor, that can simultaneously detect and monitor one or more bio-analyte markers and one or more physiological markers. In some aspects, a wearable, acoustic-electrochemical sensor device includes a flexible substrate, one or more electrochemical sensors disposed on the flexible substrate, a physiological sensor comprising an array of acoustic transducers disposed on the flexible substrate, wherein the sensor device is operable to simultaneously detect and monitor one or more analyte markers and physiological markers including hemodynamic parameters.

20 Claims, 60 Drawing Sheets

(51) Int. Cl.
  A61B 5/021   (2006.01)
  A61B 5/026   (2006.01)
  A61B 5/145   (2006.01)
  A61B 5/1477  (2006.01)
(52) U.S. Cl.
  CPC ...... *A61B 5/14521* (2013.01); *A61B 5/14532* (2013.01); *A61B 5/14546* (2013.01); *A61B 5/1477* (2013.01); *A61B 5/4845* (2013.01); *A61B 2562/0204* (2013.01); *A61B 2562/164* (2013.01)
(58) Field of Classification Search
  CPC . A61B 5/14546; A61B 5/1477; A61B 5/4845; A61B 2562/0204; A61B 2562/164
  See application file for complete search history.

(56) References Cited

U.S. PATENT DOCUMENTS

| | | | |
|---|---|---|---|
| 2017/0164876 A1* | 6/2017 | Hyde | A61B 5/1118 |
| 2017/0325724 A1 | 11/2017 | Wang et al. | |
| 2018/0220967 A1 | 8/2018 | Wang et al. | |
| 2018/0368743 A1* | 12/2018 | Lin | A61B 5/14532 |
| 2019/0150884 A1* | 5/2019 | Maharbiz | A61N 1/3605 |
| 2020/0008299 A1* | 1/2020 | Tran | H05K 1/0386 |

OTHER PUBLICATIONS

Asano, R. Y., et al. "Acute effects of physical exercise in type 2 diabetes: A review" World J. Diabetes 5, 659-665 (2014).
Bandodkar, A. J. et al. "Tattoo-based noninvasive glucose monitoring: a proof-of-concept study" Analytical Chemistry (2015) vol. 87, pp. 394-398.
Bruno, G., et al. "A smart wireless ear-worn device for cardiovascular and sweat parameter monitoring during physical exercise: design and performance results" Sensors 19.7, (2019). 17 pages.
Carter, J. R., et al. "Influence of acute alcohol ingestion on sympathetic neural responses to orthostatic stress in humans" Am. J. Physiol. Metab. 300, E771-E778 (2011).
Chen, L., et al. "Alcohol Intake and Blood Pressure: A Systematic Review Implementing a Mendelian Randomization Approach" PLoS Med. 5, e52 (2008) 462-471.
Cheung, B. et al. "Diabetes and Hypertension: Is There a Common Metabolic Pathway?" Curr. Atheroscler. Rep. 14, 160-166 (2012).
Chung, H. U., et al. "Binodal, wireless epidermal electronic systems with in-sensor analytics for neonatal intensive care" Science, 363, (2019) 14 pages.
Çinar, Y. "Blood viscosity and blood pressure: role of temperature and hyperglycemia" Am. J. Hypertens. 14, 433-438 (2001).
Ciui, B. et al. "Chemical Sensing at the Robot Fingertips: Toward Automated Taste Discrimination in Food Samples" ACS Sensors, 3, 2375-2380 (2018).
Crisafulli, A. et al. "Effect of differences in post-exercise lactate accumulation in athletes' haemodynamics" Appl. Physiol. Nutr. Metab. 31, 423-431 (2006).
Dagdeviren, C. et al. "Conformable amplified lead zirconate titanate sensors with enhanced piezoelectric response for cutaneous pressure monitoring" Nat. Commun. 5, (2014) 10 pages.
Deedwania, P. "Hypertension, Dyslipidemia, and Insulin Resistance in Patients with Diabetes Mellitus or the Cardiometabolic Syndrome: Benefits of Vasodilating β-Blockers" J. Clin. Hypertens. 13, 52-59 (2011).
Emaminejad, S., et al. "Autonomous sweat extraction and analysis applied to cystic fibrosis and glucose monitoring using a fully integrated wearable platform" Proceedings of the National Academy of Sciences, 114, 4625-4630 (2017).
Epstein, M., et al. "Brief Review Diabetes Mellitus and Hypertension" Hypertension 19, 403-406 (1992).
Fagard, R. H. "Effects of exercise, diet and their combination on blood pressure" J. Hum. Hypertens. 19, S20-S24 (2005).

Filipovsky, J. et al. "The relationship of blood pressure with glucose, insulin, heart rate, free fatty acids and plasma cortisol levels according to degree of obesity in middle-aged men" J. Hypertens. 14, 229-235 (1996).
Gao, W. et al.; Fully integrated wearable sensor arrays for multiplexed in situ perspiration analysis. Nature 529, 509-514 (2016).
Gomez, H., et al. "Lactate in Sepsis" JAMA 313, (2015) 194-195.
Gong, S. et al. "A wearable and highly sensitive pressure sensor with ultrathin gold nanowires" Nature Communications, 5, 3132 (2014) 8 pages.
Halliwill, J. R.; Mechanisms and Clinical Implications of Post-exercise Hypotension in Humans. Exerc. Sport Sci. Rev. 29, 65-70 (2001).
Hauke, A. et al.; Complete validation of a continuous and blood-correlated sweat biosensing device with integrated sweat stimulation. Lab Chip 18, 3750-3759 (2018).
Heikenfeld et al. "Accessing analytes in biofluids for peripheral biochemical monitoring" Nature Biotech.37(2019)407-419.
Hillbom, M., et al. "Alcohol Consumption, Blood Pressure, and the Risk of Stroke" Curr. Hypertens. Rep. 13, 208-213 (2011).
Ho, K. et al. "Evaluation of an anti-thrombotic continuous lactate and blood pressure monitoring catheter in an in vivo piglet model undergoing open-heart surgery with cardiopulmonary bypass" Chemosensors, 8, 56 (2020). 14 pages.
Hong, Y. J. et al. "Multifunctional Wearable System that Integrates Sweat-Based Sensing and Vital-Sign Monitoring to Estimate Pre-/Post-Exercise Glucose Levels" Adv. Funct. Mater. 28, 1805754 (2018). 12 pages.
Imani, S. et al. "A wearable chemical-electrophysiological hybrid biosensing system for real-time health and fitness monitoring" Nat. Commun. 7, 11650 (2016). 7 pages.
Jia, W. et al. "Epidermal biofuel cells: energy harvesting from human perspiration" Angew Chemie Int. Ed., 52, 7233-7238(2013).
Khan, Y., et al. "Monitoring of Vital Signs with Flexible and Wearable Medical Devices" Adv. Mater. 28, 4373-4395 (2016).
Kim, J. et al. "Simultaneous Monitoring of Sweat and Interstitial Fluid Using a Single Wearable Biosensor Platform" Adv. Sci., 5 (2018). 11 pages.
Kim, J. et al. "Wearable Bioelectronics: Enzyme-Based Body-Worn Eletronic Devices" Accounts of Chemical Research, 51, 2820-2828 (2018).
Kim, J., et al. "Wearable biosensors for healthcare monitoring" Nat. Biotechnol. 37, 389-406 (2019).
Kim, J., et al. "Wearable non-invasive epidermal glucose sensors: A review" Talanta 177, 163-170 (2018).
Klaric, D., et al. "Alcohol-Induced Coma, Hypothermia and Hypotension" J. Membr. Sci. Technol. 05, (2015). 3 pages.
Koh, A. et al. "A soft, wearable microfluidic device for the capture, storage, and colorimetric sensing of sweat" Science Translational Medicine, 8, 366ra165 (2016). 13 pages.
Kokkinos, P. "Cardiorespiratory Fitness, Exercise, and Blood Pressure" Hypertension 64, 1160-1164 (2014).
Lee, H. et al. "Wearable/disposable sweat-based glucose monitoring device with multistage transdermal drug delivery module" Sci. Adv. 3, e1601314 (2017). 8 pages.
Lee, H., et al. "Enzyme-Based Glucose Sensor: From Invasive to Wearable Device" Adv. Healthc. Mater. (2018). 14 pages.
Lee, S. P. et al. "Highly flexible, wearable, and disposable cardiac biosensors for remote and ambulatory monitoring" npj Digit. Med. 1, 2 (2018). 8 pages.
Lee, Y.-D., et al. "Wireless sensor network based wearable smart shirt for ubiquitous health and activity monitoring" Sensors Actuators B Chem. 140, 390-395 (2009).
Luo, N. et al. "Flexible Piezoresistive Sensor Patch Enabling Ultralow Power Cuffless Blood Pressure Measurement" Adv. Funct. Mater. 26, 1178-1187 (2016).
Macdonald, J. R. "Potential causes, mechanisms, and implications of post exercise hypotension" J. Hum. Hypertens. 16, 225-236 (2002).
Maheswaran, R., et al. "High blood pressure due to alcohol. A rapidly reversible effect" Hypertension 17, 787-792 (1991).

(56) References Cited

OTHER PUBLICATIONS

Monte-Moreno, E. "Non-invasive estimate of blood glucose and blood pressure from a photoplethysmograph by means of machine learning techniques" Artif. Intell. Med. 53, 127-138 (2011).
Mort, J. R., et al. "Timing of Blood Pressure Measurement Related to Caffeine Consumption" Ann. Pharmacother. 42, 105-110 (2008).
Murković, I., et al. "Sensors in neonatal monitoring: Current practice and future trends" Technology and Health Care, 11, 399-412 (2003).
Nurminen, M.-L., et al. "Coffee, caffeine and blood pressure: a critical review" Eur. J. Clin. Nutr. 53, 831-839 (1999).
Nystoriak, M. A., et al. "Cardiovascular Effects and Benefits of Exercise" Frontiers in Cardiovascular Medicine (2018). 11 pages.
Ohira, T. et al. "Effects of habitual alcohol intake on ambulatory blood pressure, heart rate, and its variability among Japanese men" Hypertens. (Dallas, Tex. 1979) 53, 13-9 (2009).
Ricci, F., et al. "Sensor and biosensor preparation, optimization and applications of Prussian Blue modified electrodes" Biosensors and Bioelectronics 21, 389-407 (2005).
Roerecke, M. et al. "The effect of a reduction in alcohol consumption on blood pressure: a systematic review and meta-analysis" Lancet Public Heal. 2, e108-e120 (2017).
Sakharov, D. A., et al. "Relationship between lactate concentrations in active muscle sweat and whole blood" Bulletin of Experimental Biology and Medicine, 150, 83-85 (2010).
Schriger, D. "Approach to the Patient with Abnormal Vital Signs" in Goldman's Cecil Medicine (Twenty Fourth Edition), 2012; 4 pages.
Sempionatto, J. et al. "An epidermal patch for the simultaneous monitoring of haemodynamic and metabolic biomarkers" Nature Biomedical Engineering, 5, 737-748 (2021).
Sempionatto, J. et al.; Supporting Information—Integrated Blood Pressure-Chemical Sensing Epidermal Patch. pp. 1-37.
Sempionatto, J., et al.; Integrated Blood Pressure-Chemical Sensing Epidermal Patch; Department of Nanoengineering, University of California San Diego, La Jolla, California 92093, USA. 28 pages.
Staunton, O.; et al.; The Urgency of Now: Attacking the Sepsis Crisis*, Critical care medicine, 2018 journals.lww.com; https://journals.lww.com/ccmjournal/Citation/2018/05000/The_Urgency_of_Now_Attacking_the_Sepsis_Crisis_.21.aspx.
Supreeth, E., et al. "Early sepsis detection in critical care patients using multiscale blood pressure and heart rate dynamics" Journal of Electrocardiology, vol. 50, Issue 6, Nov.-Dec. 2017, pp. 739-743.
Tai, L.-C. et al. "Methylxanthine Drug Monitoring with Wearable Sweat Sensors" Adv. Mater. 30, 1707442 (2018) 8 pages.
Teymourian et al. "Lab under the Skin: Microneedle Based Wearable Devices" Adv. Healthcare Materials, (2021) 19 pages.
Teymourian, et al. "Microneedle-Based Detection of Ketone Bodies along with Glucose and Lactate: Toward Real-Time Continuous Interstitial Fluid Monitoring of Diabetic Ketosis and Ketoacidosis" Anal. Chem. 92(2020) pp. 2291-2300.
Valdez-Jasso, D. et al. "Linear and nonlinear viscoelastic modeling of aorta and carotid pressure-area dynamics under in vivo and ex vivo conditions" Ann. Biomed. Eng. (2011); 39(5); pp. 1438-1456.
Wang, C., et al. "Materials and Structures toward Soft Electronics" Adv. Mater. 30, 1801368 (2018) 49 pages.
Wang, C., et al. "Monitoring of the central blood pressure waveform via a conformal ultrasonic device" Nature Biomedical Engineering, 2, 687-695 (2018).
Wilson, E., et al. "Severe hypotension and hypothermia caused by acute ethanol toxicity" Emerg. Med. J. 24, e7 (2007). 2 pages.
Yang, J. et al. "Prevalence of comorbidities and its effects in patients infected with SARS-CoV-2: a systematic review and meta-analysis" Int. J. Infect. Dis. 94, 91-95 (2020).
Yapici, M. K., et al. "Graphene-clad textile electrodes for electrocardiogram monitoring" Sensors Actuators B Chem. 221, 1469-1474 (2015).
Yin, L. et al. "From All-Printed 2D Patterns to Free-Standing 3D Structures: Controlled Buckling and Selective Bonding" Adv. Mater. Technol. 3, 1800013 (2018) 8 pages.
Yu, Y., et al. "Flexible Electrochemical Bioelectronics: The Rise of In Situ Bioanalysis" Adv. Mater. 32, 1902083 (2020) 25 pages.
Zanella, M. T., et al. "Treatment of obesity hypertension and diabetes syndrome" Hypertension (2001) pp. 705-708.
Zhao, J., et al. "A fully integrated and self-powered smartwatch for continuous sweat glucose monitoring" ACS sensors, 4, 1925-1933 (2019).
Chumbimuni-Torres, K. et al. "High Temperature Potentiometry: Modulated Response of Ion-Selective Electrodes During Heat Pulses" Analytical Chemistry, 2009, 10 pages.
Sempionatto, J. et al. "Touch-Based Fingertip Blood-Free Reliable Glucose Monitoring: Personalized Data Processing for Predicting Blood Glucose Concentrations" ACS Sensors, 2021, vol. 6, pp. 1875-1883.

* cited by examiner

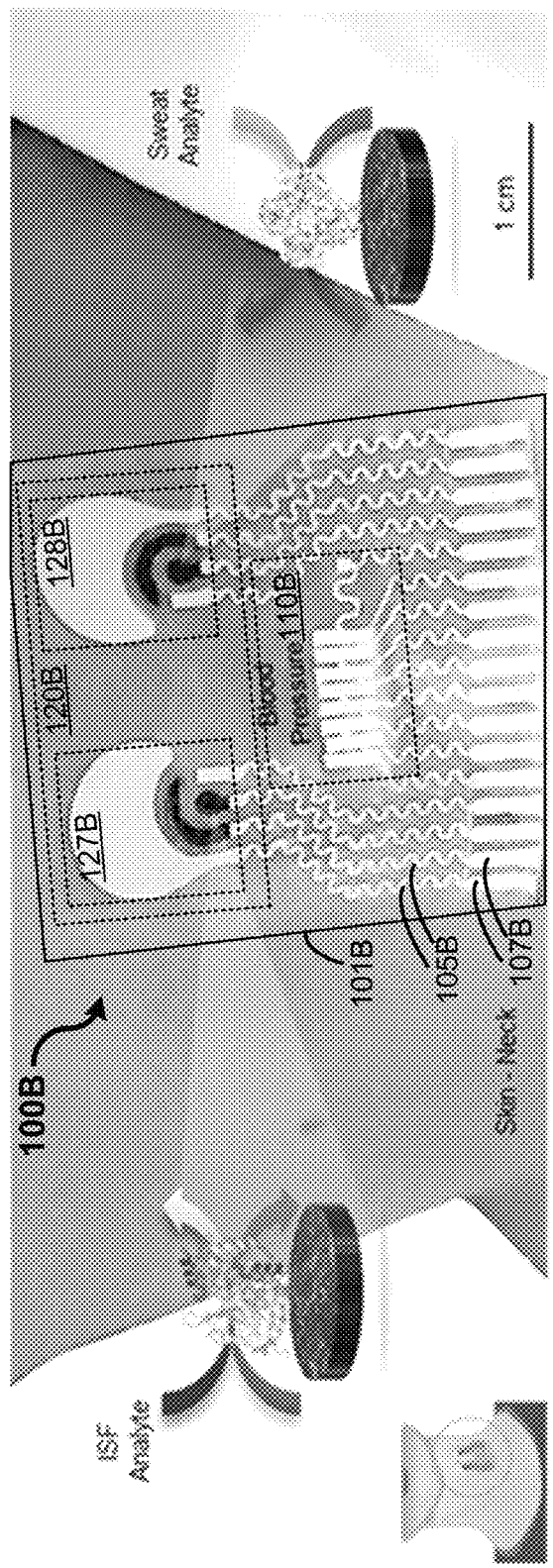
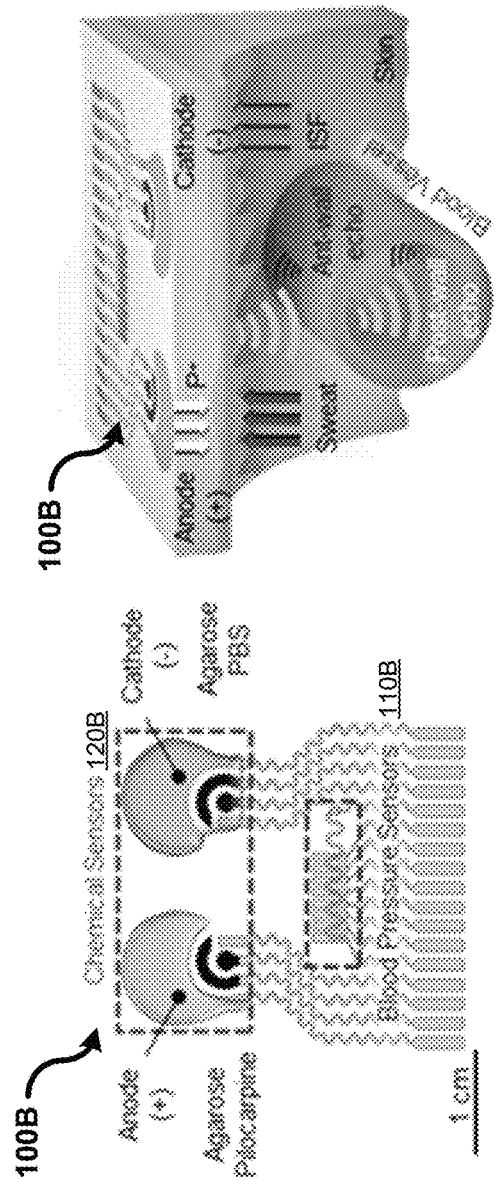
FIG. 1B
FIG. 1C

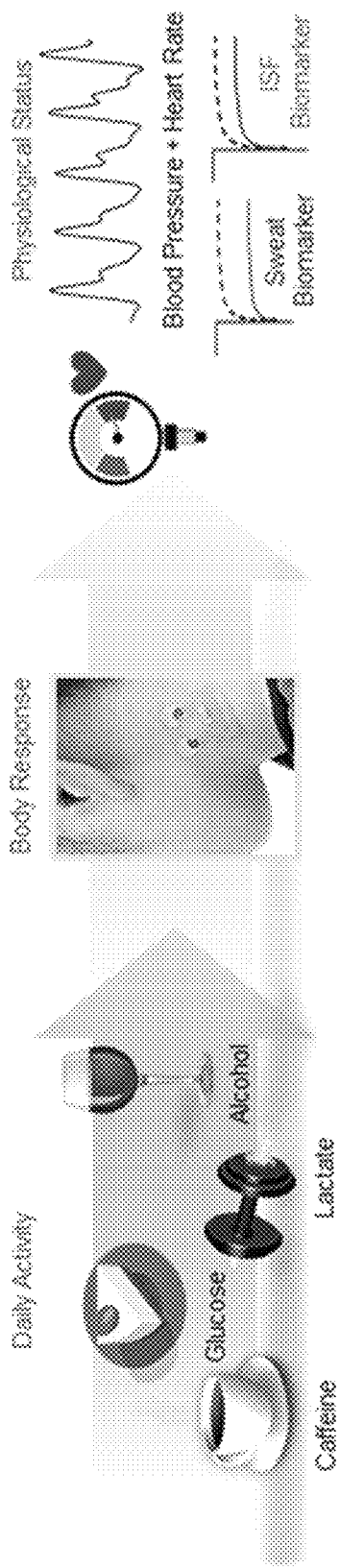
FIG. 1D
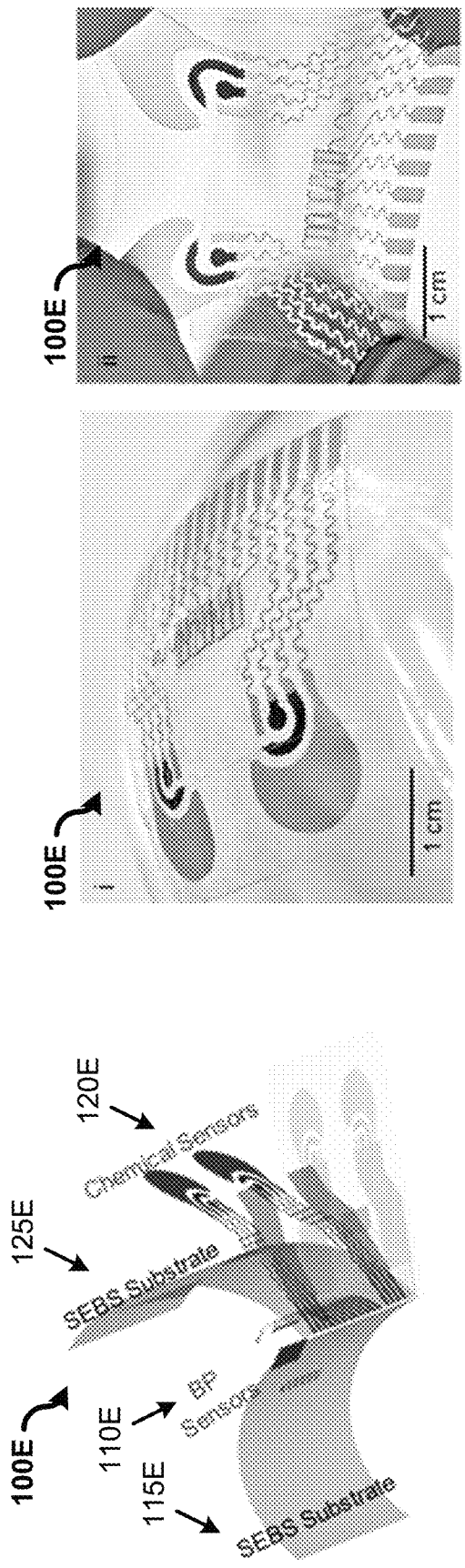
FIG. 1E
FIG. 1F

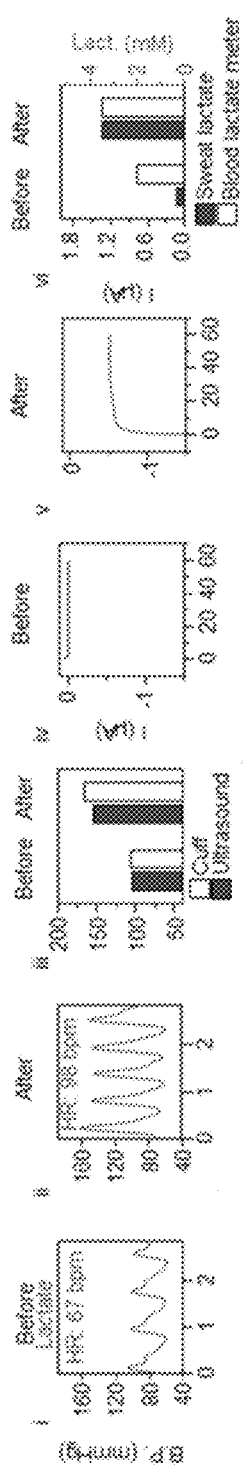
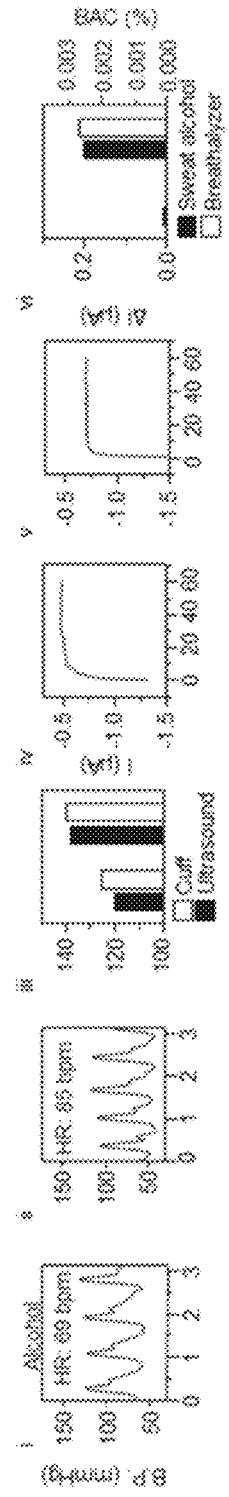
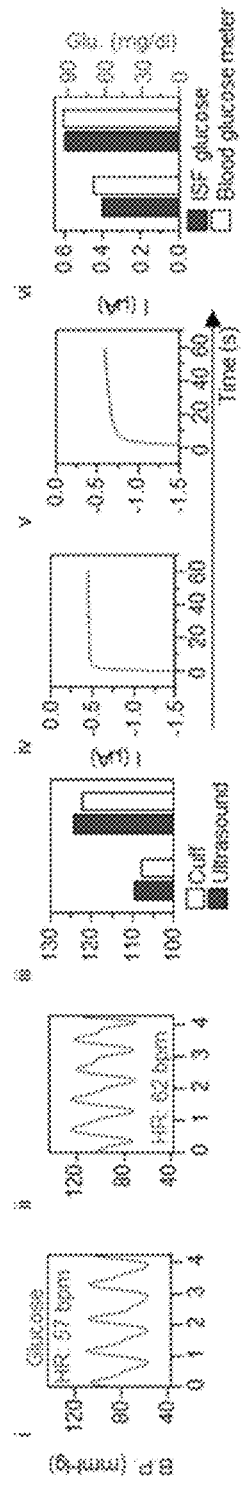
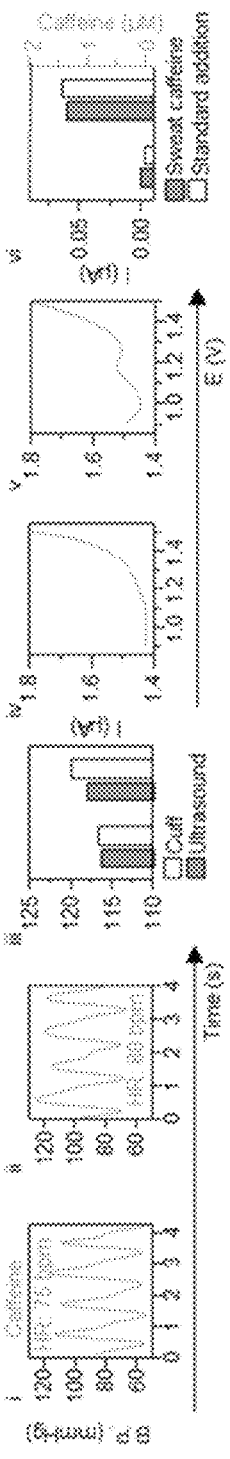
FIG. 3A
FIG. 3B
FIG. 3C
FIG. 3D

INTEGRATED CHEMICAL/ULTRASONIC TRANSDUCER SENSOR

CROSS-REFERENCE TO RELATED APPLICATIONS

This patent document claims priorities to and benefits of U.S. Provisional Patent Application No. 63/094,169, titled "INTEGRATED CHEMICAL/ULTRASONIC TRANSDUCER SENSOR" filed on Oct. 20, 2020. The entire content of the aforementioned patent application is incorporated by reference as part of the disclosure of this patent document.

TECHNICAL FIELD

This patent document relates to sensors including wearable sensor having electrodes.

BACKGROUND

Research in bio-sensing has traditionally been restricted to well-controlled laboratory environments. Such bio-sensing modalities measure electroencephalogram (EEG), photoplethysmogram (PPG), pupillometry, eye-gaze and galvanic skin response (GSR) are typically bulky, require numerous connections, costly, hard to synchronize, and have low-resolution and poor sampling rates. Multi-modal bio-sensing has recently shown to be very effective in affective computing, research in autism, clinical disorders, and virtual reality among many others. None of the present bio-sensing systems support multi-modality in a wearable manner outside controlled laboratory environments with clean, research-grade measurements. New devices and systems are needed for bio-sensing applications.

SUMMARY

Disclosed are devices, systems, and methods for multi-modal, wearable sensors, including an electrochemical-ultrasonic transducer-based sensor, that can simultaneously detect and monitor one or more bio-analyte markers and physiological markers.

The integration of an electrochemical sensor with ultrasonic transducer sensor for non-invasive multiplex sensing is disclosed. The disclosed devices and systems can simultaneously obtain the epidermal chemical molecular signals and deep-tissue level blood pressure signals for the detection and monitoring of various disease symptoms, which cannot be diagnosed based solely on usual metabolic chemical levels nor abnormal physiological states. The disclosed integrated sensor is small, light, conformal, wearable and non-invasive, which also greatly enhance the users' experience compared to previous sensors.

The integrated wearable sensor can be applied onto human epidermis and connected to either instruments or flexible integrated circuits to intermittently or continuously measure multiple signals simultaneously. The obtained data can be processed and translated for users or professionals to interpret. The chemical sensor section is designed to perform noninvasive electrochemical, optical, or colorimetric monitoring of biomarkers present in sweat, interstitial fluid or other epidermal fluid, including but not limited to glucose, lactate, uric acid and cortisol. The transducer sensor is designed to measure ultrasonic echoing signal reflected from arteries and compare with established correlation with the blood pressure.

The disclosed technological platform promises large commercial prospect since it can be easily incorporated as a useful device for healthcare monitoring in hospitals or at home. The "easy to wear", "put and forget" and wireless transmission features, make this wearable sensor a useful device for easy applicability. Furthermore, this device enables possible real-time monitoring of interesting target biomarker molecules for clinical diagnostics combined with blood pressure and heart rate.

Some example advantages of the disclosed electrochemical and ultrasound wearable sensors include user-friendliness and fast diagnostic results.

In some embodiments in accordance with the present technology, a wearable, acoustic-electrochemical sensor device includes a flexible substrate comprising an electrically insulative material, the flexible substrate capable of attaching and conforming to skin; an electrochemical sensor comprising two or more electrodes disposed on the flexible substrate, the two or more electrodes including a first electrode to detect a signal associated with an analyte by an electrochemical detection, and a second electrode configured as a counter electrode or a reference electrode; a physiological sensor comprising an array of acoustic transducers disposed on the flexible substrate and a ground wire coupled to and spanning across each acoustic transducer of the array, the array of acoustic transducers including an acoustic transduction material, wherein the physiological sensor is configured to direct acoustic signals from the array of acoustic transducers toward a blood vessel in or beneath the skin to detect a hemodynamic parameter of the blood vessel; and an array of electrical interconnection structures disposed on the flexible substrate, wherein at least one of the electrical interconnection structures is configured as a ground electrical interconnection structure, and wherein the ground wire of the physiological sensor spans from the array of acoustic transducers to the ground electrical interconnection structure, wherein the sensor device is operable to simultaneously detect and monitor one or more analyte markers and physiological markers.

BRIEF DESCRIPTION OF THE DRAWINGS

FIGS. 1A-1C show illustrative diagrams depicting example embodiments of a wearable integrated acoustic-electrochemical sensor device, in accordance with the present technology, for monitoring physiological data, such as blood pressure and heart rate via ultrasonic transducers, and, in parallel and non-invasively, monitoring biomarker levels.

FIG. 1D shows an illustration depicting various different daily activities inputs and corresponding biomarkers that affect an individual's body measurable by the disclosed wearable sensor technology.

FIG. 1E shows an illustration depicting a layer-by-layer layout of an example embodiment of a wearable acoustic-electrochemical sensor device in accordance with the present technology.

FIG. 1F shows photos of an example acoustic-electrochemical sensor device undergoing bending and undergoing stretching.

FIGS. 3A-3D show data plots depicting example data for an on-body evaluation of an example embodiment of a wearable acoustic-electrochemical sensor device in accordance with the present technology.

DETAILED DESCRIPTION

Figure 1A:
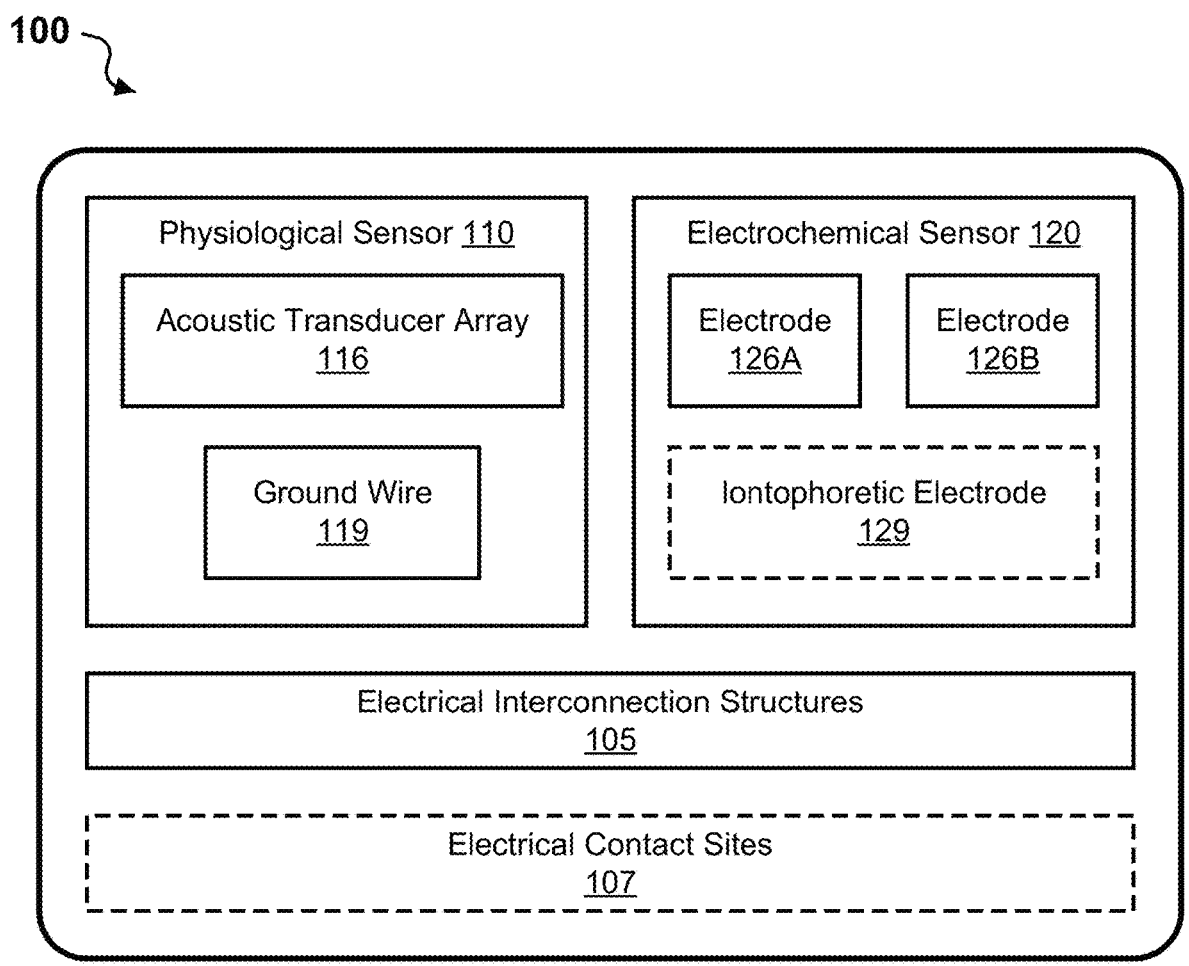

Intertwined with concepts of telehealth, the internet of medical things, and precision medicine, wearable sensors offer attractive features to actively and remotely monitor physiological parameters. Wearable sensors can generate data continuously without causing any discomfort or interruptions to daily activity, thus enhancing wearer's self-monitoring compliance and improving patient care quality. Wearable sensors can be used for the monitoring of single physical parameters, such as the electrocardiogram (ECG) and blood pressure (BP), and of biochemical parameters, such as glucose.

Recent efforts have led to the integration of physical and chemical sensors into a single wearable device, such as sensors for ECG with lactate or glucose for monitoring athlete's performance, and temperature with metabolites and electrolytes for signal calibration. Yet, to the best of our knowledge, an in-depth study of the correlation of cardiovascular parameters, particularly blood pressure, with biomarker levels using an integrated hybrid wearable sensor remains unexplored.

Blood pressure and heart rate (HR), two of the most important vital signs, can dynamically and directly reflect the physiological status of the body. These cardiovascular parameters can be affected by fluctuations of various biomarker concentrations originated from activities, such as movement, stress, or intake of food, drinks, and drugs, that can lead to sudden, sometimes lethal alterations. Multimodal BP-chemical sensing could thus have tremendous clinical value, especially for people with underlying health conditions, such as the elderlies, obese individuals, diabetic and cardiovascular patients, as their physiological response to normal day-to-day activities might differ from healthy people. Further, the prevention, diagnosis, and treatment of many diseases can greatly benefit from the simultaneous monitoring of cardiovascular parameters and biomarker levels. These include acute and deadly septic shock, which commonly involves sudden drops in BP accompanied by rapidly increasing blood lactate levels and hypo/hyperglycemia-induced hypo/hypertension which increases the risks of stroke, cardiac diseases, retinopathy, and nephropathy in diabetic patients. Simultaneous tracking of metabolites and hemodynamic parameters using the same device can increase the patient compliance towards self-monitoring, as it obviates the need of using multiple devices for measuring these parameters, towards preventing dangerous cardiac events and saving valuable lives. The combination of trans-disciplinary sensing modalities into a single miniaturized skin conformal wearable platform can yield significant additional advantages.

As an example, tiny critically ill and premature infants need continuous monitoring of various dangerous conditions, ranging from hypoglycemia and sepsis-like infection to open-heart surgeries where blood pressure and lactate or glucose need to be monitored continuously. Current neonate monitoring platforms require the application of multiple, often invasive, sensors coupled to bulky instruments on their tiny body that pose severe injury risks and barriers to parent-baby bonding. By integrating different sensing modalities on a single flexible, skin-worn tattoo-like patch, vulnerable patients—from neonates to elderly—can leverage their monitoring device with minimal discomfort or obtrusiveness. Furthermore, the recent global pandemic has also highlighted the urgent needs for remote self-monitoring devices, with particular attention to the management of high BP and diabetes, which are major factors in the deaths of COVID-19 patients. A comprehensive cardiovascular/biomarker self-monitoring platform would enhance users' self-awareness to their health conditions, and alert them and their caregivers to the occurrence of abnormal physiological changes.

Disclosed are devices, systems, and methods for multimodal, wearable sensors, including an electrochemical-ultrasonic transducer-based sensor, that can simultaneously detect and monitor one or more bio-analyte markers and one or more physiological markers.

In some example embodiments, a conformal, stretchable, and integrated wearable sensor is disclosed that can simultaneously monitor blood pressure, heart rate, and levels of glucose, lactate, caffeine, and alcohol, toward dynamic and comprehensive health self-monitoring. The example conformal, stretchable, and integrated wearable sensor can use ultrasonic transducers for monitoring the BP and HR, and electrochemical sensors for measuring the levels of biomarkers.

The growing demand for tracking the effects of diverse daily activities upon the body's physiological response calls for simultaneous tracking of metabolic and hemodynamic parameters on a single wearable device. Implementations of the disclosed technology present the first demonstrations of an integrated wearable sensor that monitors the blood pressure and heart rate via ultrasonic transducers, along with parallel non-invasive electrochemical detection of biomarker levels, such as glucose, lactate, caffeine, and alcohol, in sweat and interstitial fluid. Such simultaneous non-invasive blood-pressure/chemical sensing was implemented by monitoring the dynamic effects of everyday activities, such as exercise and intake of food and drinks, upon the user's physiological states. For example, by leveraging novel material selection and assembly processes, the multiplexed sensing modalities were optimized in some implementations to ensure reliable sensing without crosstalk between individual sensors, along with mechanical resiliency and flexibility for conformal contact to curved skin surfaces. The simultaneous acoustic and electrochemical sensors were evaluated on multiple human subjects under different stimuli, and the dynamic correlation of the hemodynamic activities and corresponding metabolic variations was monitored and discussed. Such multimodal blood-pressure/chemical wearable sensor offers a collection of previously unavailable information towards enhancing our understanding of the body's response to common activities, while holding considerable promise for predicting abnormal cardiac events and improving remote, telemetric, and personalized healthcare medical outcome.

The technology disclosed in this patent document can be implemented for various sensing applications, including, for example, methods, devices and systems for integrated, non-invasive, wearable multiplex epidermal sensing. In some embodiments, the disclosed sensor system contains two or more components, including at least one electrochemical sensor for the sensing of sodium, potassium, glucose, lactate, cortisol or other chemicals in human sweat or interstitial fluids; and at least one ultrasound transducer sensor for the sensing of human physiological signals such as blood pressure, heart rate, and other physiological signals. Other types of sensors include temperature sensor, ECG sensors, pressure sensors or strain sensors can also be integrated. Such integrated electrochemical-ultrasound sensors offer comprehensive diagnosis of various symptoms based on both the chemical signals and the physiological signals of the patient in a non-invasive manner.

In some example embodiments disclosed herein, a wearable sensor device includes an ultrasound device and an electrochemical sensor device for detecting a variety of physiological parameters associated with a response or condition of a user wearing the device, e.g., including monitoring septic shock. Such example embodiments of the disclosed wearable sensors may be referred to herein as an acoustic-chem sensor. The wearable acoustic-chem sensor may include: (i) a blood pressure (BP) sensor provided by the ultrasound device contingent, and (ii) an electrochemical sensor. Various example embodiments and implementations of a wearable acoustic-chem sensor in accordance with the present technology are described further below.

In some aspects, the growing demand for tracking the effects of diverse daily activities upon the body's physiological response calls for simultaneous tracking of metabolic and hemodynamic parameters on a single wearable device. In some embodiments in accordance with the disclosed technology, a wearable ultrasonic-electrochemical integrated sensor is configured to monitor the blood pressure and heart rate via ultrasonic transducers, along with parallel non-invasive electrochemical detection of biomarker levels, e.g., including but not limited to glucose, lactate, caffeine, and alcohol, in sweat and interstitial fluid. Such simultaneous non-invasive blood-pressure/chemical sensing was employed in example implementations by monitoring the dynamic effects of everyday activities, such as exercise and intake of food and drinks, upon the user's physiological states. Leveraging novel material selection and assembly processes, the multiplexed sensing modalities were optimized to ensure reliable sensing without crosstalk between individual sensors, along with mechanical resiliency and flexibility for conformal contact to curved skin surfaces. The simultaneous acoustic and electrochemical sensors were evaluated on multiple human subjects under different stimuli, and the dynamic correlation of the hemodynamic activities and corresponding metabolic variations was monitored and discussed. Such multimodal blood-pressure/chemical wearable sensor offers a collection of previously unavailable information towards enhancing our understanding of the body's response to common activities, while holding considerable promise for predicting abnormal cardiac events and improving remote, telemetric, and personalized healthcare medical outcome.

FIGS. 1A-1C show illustrative diagrams depicting an example embodiment of a wearable integrated acoustic-electrochemical sensor device 100 configured to attach to skin of a user and simultaneously monitor at least one physiological parameter and electrochemical parameter of the user.

FIG. 1A shows a block diagram of an example embodiment of the wearable integrated acoustic-electrochemical sensor device 100. The wearable acoustic-chem sensor device 100 includes a flexible substrate 101 comprising an electrically insulative material, in which the flexible substrate 101 is bendable and/or stretchable and capable of attaching and conforming to skin. The wearable acoustic-chem sensor device 100 includes one or more physiological sensors 110 and one more electrochemical sensors 120, which are configured on and/or in the flexible (bendable and/or stretchable) substrate 101.

In various embodiments of the wearable acoustic-chem sensor device 100, the one or more electrochemical sensors 120 can include two or more electrodes disposed on the flexible substrate 101, in which the two or more electrodes include a first electrode 126A to detect a first signal associated with a first analyte by an electrochemical detection, and a second electrode 126B configured as a counter electrode or a reference electrode to detect a second signal. In some embodiments, for example, the two or more electrodes of the one or more electrochemical sensors 120 can include optionally an iontophoretic electrode 129 to facilitate extraction of a biofluid, e.g., such as ISF, and/or induce excretion of a biofluid, e.g., such as sweat. In various implementations, for example, the one or more electrochemical sensors 120 can be configured to detect the first signal through sensing the first analyte by an electrochemical detection, including, but not limited to: an enzymatic reaction for electrochemical detection; a non-enzymatic catalytic reaction (e.g., involving a non-biological catalyst material) for electrochemical detection; a molecularly-imprinted polymer facilitated reaction for electrochemical detection; an aptamer reaction for electrochemical detection; an antibody reaction for electrochemical detection; an ion-selective membrane facilitated reaction for electrochemical detection; and/or potential-specific redox reaction. In some implementations, for example, the one or more electrochemical sensors 120 can be configured to sensing the analyte through specific or non-specific adsorption of the analyte at the detecting electrode for analyte detection. In some embodiments, for example, the electrodes of the one or more electrochemical sensors 120 are configured as surface electrodes, which can include various shapes and sizes, including circular, elliptical, square, rectangular, triangular, or other shapes. In some embodiments, for example, the one or more electrochemical sensors 120 can be configured to detect multiple analytes simultaneously from one or more biofluids in contact with electrodes of the one or more electrochemical sensors, where the analytes include but are not limited to: glucose, lactate, cortisol and/or other hormones, alcohol, caffeine, urea, uric acid, acetaminophen, a pharmaceutically-prescribed drug or substance (e.g., blood pressure regulating drug, L-DOPA, etc.), an illicit drug or substance (e.g., an opioid, THC, etc.), a vitamin, or an electrolyte including sodium, chloride, fluoride, magnesium, zinc, or potassium. The biofluids can include, but are not limited to, interstitial fluid, sweat, blood, urine, tears, etc.

In various embodiments of the wearable acoustic-chem sensor device 100, the one or more physiological sensors 110 can include an ultrasound sensor that comprises an array of acoustic transducers 116 disposed on the flexible substrate 101 and a ground wire 119 coupled to and spanning across each acoustic transducer of the array, of which the array of acoustic transducers include an acoustic transduction material. In various implementations, for example, the one or more physiological sensors 110 is configured to direct acoustic signals from the array of acoustic transducers toward a blood vessel in or beneath the skin to detect a hemodynamic parameter of the blood vessel. In some embodiments, for example, the one or more physiological sensors 110 can optionally include an electrocardiogram sensor comprising at least two electrodes disposed on the flexible substrate 101 to measure a bioelectrical potential across an area of the user's skin over the user's heart.

The wearable acoustic-chem sensor device 100 can include an array of electrical interconnection 105 structures disposed on the flexible substrate 101, in which at least one of the electrical interconnection structures 105 is configured as a ground electrical interconnection structure that connects to the ground wire 119 of the one or more physiological sensors 110, e.g., the ground wire 119 spans from the array of acoustic transducers 116 to the ground electrical interconnection structure. In some embodiments, for example, the wearable acoustic-chem sensor device 100 can include an array of electrical contact sites 107 that are coupled to the electrical interconnection structures 105. In some embodiments, for example, the wearable acoustic-chem sensor device 100 can be interfaced to an analytical device comprising a circuit and/or processing unit, e.g., by the electrical contact sites 107, e.g., in which a contact site can be electrically coupled to an electrode or other electrical component of the sensor(s) 110 and sensor(s) 120 via the electrical interconnection wires 105. The diagrams of FIG. 1B and FIG. 1C show an example design and mechanism of an example embodiment of the wearable acoustic-chem sensor device 100 configured as a stretchable integrated blood pressure-chemical sensing patch device.

FIG. 1B shows an illustration of an example embodiment of the wearable acoustic-chem sensor device 100, shown as wearable acoustic-chem sensor device 100B, attached to the skin of the body, e.g., on a user's neck. The example wearable acoustic-chem sensor device 100B is configured to simultaneously monitor the user's blood pressure and heart rate via the one or more physiological sensors 110B, e.g., comprising ultrasonic transducers, configured in parallel with the one or more electrochemical sensors 120B to non-invasively and electrochemically detect biomarker levels from biofluids, such as sweat and interstitial fluid (ISF). The illustration of FIG. 1B shows an electrochemical detection of a first analyte in ISF measurable at a first electrode contingent 127B of an example electrochemical sensor 120B and an electrochemical detection of a second analyte in sweat measurable at a second electrode contingent 128B of another example electrochemical sensor 120B of the example wearable acoustic-chem sensor device 100B shown in FIG. 1B. Each of the first and second sensor contingents 127B and 128B include four individual electrodes structured to detect a target analyte in the ISF and sweat, respectively. For example, each of the first and second sensor contingents 127B and 128B include a detecting electrode that can be modified with a functionalization layer to facilitate a reaction involving the target analyte to detect a parameter of the target analyte in the ISF and sweat respectively (which is shown in FIG. 1B as a circular electrode, and with a caption illustrating an electrochemical reactions); and each of the first and second sensor contingents 127B and 128B include a reference electrode, a counter electrode, and an iontophoretic electrode. In some embodiments, for example, the detecting electrodes can be configured with a circular geometry and having a diameter of 1 cm, like that shown in the particular example illustrated in FIG. 1B; yet, it is understood that the electrodes of the wearable acoustic-chem sensor device 100 can be configured in a variety of shapes and sizes to suit the desired purpose and application. In some embodiments, for example, the electrical interconnection structures 105B can be configured as serpentine interconnection wires, which allow for stretching and bending on the flexible substrate 101B.

FIG. 1C shows an illustration depicting two diagrams of the example embodiment of a wearable acoustic-chem sensor device 100B. In the left diagram, the example wearable acoustic-chem sensor device 100B's acoustic transducers 110B configured for blood pressure sensing and electrochemical sensors 120B include a hydrogel for sweat stimulation and ISF extraction, respectively. In the right diagram, the wearable acoustic-chem sensor device 100B is shown attached to skin for acoustic sensing and implementing iontophoresis mechanism of the integrated sensor. For example, the acoustic transducers 110B of the sensor device 100B applies ultrasound pulses which generate echoes from the anterior and posterior walls of an artery within the skin. Chemical sensing using the electrochemical sensors 120B can begin with applying an iontophoretic current from a positive terminal (e.g., anode+) to a negative terminal (e.g., cathode −) that allows the electro-repulsive delivery of a sweat stimulating molecule P+ (e.g., Pilocarpine nitrate). After pilocarpine delivery, stimulated sweat containing biomarkers (e.g., including but not limited to lactate, caffeine, and alcohol) is collected and quantified in the left side of the sensor device 100B. The iontophoretic current leads to osmotic flow of biomarkers (e.g., such as glucose) from the interstitial fluid to the skin surface, allowing its collection and analysis on the right side of the sensor device 100B.

FIG. 1D shows an illustration depicting various different daily activities inputs performed by an individual and the corresponding biomarkers (e.g., alcohol, caffeine, lactate, and glucose) followed by the effect on the individual's system (body response). The inputs are transduced and outputted as blood pressure (BP), heart rate (HR), and electrochemical signals by the device reflecting the body's physiological status.

FIG. 1E shows a schematic illustration depicting a layer-by-layer layout of an example embodiment of a wearable acoustic-chem sensor device 100, i.e., an acoustic-chem sensor 100E, showing a chemical sensing layer 120E, a substrate layer 125E, a physiological sensor layer 110E, and a substrate layer 115E. In this example, the substrate layer 125E and substrate layer 115E comprised styrene-ethylene-butylene-styrene block copolymer (SEBS) material. For example, the use of SEBS or similar styrene-based triblock copolymer, e.g., such as styrene-isoprene-styrene block copolymer (SIS) or styrene-butylene-styrene (SBS), are quite suitable for a flexible substrate of the disclosed embodiments of the integrated acoustic-electrochemical sensor devices, as these materials possess a low melting point (e.g., ~200° C.), chemical stability, biocompatibility, highly elastic mechanical behavior, and solution processability. Such example properties of SEBS (and SIS, SBS) grant softness, conformity to skin, heat-salability, as well as compatibility to post-processing by solvent. Similarly, for example, polymers such as polyurethane (PU) and polyethylene vinyl acetate (PEVA) can be also consider suitable for such applications FIG. 1F shows two photos of the example acoustic-chem sensor 100E undergoing bending (panel (i)) and undergoing stretching (panel (ii)).

Figure 1G:
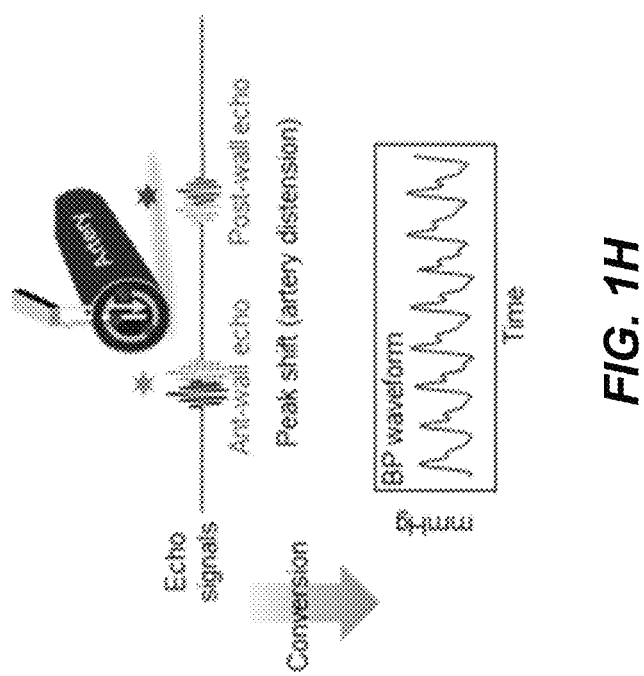
FIG. 1G shows a diagram and corresponding data plot depicting the detection mechanisms of electrochemical sensors for detection of multiple analytes, for some example embodiments of a wearable acoustic-electrochemical sensor device in accordance with the present technology.

FIG. 1G shows a diagram and corresponding data plot depicting the detection mechanisms of the electrochemical sensors 120 for detection of two analytes, for some example embodiments of the wearable acoustic-chem sensor device 100. FIG. 1G, panel i, shows example amperometric measurements using enzyme-based sensors. In this example (panel (i)), a Prussian blue (PB) working electrode was modified with an analyte-associated enzyme, e.g., such as LOx, GOx or AOx redox enzymes, allowing the biocatalytic oxidation of lactate, glucose or alcohol molecules to pyruvate, gluconic acid or acetaldehyde (product) respectively, along with the production of hydrogen peroxide. In some example implementations, the electrochemical reduction of the liberated hydrogen peroxide ($H_2O_2$) to hydroxyl ions (OH—) can be performed in a buffer, e.g., PBS pH 7.4, by applying a potential of $-0.2$ V. An increase of negative current is observed by the increase in concentration of chemical analyte (data plot of panel (i)). FIG. 1G, panel ii, shows example non-enzymatic measurements for measuring an analyte such as caffeine. In this example (panel (ii)), a carbon working electrode was modified with multi-walled carbon nanotubes (MWCNTs) to facilitate a reaction at the sensor surface for detection of caffeine. For example, during the sensing process, caffeine is oxidized which results in the production of uric acid analog molecules and electrons. In the example shown in panel (ii), the carbon electrode modified with the MWCNT allowed the pulse-voltammetric detection of caffeine following 30 s accumulation at $-1.2$ V and scanning between $+0.5$ V and $+1.5$ V. Other detection parameters shown in FIG. 1G include $E_{step}$: 0.004 V; $E_{pulse}$: 0.05 V; $t_{pulse}$: 0.05 s; scan rate: 0.02 V/s. By increasing the concentration of caffeine, an increasing oxidation signal is observed (data plot of panel (ii)).

Figure 1H:
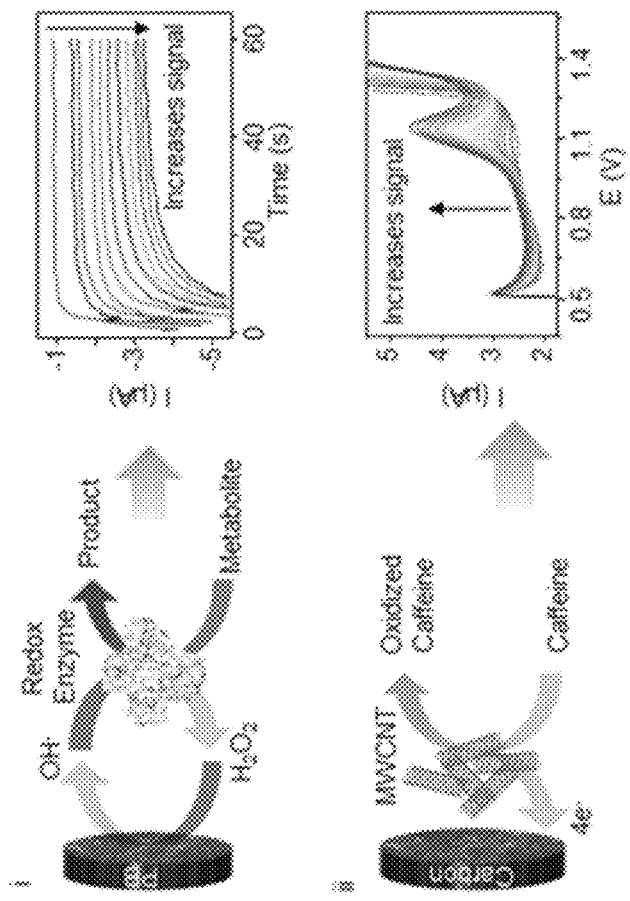
FIG. 1H shows an illustration and data plot depicting an example signal generation mechanism of an ultrasound transducer of an example embodiment of a wearable acoustic-electrochemical sensor device in accordance with the present technology.

FIG. 1H shows an illustration and data plot depicting an example signal generation mechanism of the ultrasound transducer. The pulsed ultrasound signal from the transducer is reflected from the anterior and the posterior walls of the artery and collected by the transducer. Signal processing of the ultrasound signal. The time of flight (TOF) of the reflected echo can be converted into BP via established transfer functions.

In the example embodiments of the device 100 shown in FIGS. 1A-1H, ultrasonic transducers are used for monitoring the BP and HR, and electrochemical sensors are used for measuring the levels of biomarkers. Through strategic material selection, layout design, and fabrication innovation, rigid and soft sensor components were integrated to create a wearable acoustic-chem sensor. For example, in some embodiments, a customized array of piezoelectric lead zirconate titanate (PZT) ultrasound transducers was integrated with printed polymer composites via innovative solvent-soldering process, into a single wearable conformal platform with high mechanical resiliency and free of sensor crosstalk. Such rational design overcomes engineering challenges related to the integration of the different sensing modalities and materials to allow real-time monitoring of cardiovascular parameters and biomarker levels, in connection to parallel sampling of the interstitial fluid (ISF) and sweat biofluids. The resulting epidermal hybrid device can emit ultrasonic pulses and sense echoes from arteries, while stimulating sweat and extracting ISF through iontophoresis (IP), allowing simultaneous measurements of BP and HR, along with multiple biomarkers in these biofluids.

As discussed further below, on-body trials were carried out with multiple human subjects experiencing diverse activities and stimuli (exercising, having alcohol, food, and caffeine, like those illustrated in FIG. 1D). The correlations between metabolic variations and hemodynamic activities, under these stimuli, were monitored and evaluated. The improved sensor assembly process, leveraging the Styrene-ethylene-butylene-styrene block copolymer (SEBS)-based stretchable materials, allows the fast and reliable fabrication of a stretchable and conformal epidermal sensor for simultaneous acoustic and electrochemical sensing. Such a device offers (i) comprehensive tracking of the effect of daily activities and stimuli upon the users' physiological status, and (ii) enables the collection of previously unavailable data towards understanding of the body response to such stimuli, while addressing the critical post-pandemic needs for remote telemetric patient monitoring.

In the example implementations of a wearable acoustic-chem sensor device 100, SEBS was used as the stretchable and conformal substrate to support the electrodes and connections printed with customized inks (e.g., like that in FIG. 1E). The stretchable substrate and inks allow the high conformity, flexibility (FIG. 1F, panel (i)), and stretchability (FIG. 1F, panel (ii)) required for wearable devices. The BP sensor includes an array of eight piezoelectric transducers, which can be aligned with the carotid artery upon applying on the neck to obtain optimal ultrasonic signals. During sensing, the piezoelectric transducers were activated with electrical pulses, transmitting ultrasound beams to the artery, and the time of flight of the echoes from the anterior and the posterior walls of the artery was analyzed to gauge the dilation and contraction of arteries (e.g., like that illustrated in FIG. 1C, 1H). The optimal BP signal can be selected from the eight transducers with the best alignment to the artery and hence the highest signal quality, thus ensuring reliable BP sensing during movement where the patch may undergo some displacement. Discussion regarding the fabrication of the example embodiment of the wearable acoustic-chem sensor used in these example implementations is discussed later in connection with FIG. 2M and in Note 1. Example results of the BP sensor characterization is discussed later in Note 3. In the example implementations, the chemical sensing was realized through non-invasive sweat stimulation (e.g., via transdermal pilocarpine delivery) at the IP anode, alongside with ISF extraction at the IP cathode. For example, lactate, alcohol and caffeine were monitored only in sweat, while glucose was monitored only in ISF. Further information regarding the simultaneous monitoring of ISF and sweat analytes via iontophoresis is presented later in Note 4. Chronoamperometry (CA) was used for electrochemical detection of the hydrogen peroxide product of the glucose oxidase (GOx), lactate oxidase (LOx), and alcohol oxidase (AOx) enzymatic reactions, while differential pulse voltammetry (DPV) was used for the detection of caffeine. Example embodiments of electrode modification and reaction mechanisms are discussed in connection with FIG. 10. Example data showing the analytical performance of each chemical sensor is shown in FIG. 1G, as well as FIGS. 11-14, and Note 2.

Figure 1I:
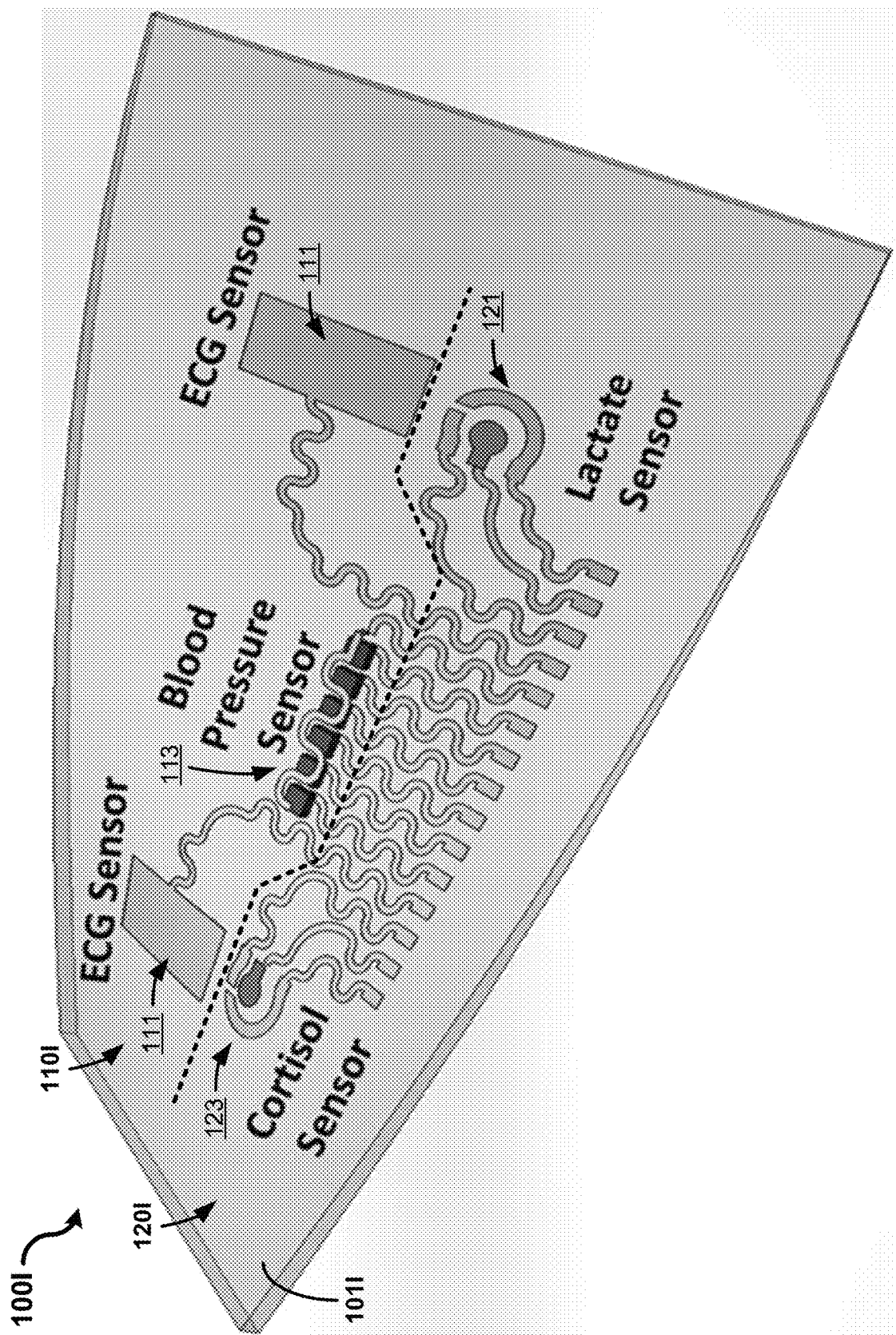
FIG. 1I shows a diagram illustrating an example embodiment of a flexible biosensor device including physiological sensors and electrochemical sensors.

FIG. 1I depicts another example embodiment of a wearable acoustic-chem sensor device 1001 including the physiological sensors 110 (e.g., including electrodes 111 and 113 operable to measure ECG and blood pressure, respectively) and the electrochemical sensors 120 (e.g., including lactate sensor 121 and cortisol sensor 123 operable to measure lactate and cortisol analytes, respectively). The physiological sensors 110 and electrochemical sensors 120 are integrated onto a single flexible substrate 1011. While the flexible wearable acoustic-chem sensor device 1001 shows an example embodiment for some implementations, yet many other combinations of physiological sensors 110 and electrochemical sensors 120 can be integrated onto a single substrate for embodiments of the wearable acoustic-chem sensor device 100.

In some implementations of the example wearable acoustic-chem sensor device 1001, the single flexible substrate 1011 is configured to a size that would span a length across a user's heart, such that the ECG electrodes 111 are able to detect a bioelectrical potential indicative of an electrocardiogram. Whereas, in some embodiments, two separate wearable acoustic-chem sensor device 1001 each comprising at least one ECG electrode 111 can be implemented by attaching the two separate wearable acoustic-chem sensor device 1001 on opposite sides of the user's heart, such that the two sensors 1001 are able to detect a bioelectrical potential, via the respective ECG electrodes 111, indicative of an electrocardiogram.

The single flexible substrate 1011 of the integrated flexible biosensor 100 can be fabricated using a flexible transparent substrate (e.g., ECOFLEX®, PDMS, Polyurethane, and so on) by using conductive screen-printed ink or by laser cutting conductive material such as sheet metal. Example embodiments using ECOFLEX can use a similar material, for example, as ECOFLEX generally is made by a variety of polymers including PVC, ABS, polyethylene, and polypropylene. The device 1001 may be designed with the chemical sensor facing the skin, while the physical sensor may be on the opposite side of the device.

Figure 1J:
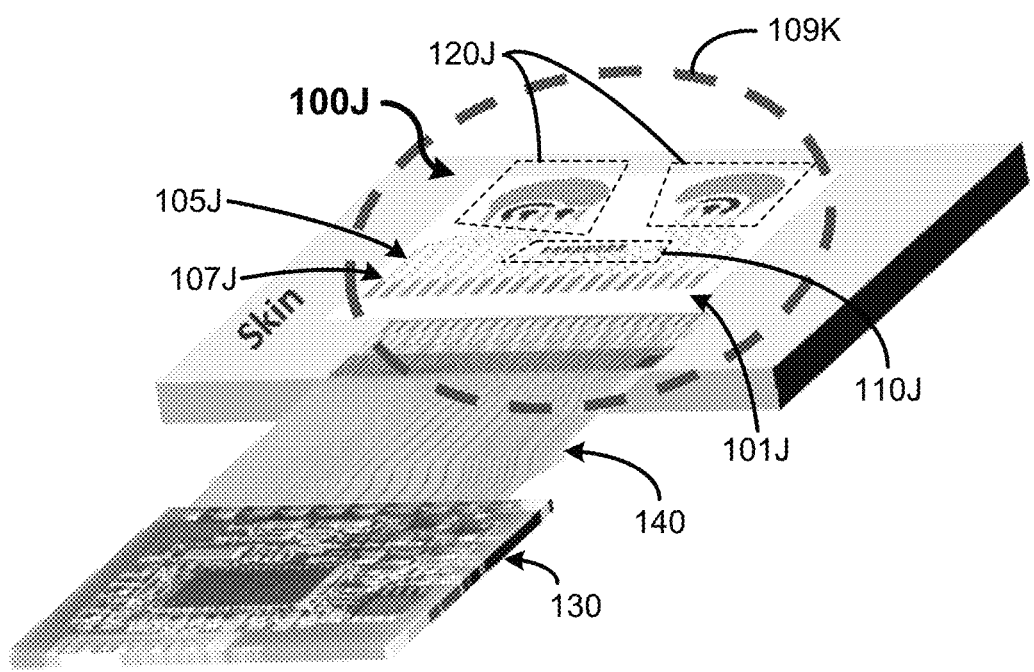
FIGS. 1J and 1K show illustrative diagrams of an example embodiments of a wearable integrated acoustic-electrochemical sensor device, in accordance with the present technology.
Figure 1K:
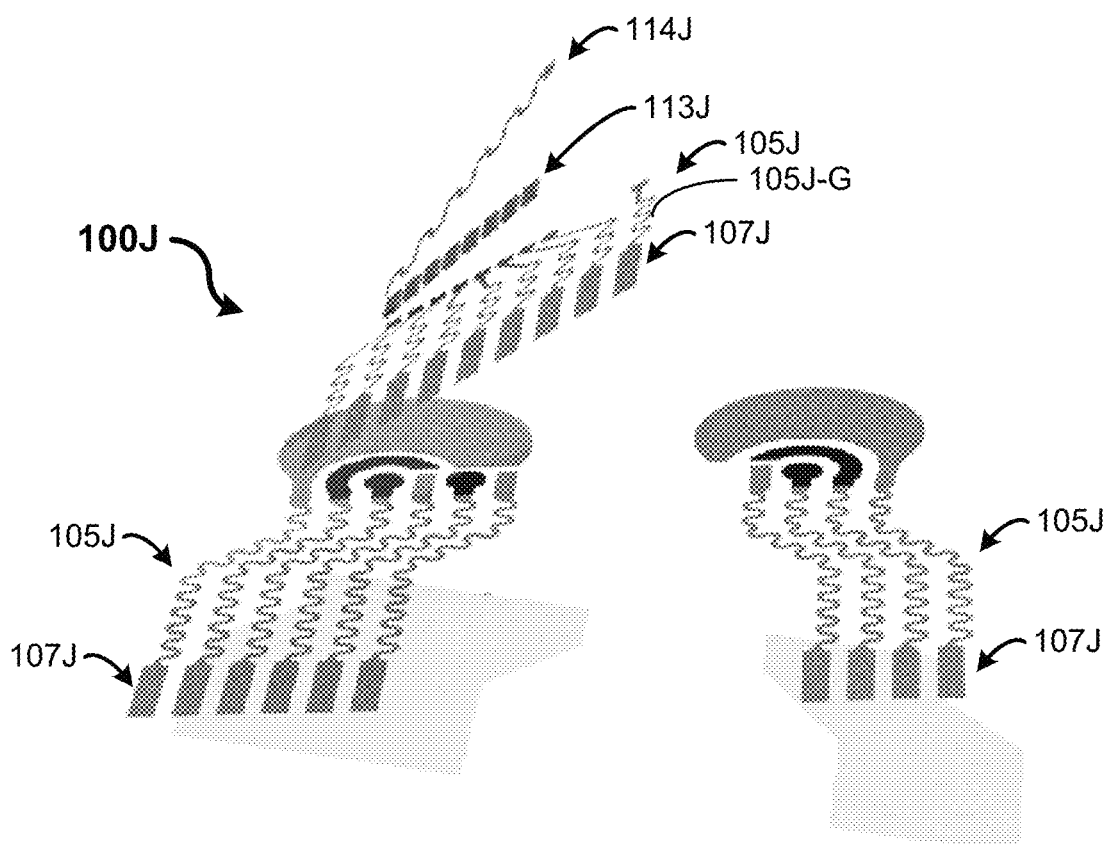

FIGS. 1J and 1K show illustrative diagrams of an example embodiments of a wearable integrated acoustic-electrochemical sensor device 100, shown as wearable acoustic-chem sensor device 100J, attached to the skin of the body, e.g., on a user's neck. The example wearable acoustic-chem sensor device 100J is configured to simultaneously monitor the user's blood pressure and/or heart rate via a physiological sensor 110J configured as an ultrasound sensor, e.g., comprising an array of ultrasonic transducers 113J, in parallel with a plurality of electrochemical sensors 120J to non-invasively and electrochemically detect biomarker levels from biofluids, such as sweat and/or interstitial fluid (ISF). The example physiological sensor 110J and electrochemical sensors 120J each are in electrical connection with electrical contact sites 107J via electrical interconnections 105J. The illustration of FIG. 1J and the exploded diagram of FIG. 1K both show an example embodiment of the plurality of electrochemical sensors 120J that includes a four-electrode contingent comprising four separate detecting electrodes configured proximate to a reference electrode and to a counter electrode, and with an iontophoretic electrode spanning a relatively larger surface area at least partially around the detecting electrode(s), counter electrode, and reference electrode. In some embodiments of the wearable acoustic-chem sensor device 100J, for example, the electrochemical sensors 120J that include an iontophoretic electrode can include a hydrogel coupled to the iontophoretic electrode, e.g., to aid in facilitating extraction of an interstitial fluid from the skin and/or to aid in inducing excretion of sweat from the skin, by triggered release of sweat-inducing substances initially entrapped in the hydrogel and/or by applied forces generated by electrical potentials applied at the iontophoretic electrode. The example embodiment of the plurality of electrochemical sensors 120J is discussed in further detail (including but not limited to FIG. 39A), e.g., with respect to example implementations for simultaneously monitoring four analytes: glucose, lactate, caffeine, and alcohol. The illustration of FIG. 1J and the exploded diagram of FIG. 1K both show the example ultrasound sensor (of the physiological sensor 110J) comprising the ultrasonic transducers 113J with a ground wire 114J coupled to and spanning across the ultrasonic transducers 113 and connecting an electrical ground interconnection 105J-G. In some embodiments of the wearable acoustic-chem sensor device 100J, for example, the physiological sensor 110J includes a hydrogel material coupled to the ultrasonic transducers 113, e.g., to assist in propagating acoustic signals generated at the ultrasonic transducers 113 to the skin and propagating returned acoustic echoes received from the skin to the ultrasonic transducers 113. In some embodiments, for example, the electrical interconnection structures 105J can be configured as serpentine interconnection wires, which allow for stretching and bending on the flexible substrate 101J.

Figure 1L:
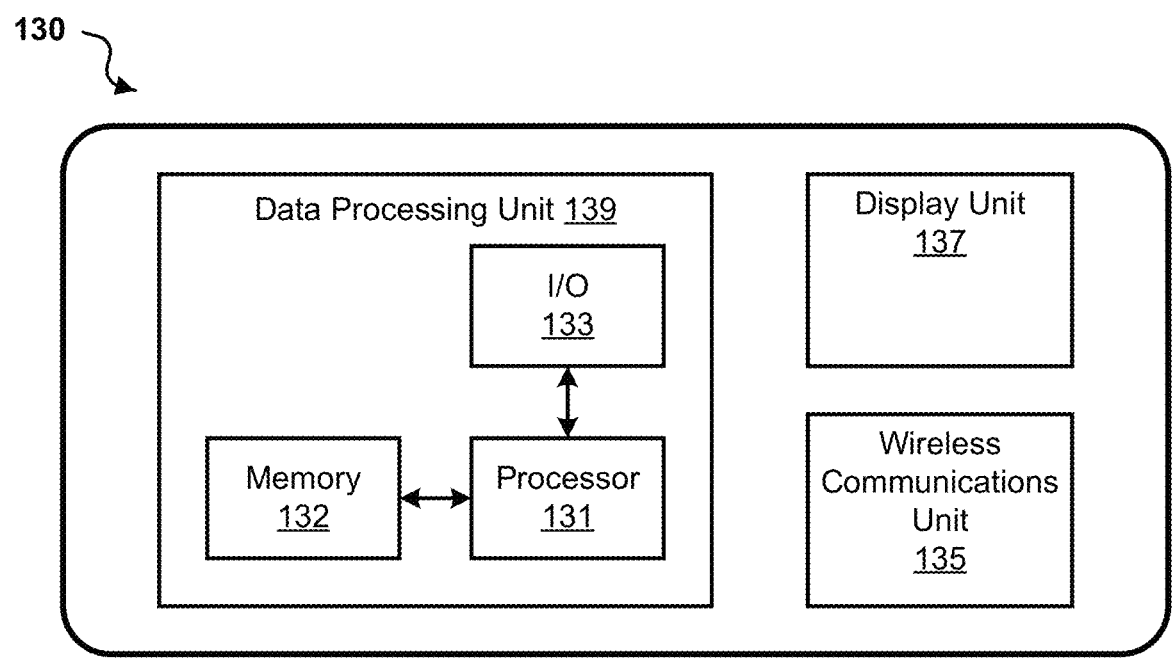
FIG. 1L shows a block diagram of an example embodiment of an electronic device that can electrically interface with an example wearable acoustic-electrochemical sensor device for various implementations in accordance with the present technology.

FIG. 1L shows a block diagram of an example embodiment of an electronic device 130 that can electrically interface to the contact sites 107 of the wearable acoustic-chem sensor device 100 for various implementations. For example, the electronic device 130 can include an electrical circuit and/or a data processing unit to process electrical signals as data received from the wearable acoustic-chem sensor device 100. In various implementations, the electronic device 130 is operable to store and execute software applications to implement various sensing protocol algorithms and/or implement various functionalities of the wearable acoustic-chem sensor device 100. In various implementations, the electronic device 130 can be implemented as a portable signal processing and/or computing device, which can include a mobile communications device, such as a smartphone, tablet or wearable device, like a smartwatch, glasses, etc.; and/or, the electronic device 130 can be implemented as a stationary signal processing and/or computing device, such as a desktop computer and amplifier.

In some embodiments, the electronic device 130 includes a data processing unit 139 includes a processor 131 to process data, a memory 132 in communication with the processor 131 to store data, and an input/output unit (I/O) 133 to interface the processor 131 and/or memory 132 to other modules, units or devices, including other external computing devices. For example, the processor 131 can include a central processing unit (CPU) and/or a microcontroller unit (MCU) and/or a graphic processing unit (GPU). For example, the memory 132 can include and store processor-executable code, which when executed by the processor, configures the data processing unit 139 to perform various operations, e.g., such as receiving information, commands, and/or data, processing information and data, and transmitting or providing information/data to another device. In some implementations, the data processing unit 139 can transmit raw or processed data to a computer system or communication network accessible via the Internet (referred to as 'the cloud') that includes one or more remote computational processing devices (e.g., servers in the cloud). To support various functions of the data processing unit 139, the memory 132 can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory 132. In some embodiments, the data processing unit 139 includes a wireless communication unit 135, such as a wireless transmitter to transmit stored and/or processed data or a wireless transceiver (Tx/Rx) to transmit and receive data. The I/O 133 of the data processing unit 139 can interface the data processing unit 139 with the wireless communications unit 135 to utilize various types of wired or wireless interfaces compatible with typical data communication standards, for example, which can be used in communications of the data processing unit 139 with other devices, via a wireless transmitter/receiver (Tx/Rx) unit, e.g., including, but not limited to, Bluetooth, Bluetooth low energy, Zigbee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, NFC (Near Field Communication), and parallel interfaces. In some embodiments, the data processing unit 139 includes a display unit 137, which can include a visual display such as a display screen, an audio display such as a speaker, or other type of display or combinations thereof. The I/O 133 of the data processing unit 139 can also interface with other external interfaces, sources of data storage, and/or visual or audio display devices, etc. to retrieve and transfer data and information that can be processed by the processor 131, stored in the memory 132, or exhibited on an output unit (e.g., display unit 137) of the electronic device 500 or an external device. For example, the display unit 137 can be configured to be in data communication with the data processing unit 139, e.g., via the I/O 133, to provide a visual display, an audio display, and/or other sensory display that produces the user interface of the software application. In some examples, the display unit 137 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Figure 39A:
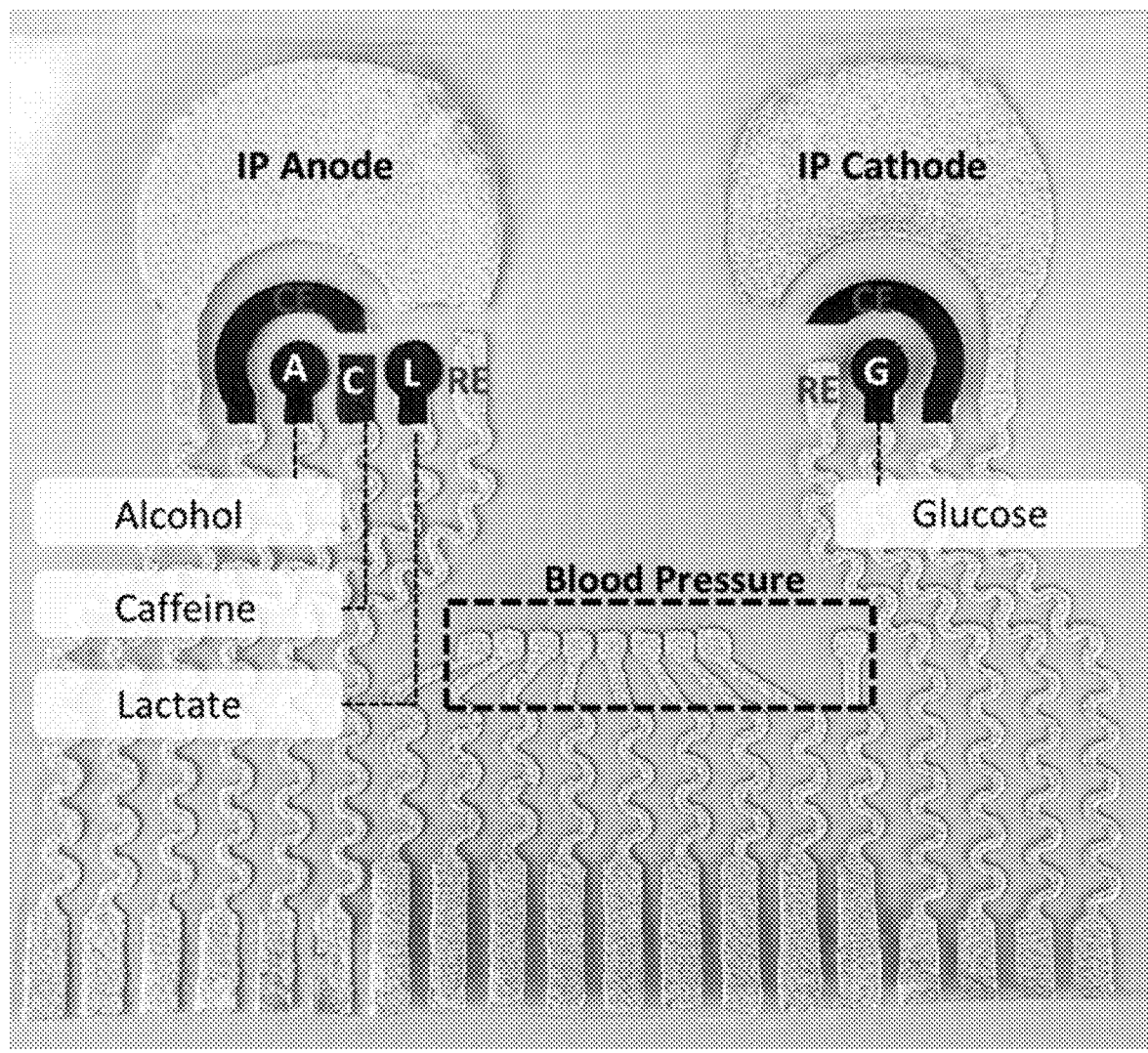
FIG. 39A shows a diagram depicting the design of an example embodiment of a wearable, integrated acoustic-electrochemical sensor device, in accordance with the present technology, for the simultaneous monitoring of blood pressure along with sweat alcohol, caffeine and lactate, and ISF glucose chemical markers.
Figure 39B:
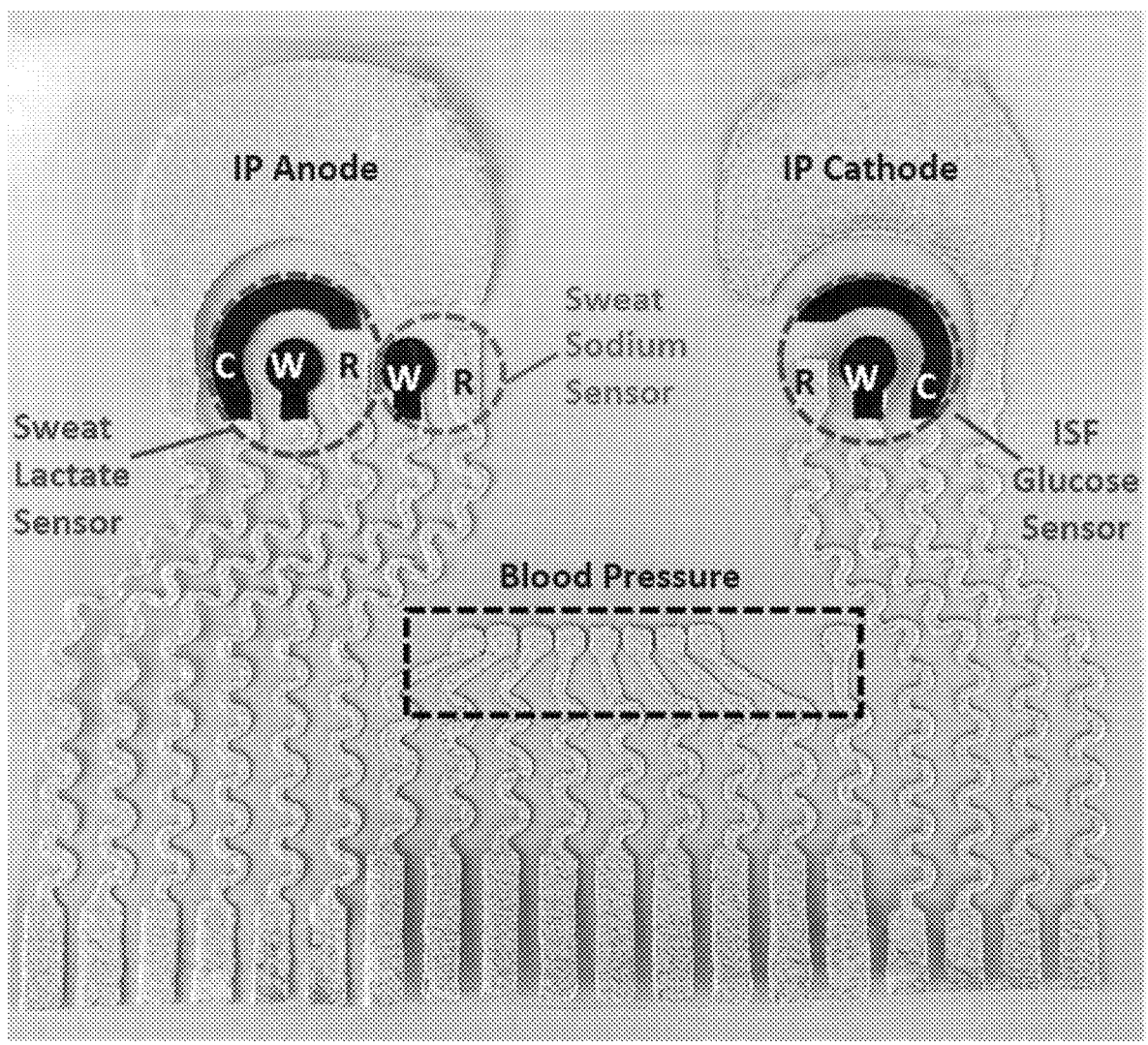
FIGS. 39B-39G shows diagrams and data plots depicting the design of an example embodiment of a wearable, integrated acoustic-electrochemical sensor device, in accordance with the present technology, for the simultaneous monitoring of blood pressure along with sodium and lactate from sweat and glucose from ISF for continuous, simultaneous monitoring of sepsis.
Figure 39C:
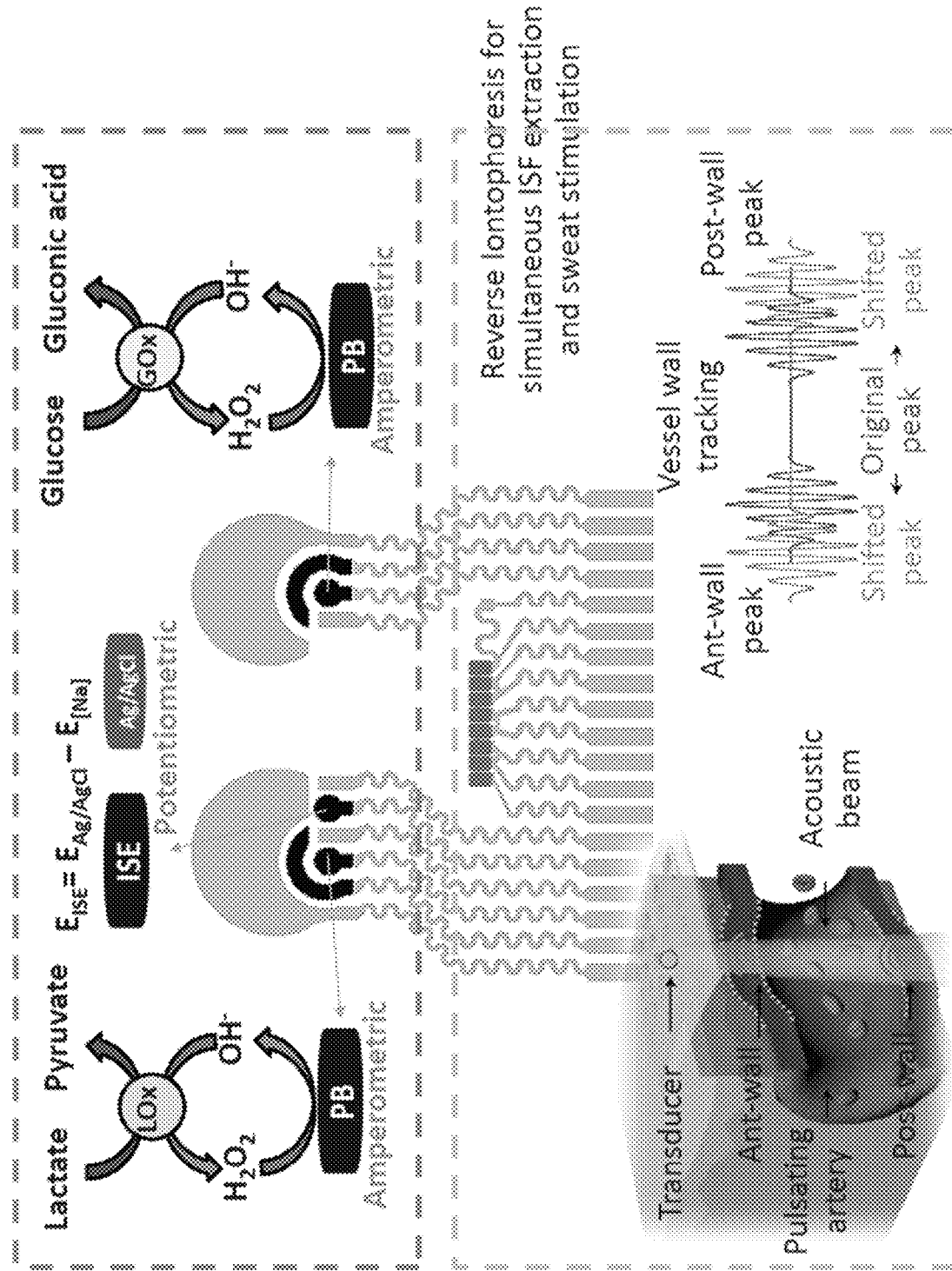
Figure 39D:
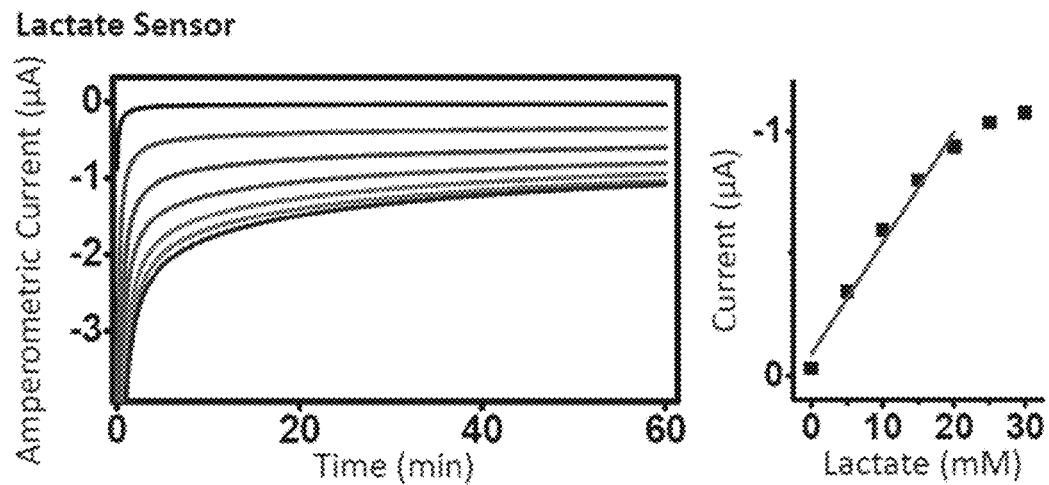
Figure 39E:
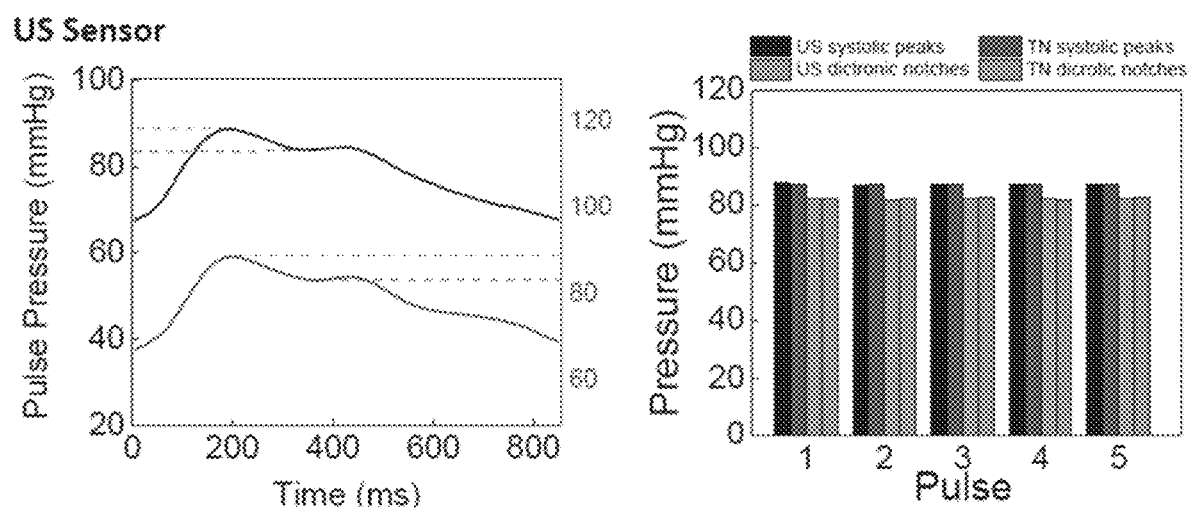
Figure 39F:
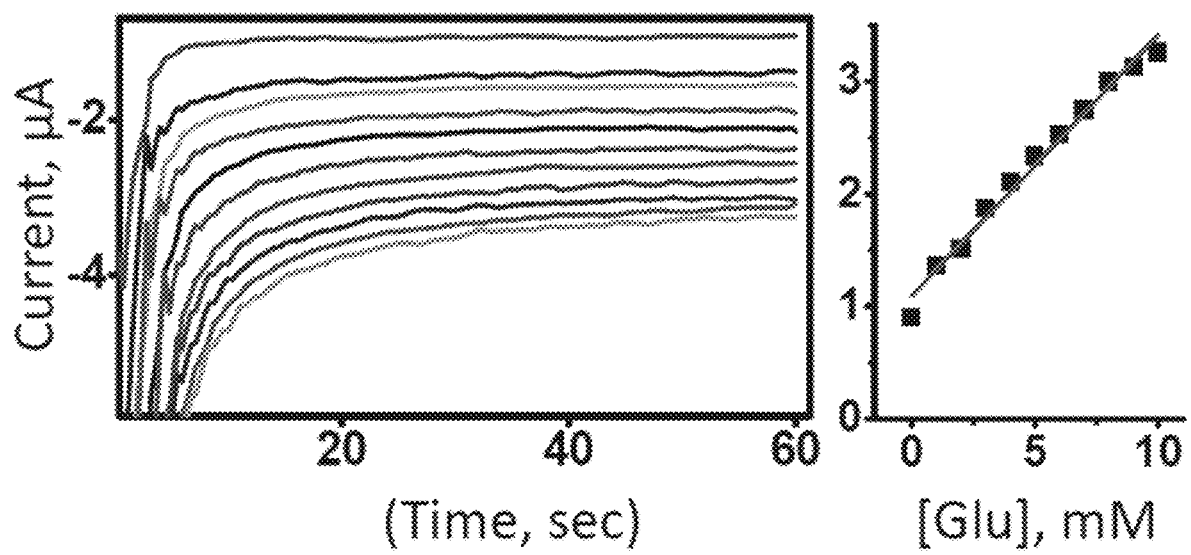
Figure 39G:
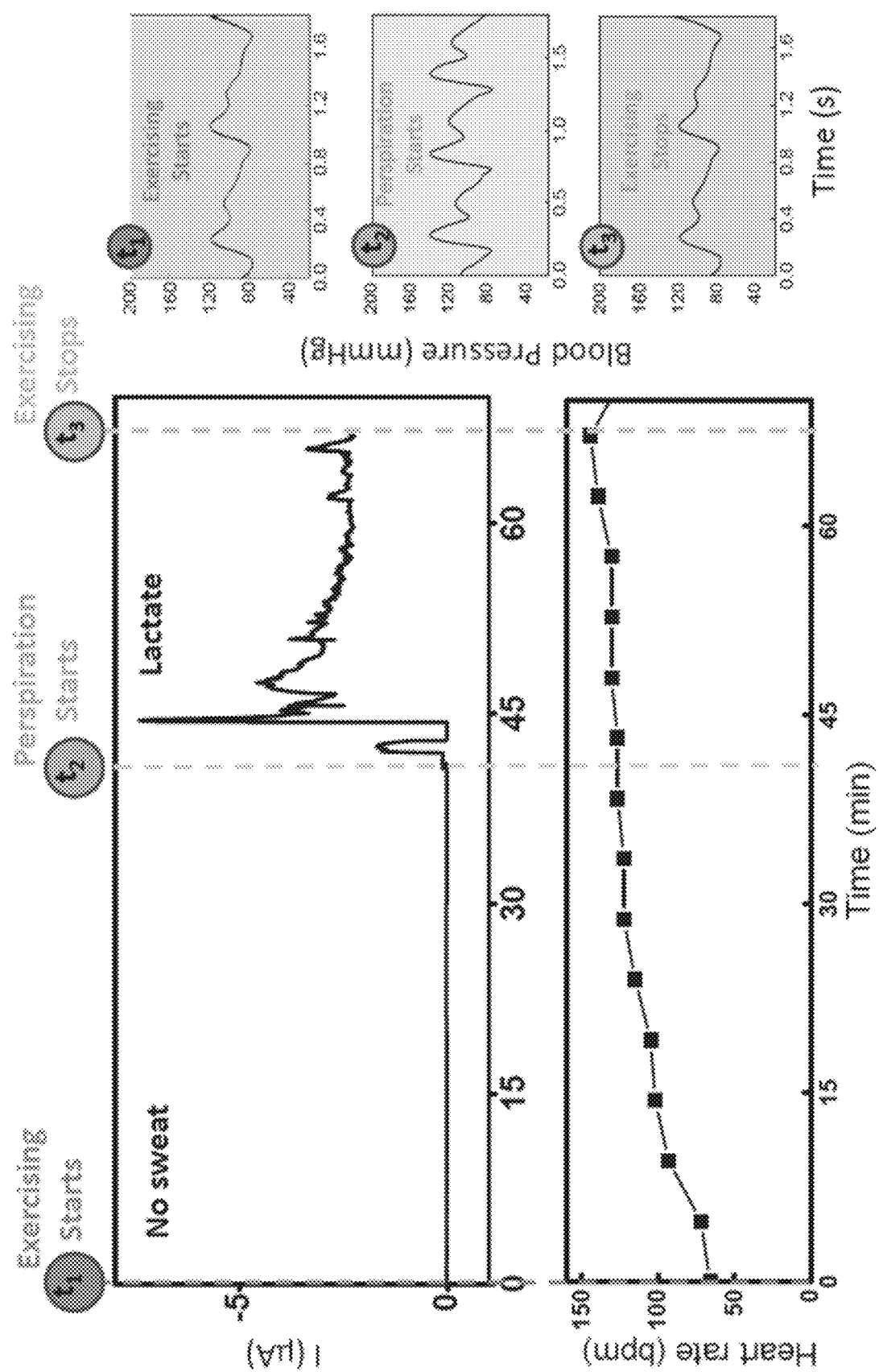
Figure 40:
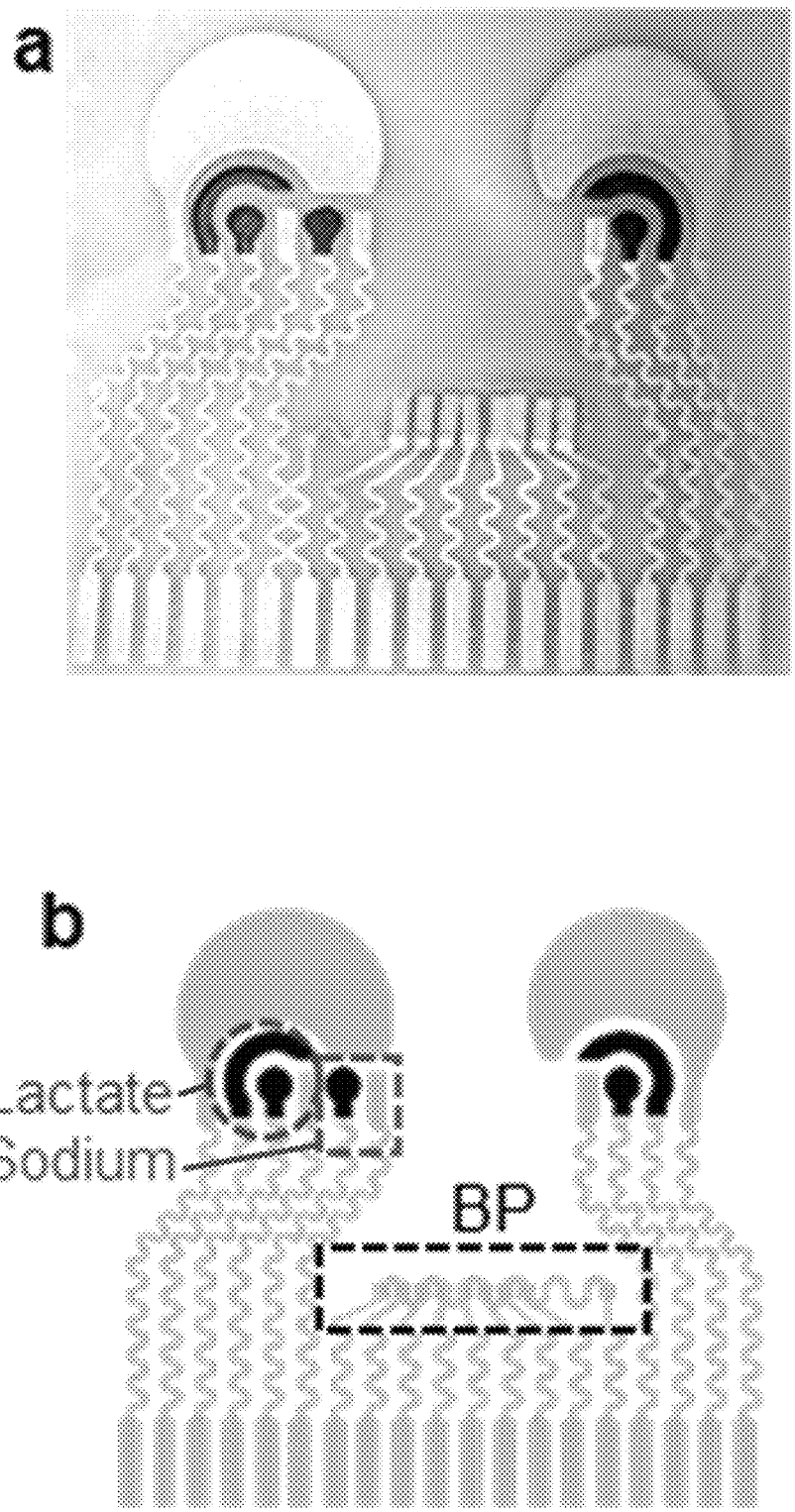
FIG. 40 shows an image and a diagram depicting a design of an example embodiment of a stretchable integrated blood pressure-electrochemical sensing patch device in accordance with the present technology for the simultaneous detection of sweat sodium and lactate, and blood pressure.

Additional example embodiments including patch designs are illustrated in FIGS. 39 and 40, which can be used for the simultaneous monitoring of BP and multiple sweat-based chemical markers (analytes), which are discussed later.

Figure 2C:
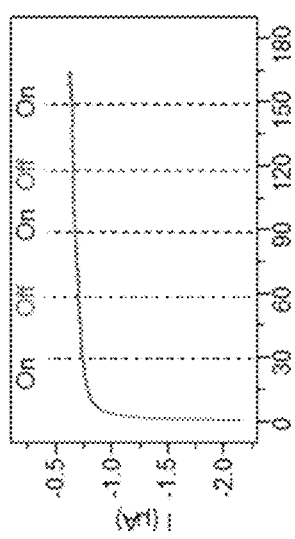
FIGS. 2A-2Q show diagrams, images and data plots depicting example implementations characterizing example embodiments of a multimodal wearable integrated acoustic-electrochemical sensor device in accordance with the present technology.
Figure 2B:
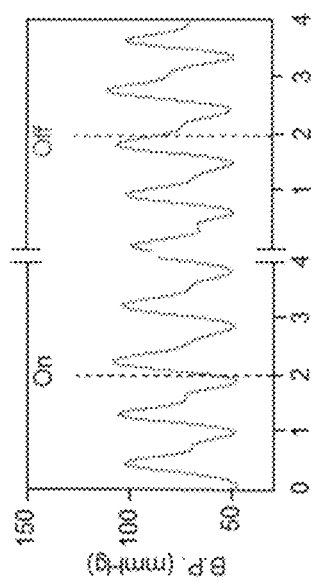

Example implementations were performed using some example embodiments of the disclosed electrochemical-ultrasonic transducer-based sensor technology, demonstrating simultaneously detection and monitoring one or more bio-analyte markers and one or more physiological markers.
Example Implementations of Wearable Acoustic-Chem Sensor Device Embodiments FIGS. 2A-2Q show diagrams, images and data plots depicting example implementations characterizing example embodiments of a multimodal wearable integrated acoustic-electrochemical sensor device.

Figure 2A:
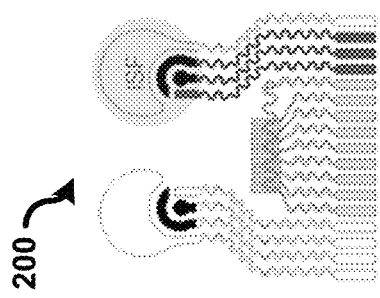

FIG. 2A shows an illustration of an example embodiment of the wearable acoustic-chem sensor device 100, shown as wearable acoustic-chem sensor device 200, highlighting the ISF analyte sensor contingent and physiological sensor contingent for signal interference crosstalk studies between the ISF electrochemical sensor and the BP sensor. The example wearable acoustic-chem sensor device 200 can include the one or more physiological sensors 110 comprising ultrasonic transducers, the one or more electrochemical sensors 120, and the contact sites 107 disposed on the flexible (bendable and/or stretchable) substrate 101, with and the interconnection wires 105 disposed on and/or in the flexible substrate 101, similar or the same as the example embodiment of the device 100 shown in FIG. 1A. FIG. 2B shows a data plot depicting the BP signal recording while applying and removing the CA detection potential. FIG. 2C shows a data plot depicting the ISF analyte electrochemical sensor signal recording while start and pausing ultrasound signal generation with 30 s intervals within 3 min.

Figure 2F:
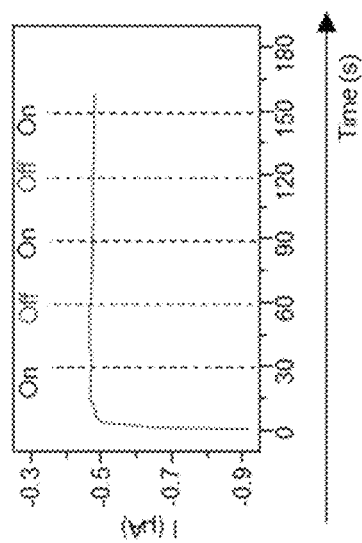
Figure 2E:
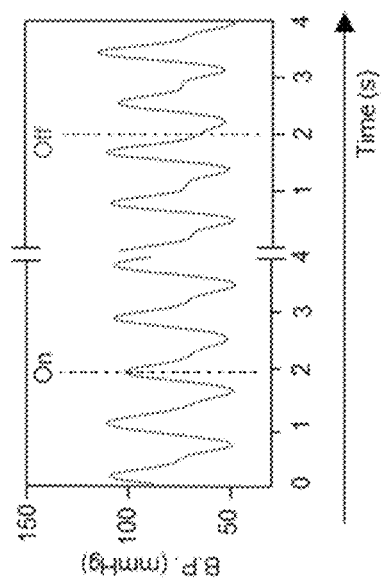
Figure 2D:
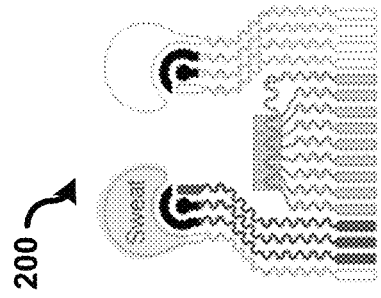

FIG. 2D shows an illustration of the example wearable acoustic-chem sensor device 200, highlighting the sweat analyte sensor contingent and physiological sensor contingent for signal interference crosstalk studies between sweat electrochemical sensor and the BP transducer. FIG. 2E shows a data plot depicting the BP signal recording while applying and removing the CA detection potential. FIG. 2F shows a data plot depicting the sweat analyte electrochemical sensor signal recording while start and pausing ultrasound signal generation with 30 s intervals within 3 min.

Figure 2G:
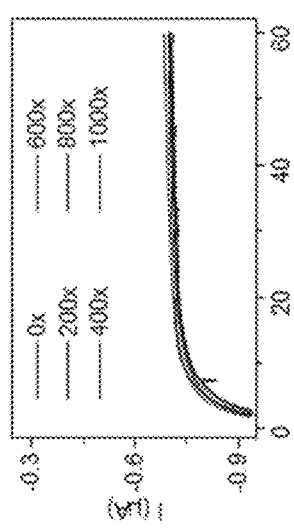
Figure 2H:
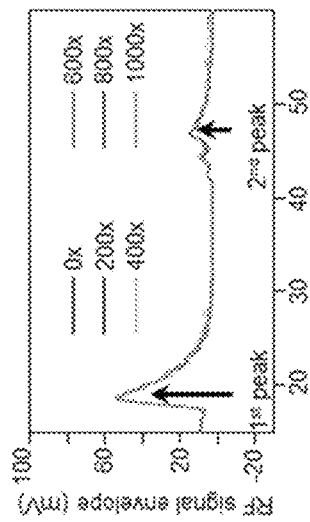
Figure 2I:
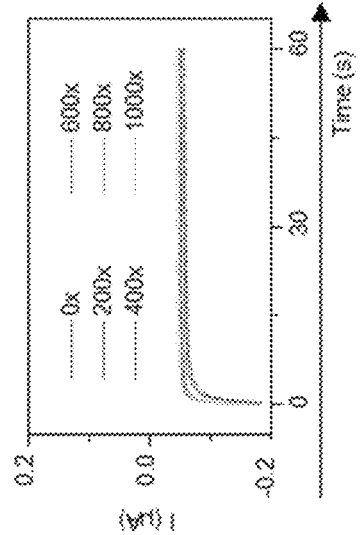

FIG. 2G shows photos of the example wearable acoustic-chem sensor 200 under 20% vertical strain. FIG. 2H shows a plot depicting envelopes of the raw echo signals before and after every 200 stretching cycles until 1000 cycles, and FIG. 2I shows a plot depicting the electrochemical response every 200 stretching cycles until 1000 cycles.

Figure 2J:
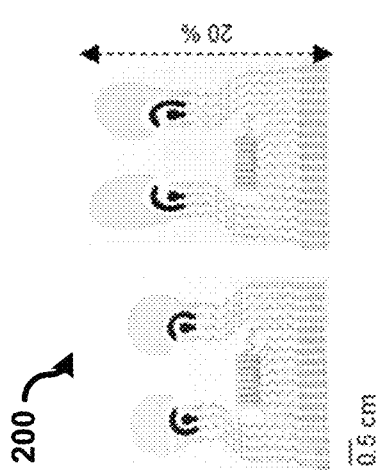
Figure 2K:
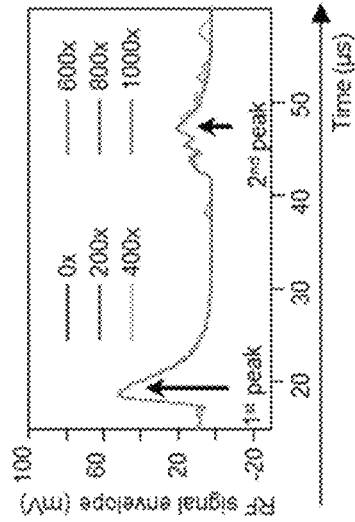
Figure 2L:
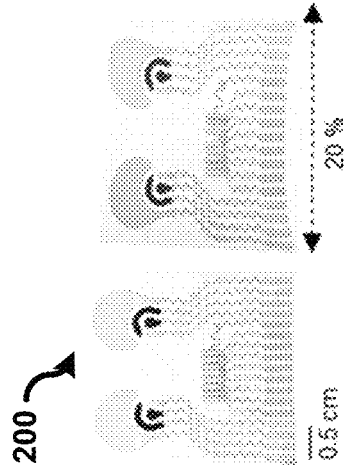

FIG. 2J shows photos of the example wearable acoustic-chem sensor 200 under 20% horizontal strain (RSD=1.09%). FIG. 2K shows a plot depicting envelopes of the raw echo signals before and after every 200 stretching cycles until 1000 cycles, and FIG. 2L shows a plot depicting the electrochemical response every 200 stretching cycles until 1000× (RSD=12.24%).

Figure 2M:
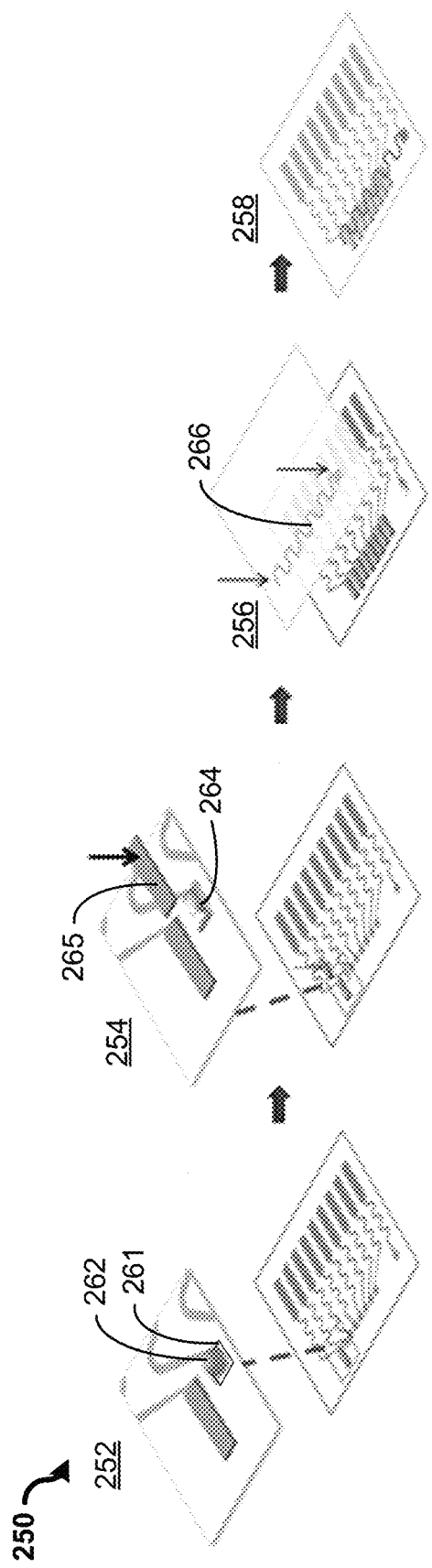

FIG. 2M shows an illustrative diagram depicting a fabrication method 250 of the example acoustic transducer of a physiological sensor contingent, e.g., the piezoelectric lead zirconate titanate (PZT) ultrasound transducer transfer process. The method 250 includes a process 252 to deposit (e.g., drop cast) an organic solvent 262 (e.g., toluene, xylene, benzene, cyclopentane, n-pentane, cyclohexane, cyclohexanone, ethylbenzene, acetone, methanol, ethanol, isopropanol, tetrahydrofuran, dimethyl sulfoxide, or the mixture thereof) on the electrode pad 261 to dissolve the material trace. The method 250 includes a process 254 to deposit a bonding material 264 (e.g., softened silver ink) for bonding with an acoustic transducer structure 265, which includes an acoustic transduction material, e.g., PZT, and to apply the acoustic transducer structure 265 on the bonding material 264. Other examples of an acoustic transduction material alternative to or in addition to PZT include lead magnesium niobate-lead titanate (PMN-PT) and/or polyvinylidene difluoride (PVDF). The method 250 includes a process 256 to deposit (e.g., drop cast) an organic solvent (e.g., toluene) on transducers for bonding with a ground wire 266. The method 250 includes a process 258 to binding the ground layer to a reserved electrode channel.

Figure 2N:
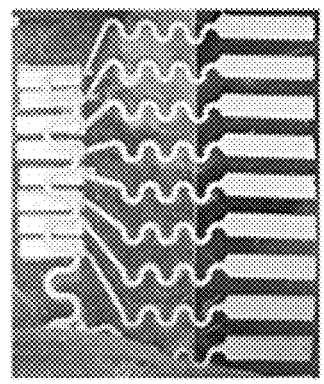
Figure 2N:
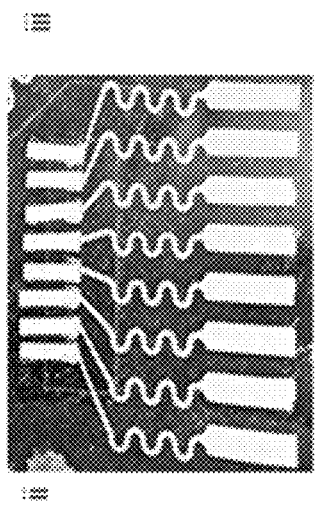
Figure 2N:
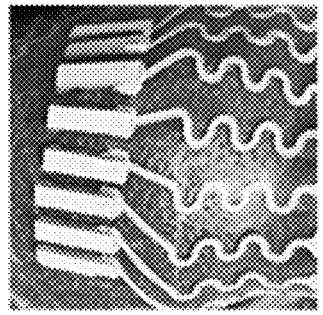
Figure 2Q:
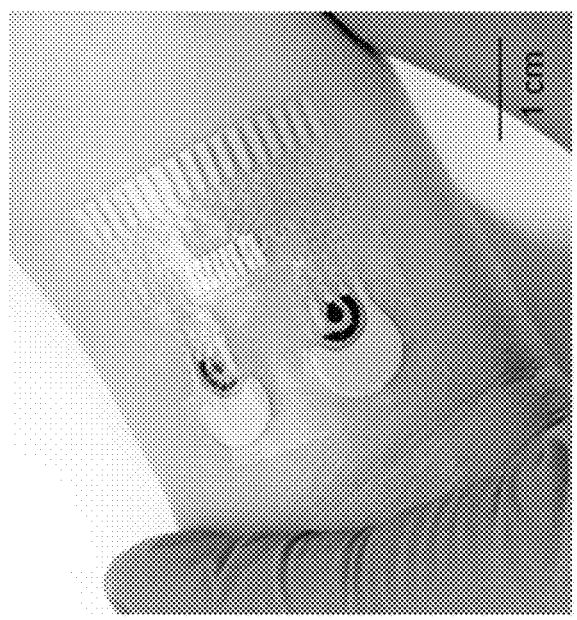

FIG. 2N shows images of an example acoustic transducer during an example implementation of the method 250, e.g., depicting the adhesion of a PZT transducers to the substrate. Photos (i), (ii), and (iii) of FIG. 2N shows images of the fabricated acoustic transducer component under indentation, during horizontal stretching, and after transferring the ground layer, respectively.

Figure 2P:
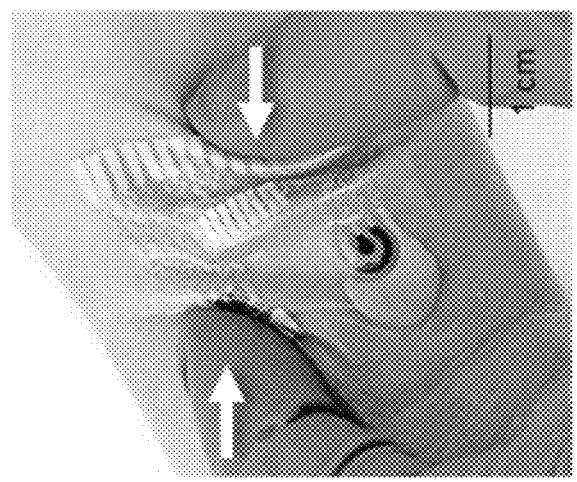
Figure 2O:
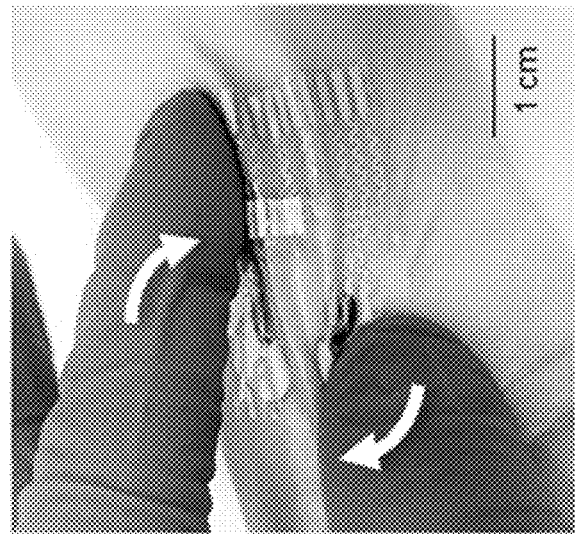

FIGS. 2O-2Q show images depicting skin conformability and mechanical integrity of an example wearable acoustic-chem sensor device while twisting (FIG. 2O), bending (FIG. 2P), and after these deformations (FIG. 2Q).

Crosstalk Study

Example implementations were performed to study potential crosstalk in the example wearable acoustic-chem sensor device 200. For example, the performance of an integrated sensor for multiplexed simultaneous sensing requires reliable data generation from the individual sensors, with no crosstalk between the two sensing modalities. Here, the signal crosstalk between the acoustic and electrochemical transducers of the wearable acoustic-chem sensor device 200 was prevented by spatially separating both components and using solid-state hydrogel materials for ultrasound and sensing layers; also see FIGS. 31 and 32. For example, unlike liquid gel, solid hydrogel layers will not smear at the interface and thereby prevents potential circuit shorting between the ultrasound transducer electrode and electrochemical sensing electrodes, i.e., prevents signal crosstalk. For example, the wearable acoustic-chem sensor 200 was designed with an optimal distance between the individual detection compartments to ensure successful acoustic BP and HR sensing, IP extraction, and electrochemical monitoring. For example, the optimal distance between the individual detection compartments can be configured in a range of 5 mm to several centimeters, and more preferably in a range between 100 mm to 1 cm or greater. In example implementations discussed below, an optimal distance was determined to be 1 cm. The distance can be determined based on the configuration of the iontophoretic electrodes to ensure the net flow of interstitial fluids to desired locations, for such embodiments that include one or more iontophoretic electrodes. Depending on the size of the sensor design and/or use of hydrogel material(s) for acoustic coupling the acoustic sensor to skin and/or for ISF extraction or sweat inducement, for example, the optimal distance between the ultrasound transducer and the iontophoretic extraction electrode can be above 0.1 cm, which can make sure no physical contact occurs between the ultrasound hydrogel and the sensing hydrogel during use.

As shown in FIG. 2A and FIG. 2D, the BP transducers were located 1 cm below the chemical sensors, a distance optimized by assessing the crosstalk between the neighboring sensors. In the example implementations, the signal generation of the acoustic sensor relies on high-voltage high-frequency pulses that may induce signal drift in the chemical sensors, while the IP extraction, potentiostatic sensing, and potential-sweep sensing may also induce noises in the acoustic signals.

Possible crosstalk effect between the electrochemical and BP sensors was evaluated by recording the corresponding signals during on-body operations. The BP signals were acquired while the potentiostatic electrochemical input was turned on and off repeatedly to assess the effect of the electrochemical sensing of the anodic sensor (e.g., see data plot of FIG. 2E and FIG. 29) and cathodic sensor (e.g., see data plot of FIG. 2B) on the BP signal. Similarly, the effect of the acoustic sensing on both sides of the electrochemical sensing was examined by recording the amperometric response while turning the acoustic pulses on and off repeatedly every 30 s (FIG. 2C, 2F). Notably, for example, without optimization as in the disclosed embodiments in accordance with the present technology, the electrochemical detection was subject to substantial signal interference due to the potential drift caused by the biased voltage from the acoustic pulses, e.g., depicted in data plots discussed later in connection with FIGS. 30 and 31.

Mechanical Performance

Example implementations were performed to study mechanical performance of the example wearable acoustic-chem sensor device 200. For example, the mechanical stability is another crucial factor that dictates the reliability of skin-worn sensors when tensile deformations are expected. The impedance of the chemical sensor and the contact resistance to the PZT transducers may vary with the strain applied to the soft conformal device leading to changes in the measured signals that affect the reliability of the device. The stability of the PZT contact upon mechanical stress was realized by developing a novel solvent-soldering method, i.e., the method 250, which is illustrated in FIG. 2M, e.g., based on the fast dissolution and room-temperature curing of SEBS-based materials. During the assembly process, the PZT transducers can be quickly mounted and bonded onto the SEBS substrate and connected to the SEBS-based stretchable silver ink by wetting the electrode surface with toluene. The solvent soldered PZT chips can thus be securely bonded to the printed electrodes without delamination during stretching deformations (as shown in FIG. 2N), with their assembly efficiency largely improved.

The effects of stretching on the sensing performance were assessed by stretching tests at 20% uniaxial strain. The example device was stretched repeatedly along the vertical direction (FIG. 2G) and horizontal direction (FIG. 2J). The ultrasonic echo signals, against a two-layered ECOFLEX, and the current (CA signal) from the bare PB electrode (held at −0.2V), in buffer solution, were recorded after every 200 cycles of stretching at 20% strain. As shown in FIGS. 2H and 2K, although the intensity of the acoustic transducer signal decreased slightly with stretching, the temporal relationship between each peak that corresponded to two echoes did not change, and hence the deformations did not affect the recorded waveform. Similarly, the electrochemical sensors did not show significant current change as the stretching cycle progressed (FIGS. 2I, 2L, and FIGS. 17 and 18).

The example wearable acoustic-chem sensor device has also shown good mechanical resilience after transferring it to the body. FIGS. 2O-2Q illustrate the twisting and bending of the sensor on the skin. Mechanical resilience tests were performed also during active 20% stretching deformation. The bare and enzyme-modified electrochemical sensors were evaluated in vitro while under stress in the horizontal and vertical directions, and the BP device was used to capture the signal while turning the neck 90°; the glucose response did not change after or during the 100× stretching (e.g., discussed later in connection with data plots of FIGS. 20, 21, and 22). The SEM images depicting the surfaces' structural changes of the printed stretchable silver and carbon traces are displayed in FIG. 19, demonstrating that the printed composites are not affected by the mechanical deformation.

Tracking Cardiovascular Activities and Biomarker Levels

Example implementations were performed to track cardiovascular activities and biomarker levels using the example wearable acoustic-chem sensor device 200. For example, the ability of the wearable acoustic-chem sensor device to simultaneously monitor dynamic cardiovascular parameters and biomarker concentrations allows evaluating the effects of common daily activities on an individual's physiological status and to continuously collect data about their response to such everyday activity. For example, the levels of lactate, glucose, alcohol, and caffeine in our bodies can fluctuate due to common daily activities, whose impact on our BP also varies based on an individual's physical conditions. The simultaneous measurement of biomarkers and BP allows the data collection of an individual's responses to such daily activities. The device's ability to track multiple biomarkers while capturing cardiac parameters can further help deconvolute the additive effects of multiple stimuli on physiological parameters, which holds significant implications towards self-monitoring for personalized health management. In order to study the effects of each activity upon the cardiac parameters, measurements were performed before and after the stimulus. Tests were performed by monitoring BP along with key sweat and ISF biomarkers, corresponding to specific medical situations.

Exercise, comprising any action which demands physical efforts, has a major impact on the body's physiological response, including changes in lactate levels, HR, and BP. During prolonged exercising, blood and sweat lactate levels elevate due to metabolic stress, HR increases to meet the muscle demand for oxygen, while BP surges due to increased availability of vasodilatory mediators such as nitric oxide. To study these effects, in the example implementations, several volunteering subjects were asked to perform stationary cycling at a fixed level for 30 min, followed by 20 min of resting. BP was recorded while the sweat was stimulated before and after the exercise for the lactate measurements, and the obtained BP and lactate level data were validated by a commercial cuff-style blood pressure monitor and a blood lactate meter.

FIGS. 3A-3D show data plots depicting example data for an on-body evaluation of the example hybrid acoustic-electrochemical sensor device 200. FIG. 3A shows data associated with the BP/HR and sweat lactate studies, including signal recording for BP/HR performance before exercise (i) and after exercise (ii), bar graphics represent the sensor validation using a commercial cuff (white) and BP readings obtained with the ultrasound transducers (green) (plot (iii)), signal recording for sweat lactate before exercise (iv) and after exercise (v), and bar graphics represent the sensor validation using a commercial blood lactate meter (white) and readings obtained with the electrochemical sensor (green) (in plot vi)). FIG. 3B shows data associated with the BP/HR and sweat alcohol studies, including signal recording for BP/HR performance before alcohol intake (i) and after alcohol intake (ii), bar graphics represent the sensor validation using a commercial cuff (white) and BP readings obtained with the ultrasound transducers (blue) (plot (iii)), and signal recording for sweat alcohol before alcohol intake (iv) and after alcohol intake (v), bar graphics represent the sensor validation using a commercial breathalyzer (white) and readings obtained with the electrochemical sensor (blue) (plot (vi)). FIG. 3C shows data associated with the BP/HR and ISF glucose studies. Signal recording for BP/HR performance before food intake (i) and after food intake (ii), bar graphics represent the sensor validation using a commercial cuff (white) and BP readings obtained with the ultrasound transducers (red) (plot (iii)), signal recording for ISF glucose before food intake (iv) and after food intake (v), bar graphics represent the sensor validation using a commercial blood glucometer (white) and readings obtained with the electrochemical sensor (red) (plot (vi)). FIG. 3D shows data associated with the BP/HR and sweat caffeine studies, including signal recording for BP/HR performance before caffeine intake (i) and after caffeine intake (ii), bar graphics represent the sensor validation using a commercial cuff (white) and BP readings obtained with the ultrasound transducers (orange) (plot (iii)), signal recording for sweat caffeine before caffeine intake (iv) and after caffeine intake (v), bar graphics represent the sensor validation through the standard addition method (white) and readings obtained with the voltammetric sensor (orange) (plot (vi)).

As expected, significant changes in BP and HR were thus observed in FIG. 3A after the exercise, increasing up to 150 mmHg and 98 bpm, respectively (FIG. 3A at plots (i) and (ii)). Sweat lactate also increased, with low lactate levels recorded in the beginning and increased two-fold after the exercise (FIG. 3A at plots (iv) and (iv)). The BP and sweat lactate data collected from the device agreed well with the validation methods, as shown in FIG. 3A at plots (iii) and (vi). It is worth noting that as no exogenous drugs are used to affect the subject's BP, the relaxation and contraction of the elastine- and collagen-rich central arteries due to exercise can be considered negligible, and hence no additional recalibration of the acoustic sensor was needed during the experiment.

As another commonly seen unhealthy stimulus—excessive alcohol consumption—has shown to increase cardiovascular risks via alcohol-induced hypotension and hypertension. Alcohol may have different effects on the BP, depending on the amount and frequency of its consumption and genetic factors related to resistance or sensitivity to alcohol. BP variations upon alcohol ingestion are related to the direct vasodilation, surge in cortisol secretion, and reduced insulin sensitivity. For the sensor experiments focusing on alcohol as the stimulus, the BP and sweat alcohol level were measured before and 20 min after drinking 200 mL of an alcoholic beverage (19% vol.) (FIG. 3B). A commercial alcohol breathalyzer was used for correlation with blood alcohol level. As shown in FIG. 3B, the alcohol consumption resulted in an increased HR (from 69 to 85 bpm) and BP (120 to 136 mmHg) of the volunteer (FIG. 3B, plots (i) and (ii)). These results agree with studies showing that a single alcohol intake by non-heavy drinkers can lead to a temporary BP spike. It is worth noting that for heavy drinkers, there might be a considerable BP morning surge that greatly increases the risk of stroke. Simultaneously, the sensor allows reliable detection of sweat alcohol, as this small polar molecule can be found in sweat with a 1:1 correlation to blood (FIG. 3B, plots (iv) and (v)).

Metabolites, such as glucose, can also affect the BP waveform by changing the blood viscosity. Blood viscosity increases under conditions of insulin resistance, altering the flux of blood in the capillaries and hence the shape of the BP pulse. Studies have shown that subjects with high blood pressure are prone to significantly higher blood glucose levels. To test the effect of the rise in glucose upon the BP, healthy non-diabetic subjects were asked to consume a high sugary meal after fasting. The BP and ISF glucose levels were recorded using the device before and 15 min after consuming the food, with the glucose level validated using a commercial glucometer at both times. As shown in FIG. 3C, plots (i) and (ii), the sensor evaluation, during the food consumption experiment, resulted in negligible changes in the BP and HR. In contrast, the electrochemical biosensor readily detected changes in the ISF glucose levels after the meal consumption (FIG. 3C, plots (iv) and (v)). This data is within the expectation for the non-diabetic subject, as glucose-induced BP changes occur only when glucose levels increase significantly to alter the blood pumping through the arteries, which is not common for non-diabetic individuals whose glucose is readily regulated by the responsive release of insulin.

Figure 34:
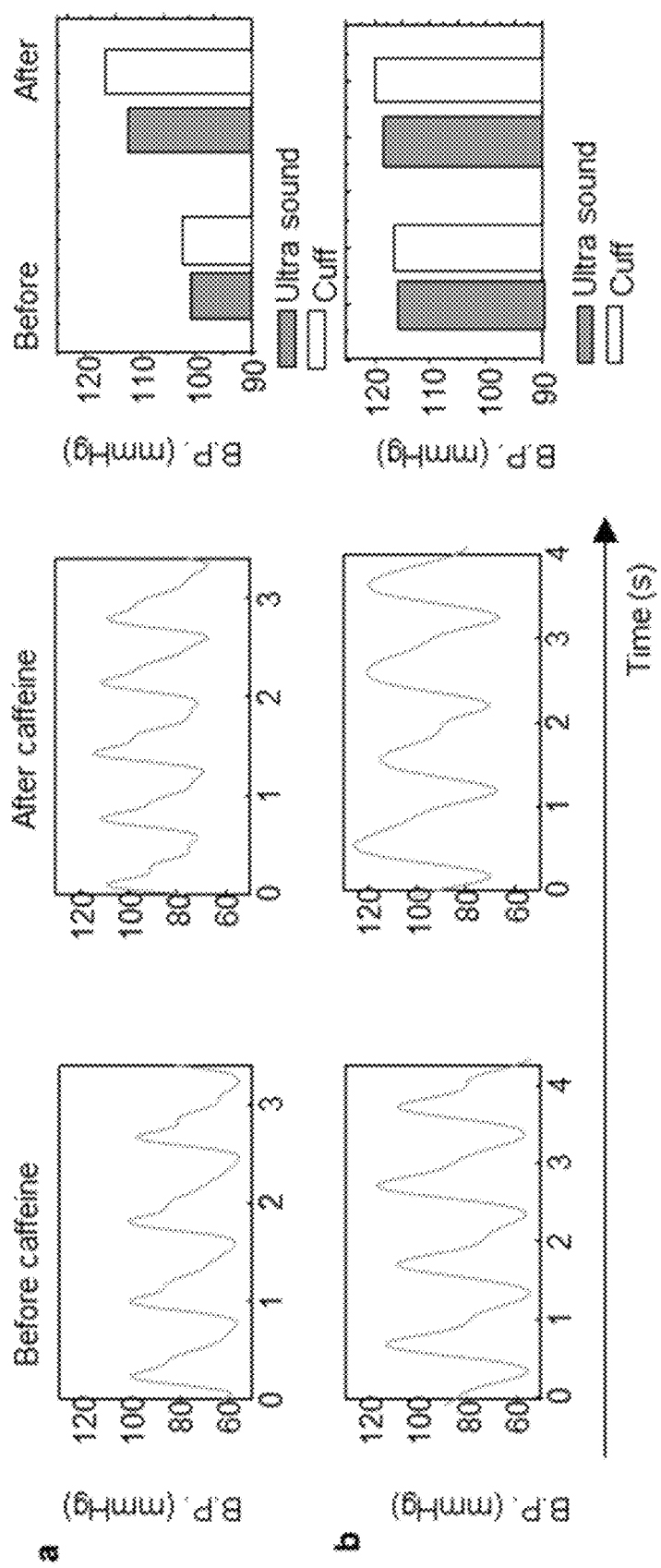
FIG. 34 shows data plots depicting an on-body evaluation of an example wearable acoustic-electrochemical sensor device for caffeine intake.

Lastly, caffeine was chosen as another chemical stimulus commonly used in many people's daily lives. Caffeine-intake is known to lead to an increased BP through the inhibition of the adenosine receptor and release of stress hormones, such as norepinephrine or cortisol. These biochemical changes can result in transient contractions of the arterial smooth muscle and influence the vascular tone by phosphodiesterase inhibition. The effect of caffeine on the BP varies, and are shown to be more pronounced in hypertensive subjects. The epidermal BP/caffeine sensor patch was evaluated on subjects with and without caffeine-intake habits, and their BP and sweat caffeine were measured before and 30 min after consuming a caffeine-rich (e.g., 80 mg) sugar-free energy drink. The amount of caffeine in sweat was validated through a standard additions voltammetric method, spiking caffeine to a collected sweat sample (e.g., shown and discussed later in connection with FIG. 24). As illustrated in FIG. 34, the on-body tests on a subject with habitual caffeine-intake showed no significant changes in the BP and HR after consumption of high caffeine doses, reflecting the caffeine tolerance and healthy blood pressure levels of the volunteer. In contrast, the BP variation was more pronounced for the subject with no habitual caffeine intake, as shown in FIG. 3D. The caffeine sensor displayed a flat DPV baseline response prior to the caffeine intake, whereas the sweat DPV recorded 30 min after the caffeine intake showed a distinct anodic peak current at 1.2 V, corresponding to the caffeine oxidation (FIG. 3D, plots (iv) and (v)). Current levels before and after the caffeine intake were compared against the results obtained through the standard additions method for caffeine, showing a good correlation between both parameters (FIG. 3D, plot (vi)). Note that the in vitro electrochemical characterization of the caffeine sensor in pH 4.5 showed current peaks around 1.1 V, e.g., shown and discussed later in connection with FIG. 14. Such small potential shift reflects the use of acetate-buffer loaded agarose gel over the caffeine sensor for minimizing the effect of fluctuating sweat pH between 4.5-7.0.

Device Monitoring Multiple Stimuli

The example implementations included evaluation of the example wearable acoustic-chem sensor device 200 in real-life scenarios, where people usually experience multiple activities that may have synergistic or counteracting effects on the body's physiological response. The use of the example device 200 for monitoring cardiovascular parameters along with multiple biomarker levels was evaluated on subjects exposed to multiple stimuli. A common example of counteracting effect to the glucose levels is exercising along with food intake, as glucose can be quickly consumed during exercise to produce energy. Exercise is also expected to increase the BP and lactate levels in the subject, as was shown in previous single-stimuli tests. To study this scenario, the subject was asked to consume a sugar-rich meal, followed by exercising on a stationary bike for 30 min, with the ISF glucose, sweat lactate, and BP monitored before and after each step.

Figure 4A:
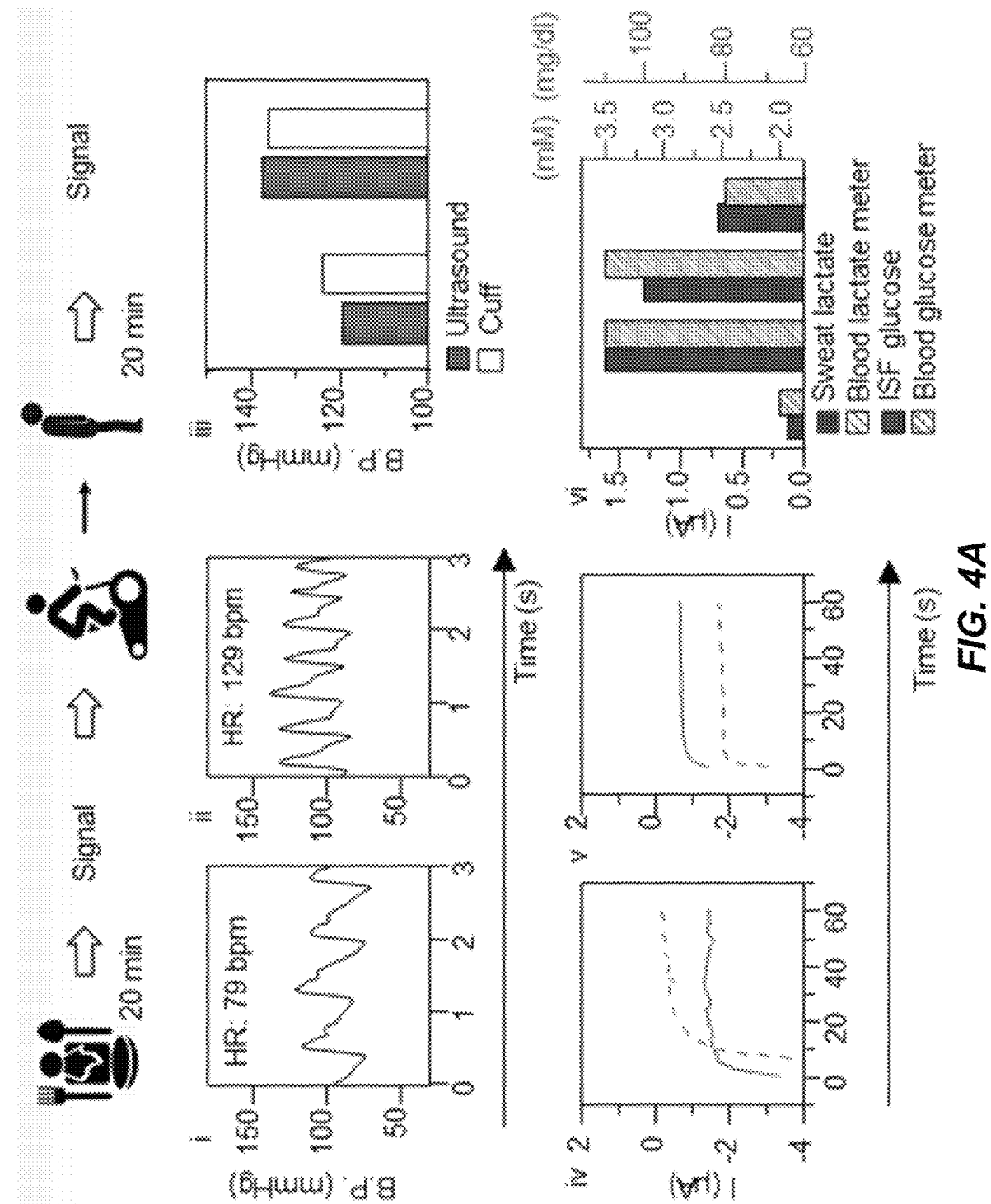
FIGS. 4A and 4B show data plots depicting example results from an evaluation of a lactate, glucose, blood pressure sensor performance and an alcohol, glucose, blood pressure sensor performance, respectively, using an example embodiment of a wearable acoustic-electrochemical sensor device in accordance with the present technology.
Figure 4B:
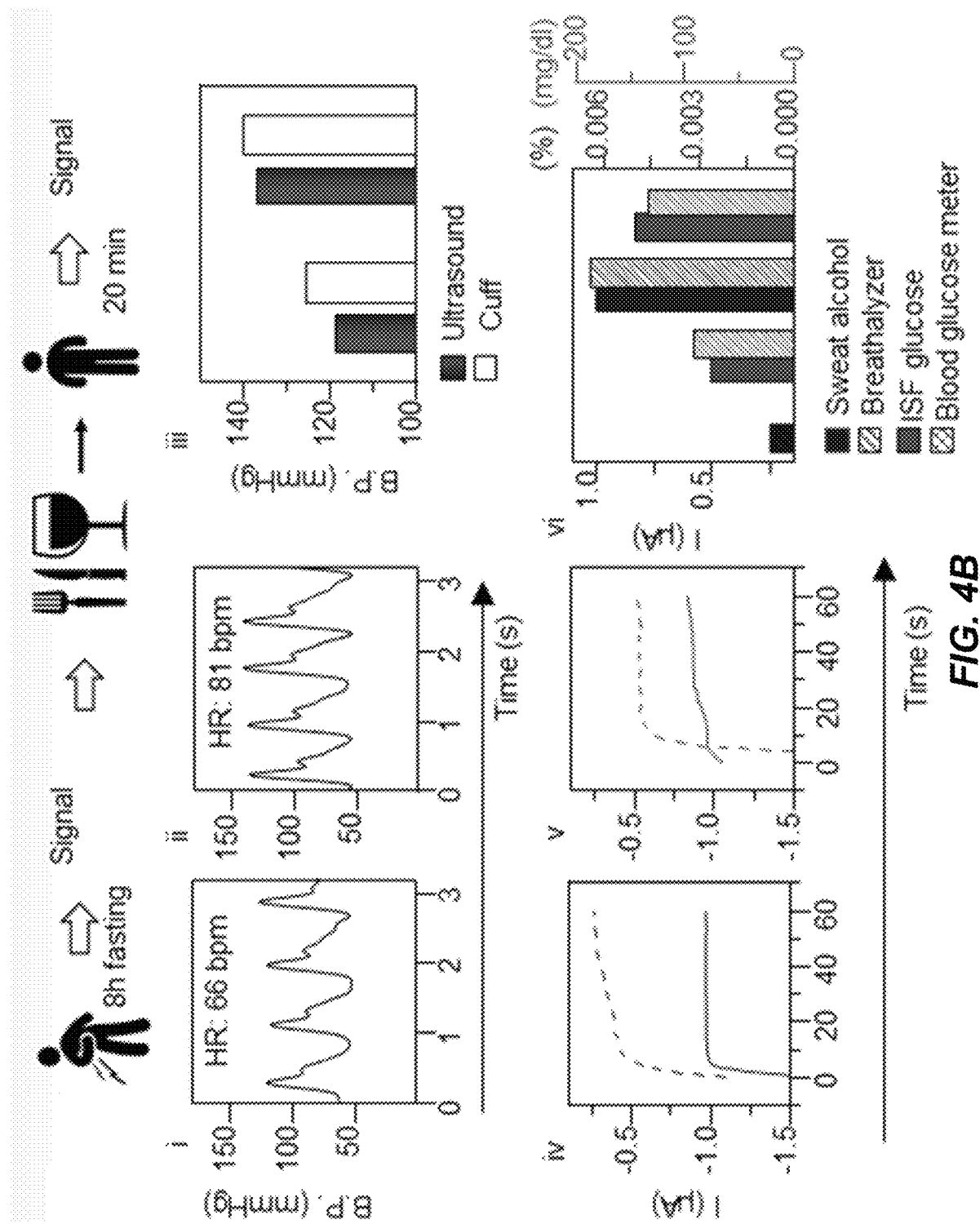

FIGS. 4A and 4B show data plots depicting example results from an evaluation of a lactate, glucose, BP sensor performance and an alcohol, glucose, BP sensor performance, respectively, using an example embodiment of the wearable acoustic-chem sensor device 200. FIG. 4A shows BP/HR signal recordings before exercise (plot (i)) and after exercise (plot (ii)), bar graphic comparison between BP signal using a commercial cuff (white) and the ultrasound transducer (green/red) (plot (iii)), electrochemical sensor signal recordings for sweat lactate before (dotted line) and after (solid line) exercising (plot (iv)), electrochemical sensor signal recordings for glucose after having a meal and before exercising (dotted line) and after exercise (solid line) (plot (v)), and a bar graphic comparison between lactate levels in sweat using the electrochemical sensor (green solid) and a commercial blood lactate meter (green/white), glucose levels in ISF using the electrochemical sensor (red solid) and blood using a blood glucose meter (red/white) (plot (vi)). FIG. 4B shows BP/HR signal recordings before (plot (i)) and after (plot (ii)) food and alcohol intake, bar graphic comparison between BP signal using a commercial cuff (white) and the ultrasound transducer (blue/red) (plot (iii)), electrochemical sensor signal recordings for sweat alcohol before alcohol intake (dotted line) and after alcohol intake (solid line) alcohol intake (plot (iv)), electrochemical sensor signal recordings for ISF glucose before food intake (dotted line) and after food intake (solid line) (plot (v)), and a bar graphic comparison between alcohol levels in sweat using the electrochemical sensor (blue solid) and a commercial breathalyzer (blue/white), glucose levels in ISF using the electrochemical sensor (red solid) and blood using a blood glucose meter (red/white) (plot (vi)).

As shown in FIG. 4A, normal systolic BP level, high glucose levels (e.g., >100 mg/dL) and low lactate levels were observed before the biking activity. After the exercise, glucose levels decreased, accompanied by a considerable increase in the BP, HR, and lactate level, as predicted from previous tests. Control experiments—performed without any food or exercise—were used to corroborate that the change in signal resulted solely from the increase of lactate and glucose levels (e.g., shown and discussed later in connection with FIG. 37). Overall, FIG. 4A illustrates that the new sensor is able to capture the complex processes resulting from the simultaneous food and exercise stimuli, including the digestion of food to produce glucose as the energy reservoir, the glycolysis reaction consuming the glucose and oxygen to release energy, the increased BP and HR compensating for the oxygen depletion, and the lactate generation during the hypoxic condition in exercise.

The influence of the simultaneous intake of alcohol and glucose on the BP and HR, simulating a typical alcohol consumption during meals, was also studied on volunteering subjects. Based on previous observations, increasing glucose levels are not expected to cause significant changes in the BP of the subjects, whereas an increasing BP is expected after the alcohol intake. Therefore, an additive effect in the rise in BP and glucose is expected when combining the intake of alcohol and sugary food. Moreover, the digestion of alcoholic drinks, along with the reduced insulin sensitivity caused by alcohol consumption, can further aggravate the increase in the glucose level and BP. On the other hand, excessive alcohol intake can lead to severe hypoglycemia and hypotension, even when combined with glucose intake, particularly for insulin-dependent diabetes subjects. Therefore, the simultaneous monitoring of glucose and BP is important for distinguishing the case of moderate or excessive drinking and preventing drinking-induced accidents, especially for subjects with underlying health conditions. Sweat alcohol, ISF glucose, and BP signals were recorded in the fasting state, after the alcohol consumption, and after the food intake. As shown on FIG. 4B, plots (iv) and (vi), before any food or alcohol consumptions, blood glucose and alcohol showed a typical non-diabetic fasting state reading of 90 mg/dL glucose and a 0% BAC level, whereas increasing BP, glucose, and alcohol signals were observed for 20 min after the stimuli. The observed increase in BP following the alcohol intake alone was 16 mmHg (FIG. 3B, plot (iii)), rising further to 20 mmHg after the concurrent intake of sugary food (FIG. 4B, plot (iii)). Such BP variations demonstrate the synergetic effect of combining alcohol and glucose intakes on the BP. Smaller changes in HR were observed following the alcohol and food intakes as compared to the alcohol intake alone, indicating different mechanisms for the increased BP. Control experiments, carried out without intakes of food or drink, were used to corroborate that the observed signal changes were solely due to the increase of alcohol and glucose (e.g., shown and discussed later in connection with FIG. 38), as supported by early findings.

Continuous BP and Biomarker Monitoring

The ability of the sensor to capture the dynamic biomarker and BP fluctuations while performing physical activity was also demonstrated. Physically active individuals are expected to have lower resting BP, reducing considerably the risk of heart failure events. The lower resting BP can further be reflected in a smaller increase in BP during exercising, as physically active individuals signal the body earlier to release nitric oxide (NO) to promote enhanced vasodilation. Smaller increases in lactate levels are also expected for active individuals compared with non-active ones. BP is expected to decrease following intense exercise activity, eventually returning to its original value, regardless of the fitness level. Further, studies demonstrated a close relationship between the magnitude of the post-exercise BP decrease and the lactate levels, showing that elevated blood lactate levels after high-intensity exercise promotes larger differences between pre- and post-exercise BP values. Such complex dynamic processes thus require the hybrid sensor to operate continuously for capturing these real-time fluctuations throughout the activity. Subjects with different fitness levels (physically active and non-active) were asked to perform a 30 min cycling activity at constant intensity while wearing the device (during the whole experiment), and their BP and sweat lactate levels were monitored continuously until the exercise was stopped. IP was not used for this portion of the study, as sweat was generated spontaneously from the activity. Validation data were also recorded before, 10 min into, and after the exercise.

Figure 5A:
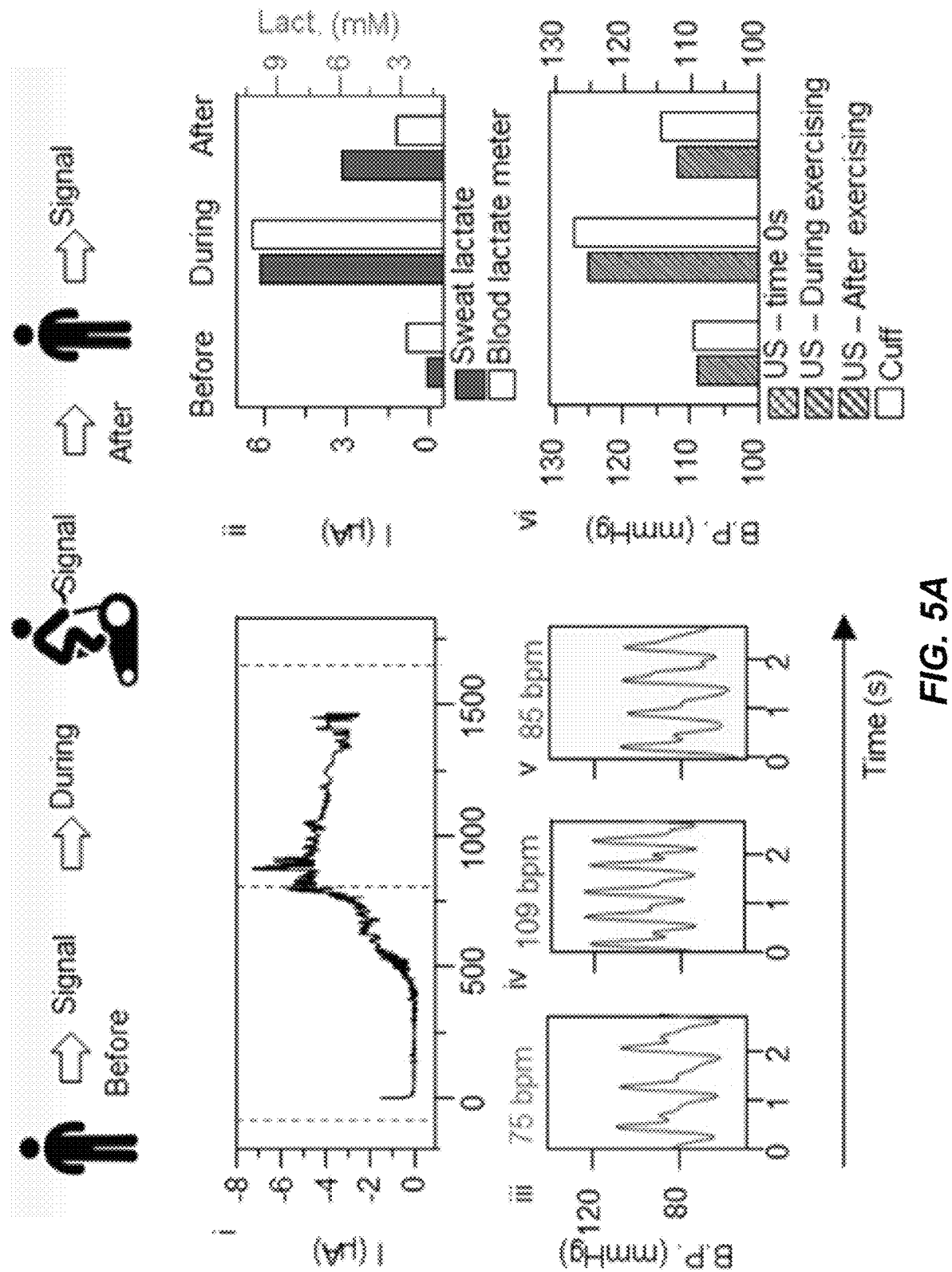
FIGS. 5A and 5B show data plots depicting example results of an evaluation of continuous lactate, blood pressure, heart rate sensor performance for an actively fit volunteer and for a sedentary volunteer, respectively, using an example embodiment of a wearable acoustic-electrochemical sensor device in accordance with the present technology.
Figure 5B:
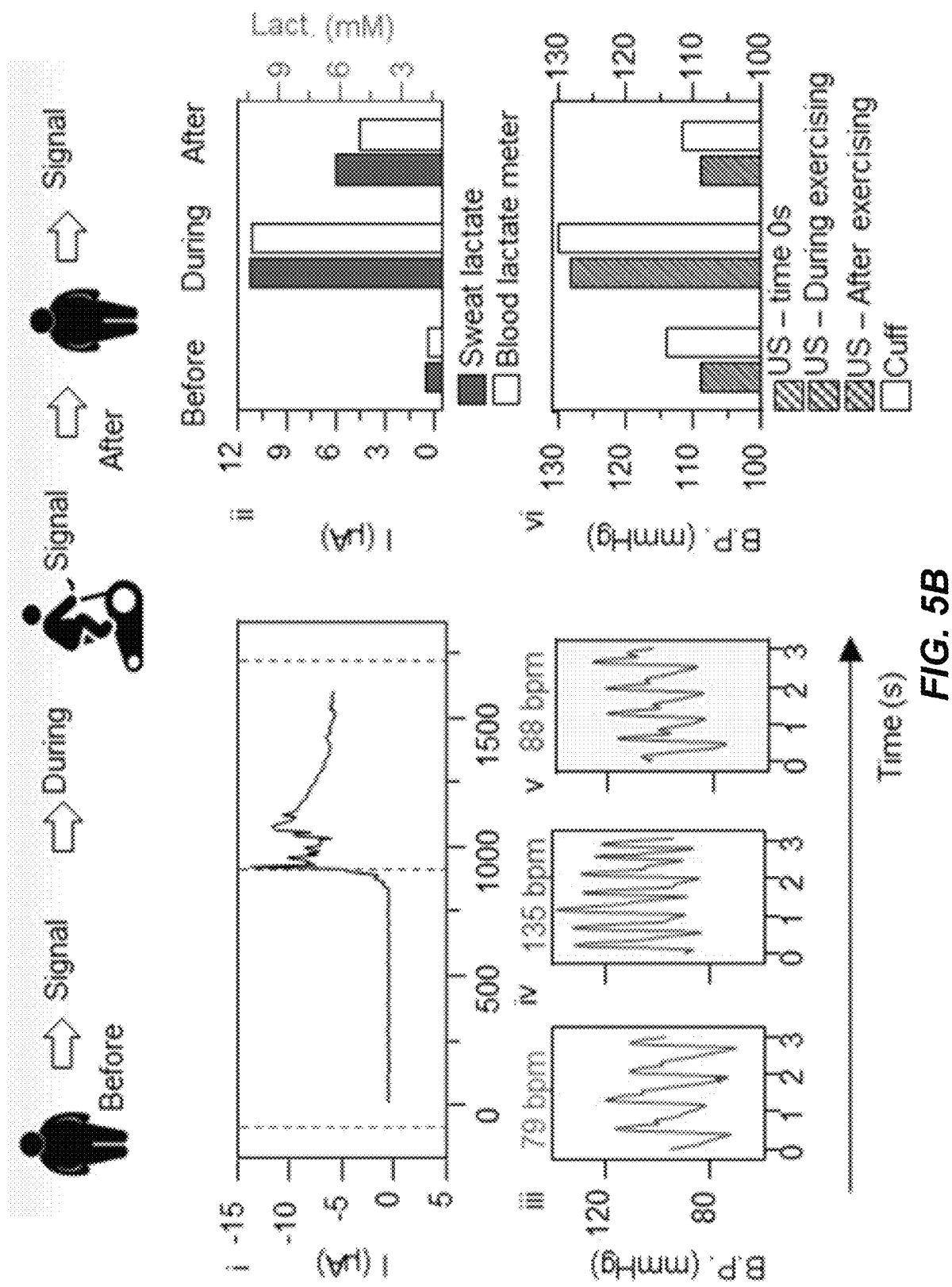

FIGS. 5A and 5B show data plots depicting example results of an evaluation of continuous lactate, BP, HR sensor performance for an actively fit volunteer and for a sedentary volunteer, respectively, using an example embodiment of the wearable acoustic-chem sensor device 200. FIG. 5A shows continuous lactate/BP/HR performance for an actively fit volunteer, including continuous signal recordings showing sweat lactate profile during stationary biking (plot (i)), bar graphics showing validation using a commercial blood lactate meter (white) and electrochemical sensor readings (green) (plot (ii)), BP/HR signal recordings before stationary biking (plot (iii)), during stationary biking (plot (iv)), and after stationary biking (plot (v)), and a bar graphic comparison between BP signal using a commercial cuff (white) and the ultrasound before (green), during (red), and after (purple) of the exercise performance (plot (vi)). FIG. 5B shows continuous lactate/BP/HR performance for sedentary volunteer, continuous current recording showing sweat lactate profile during stationary biking (plot (i)), bar graphics showing validation using a commercial blood lactate meter (white) and electrochemical sensor readings (green), (plot (ii)), BP/HR signal recording before stationary biking (plot (iii)), during stationary biking (plot (iv)), and after stationary biking (plot (v)), and a bar graphic comparison between the BP signal of a commercial cuff (white) and the ultrasound before (green), during (red), and after (purple) of the exercise activity (plot (vi)).

As shown in FIG. 5A (for the physically active subject) and FIG. 5B (for the sedentary subject), a considerably higher sweat lactate level and increased BP values were observed during the exercise for the sedentary subject compared to the active subject. Higher HR, BP, and sweat lactate levels are expected during exercise for the non-active subjects due to the elevated catecholamine levels compared to physically active subjects, leading to differences in BP depending on the fitness levels and cardiovascular system. To address the potential effect of sweat electrolytes upon the activity of the Prussian Blue transducer, a sufficiently negative applied potential ($-0.2$ V) was used, which accommodates small possible shifts in the PB peak potential (e.g., shown in a data plot of FIG. 43). An example embodiment of an advanced patch design, shown in FIG. 40, demonstrated it was able to perform parallel potentiometric measurements of sweat electrolyte levels for correcting the electrolyte effect. Example on-body data is shown in FIG. 44, which is discussed later.

The example implementations described herein demonstrate the first example of a conformal skin-worn device capable of simultaneous monitoring of BP, HR, and multiple biomarkers. This advance has been realized by elegantly addressing major engineering challenges in integrating rigid ultrasound transducers and soft and stretchable electrochemical sensors into a single flexible and stretchable platform while ensuring mechanical performance and avoiding signal crosstalk. The example SEBS-based solvent-soldering process has greatly simplified the assembly of a sensor with complex structure while ensuring reliable mechanical behavior and continuous epidermal BP and biomarker signal recordings under different chemical and physical stimuli and activities. Signal crosstalk between the acoustic and electrochemical transducers was prevented by spatially separating both components and using solid-state sensing hydrogel layers. Repeated mechanical deformation tests demonstrated outstanding durability and reliability of the electrochemical and acoustic sensors.

Such simultaneous acoustic and electrochemical sensing offers continuous monitoring of the users' physiological status and its response to multiple everyday activities and stimuli. This example multimodal wearable electrochemical/acoustic-physiological sensing platform has thus been shown useful for correlating common daily activities, such as exercise, drinking, and eating, with changes in BP, HR, and biomarker levels. The example results support the possibility of developing more advanced hybrid wearable sensors that involve complex integration of chemical and physical sensors on a single conformal platform for simultaneously monitoring multiple relevant parameters. Such sophisticated integration of reliable and comprehensive epidermal sensors was realized with the judicious material selection, optimized structural engineering, and novel high-throughput fabrication process.

The disclosed wearable, integrated acoustic-electrochemical sensor devices can be fully integrated in a miniaturized electronics package, with integrated ultrasound and multi-potentiostatic capabilities, along with signal processing and wireless transmission functionalities. For example, the integrated acoustic-electrochemical sensor device can interface with an electronic device to provide multiplexed sensing modalities, wireless communications, and display in a singular, wearable platform. The wearable, integrated acoustic-electrochemical sensor device can include a stand-alone acoustic sensing interface circuit, coupled with artificial intelligence-aided signal processing.

It is envisioned that the disclosed wearable, integrated acoustic-electrochemical sensor device can be included in a fully integrated multiplexed wearable health monitoring device that offers significant new insights into the health and physiological status of individuals towards the prevention and management of chronic diseases. The disclosed wearable, integrated acoustic-electrochemical sensor device represents an important step towards multimodal wearable sensors that fuse acoustic and electrochemical sensors towards more comprehensive monitoring of human physiology and a successful telehealth transformation. The wearable, integrated acoustic-electrochemical sensor device is envisioned to pave the way into a new field of skin-conformal tools capable of providing important, high-quality, and high-density information regarding the status of human health, and lays the foundation for next-generation wearable patches capable of hybrid chemical-electrophysiological-physical monitoring.

Example Methods of Fabrication and Implementations
Materials and Reagents

Example materials and reagents used in the example implementations of the wearable acoustic-chem sensor device 200, described herein, include chitosan, acetic acid, bovine serum albumin (BSA), L-lactic acid, sodium phosphate monobasic ($NaH_2PO_4$), sodium phosphate dibasic ($Na_2HPO_4$), D(+)-glucose, glucose oxidase (GOx) from *Aspergillus niger* type X-S (EC 1.1.3.4), Nafion®, agarose, pilocarpine nitrate, Prussian blue (soluble), toluene, ethanol, and silver flakes were obtained from Sigma-Aldrich (St. Louis, MO). Graphite powder was purchased from Acros Organics (USA). Lactate oxidase (LOx) (activity 101 U $mg^1$) was purchased from Toyobo Corp. (Osaka, Japan). SEBS (G1645) was received from Kraton Corporation (Houston TX, USA) while ECOFLEX® 00-30 was purchased from Smooth-on Inc. (Easton PA, USA). Super-P carbon black was obtained from MTI Corporation (Richmond, CA, USA). The ultrasound gel pad (AQUAFLEX®) was purchased from Parker Laboratories Inc. (Fairfield, NJ, USA). Reagents were used without further purification.

Sensor Fabrication, Assembly and Electrode Modification

Figure 6:
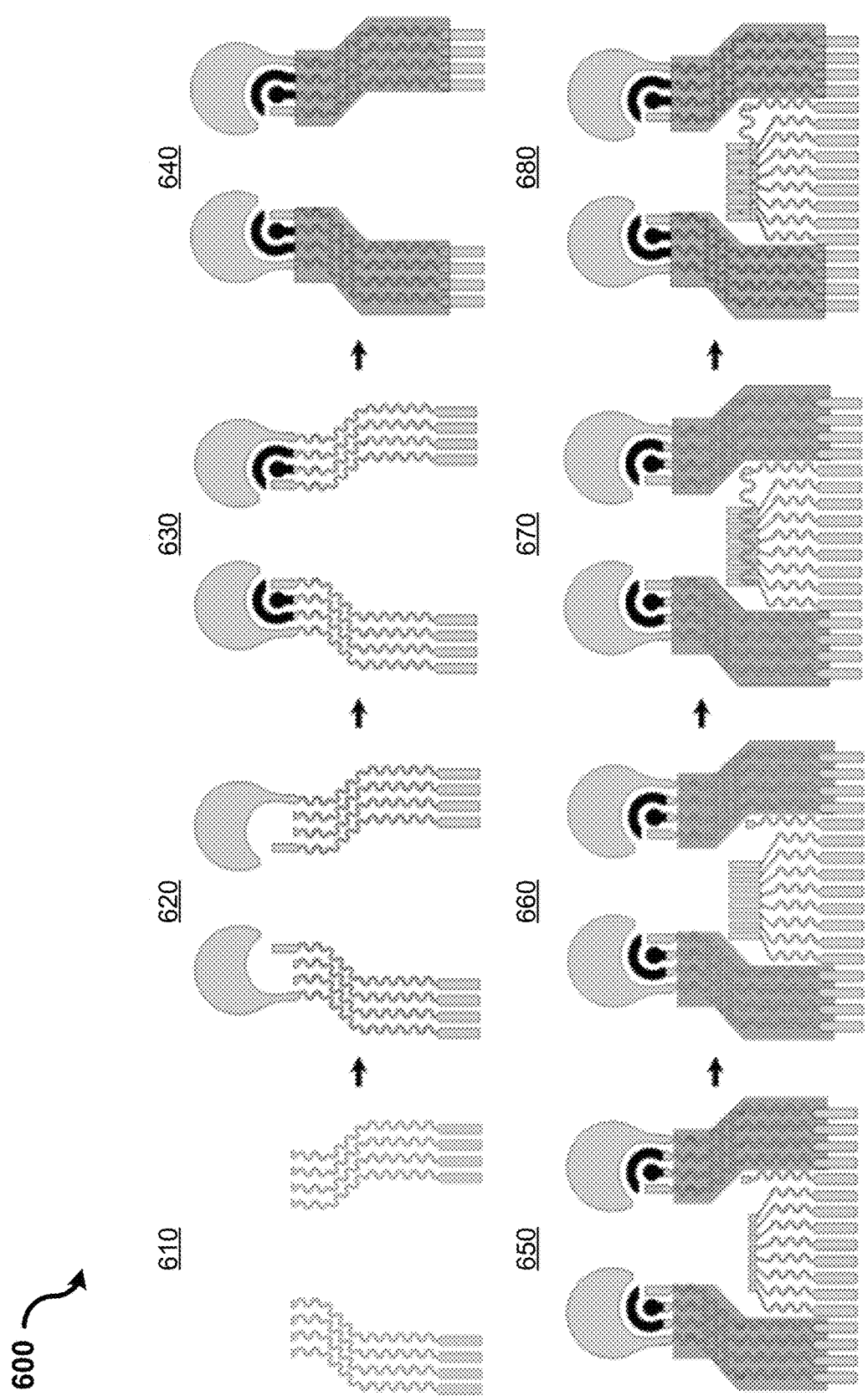
FIG. 6 shows a diagram illustrating a fabrication method for layer-by-layer printing and assembling of an integrated sensor, in accordance with the present technology.
Figure 7:
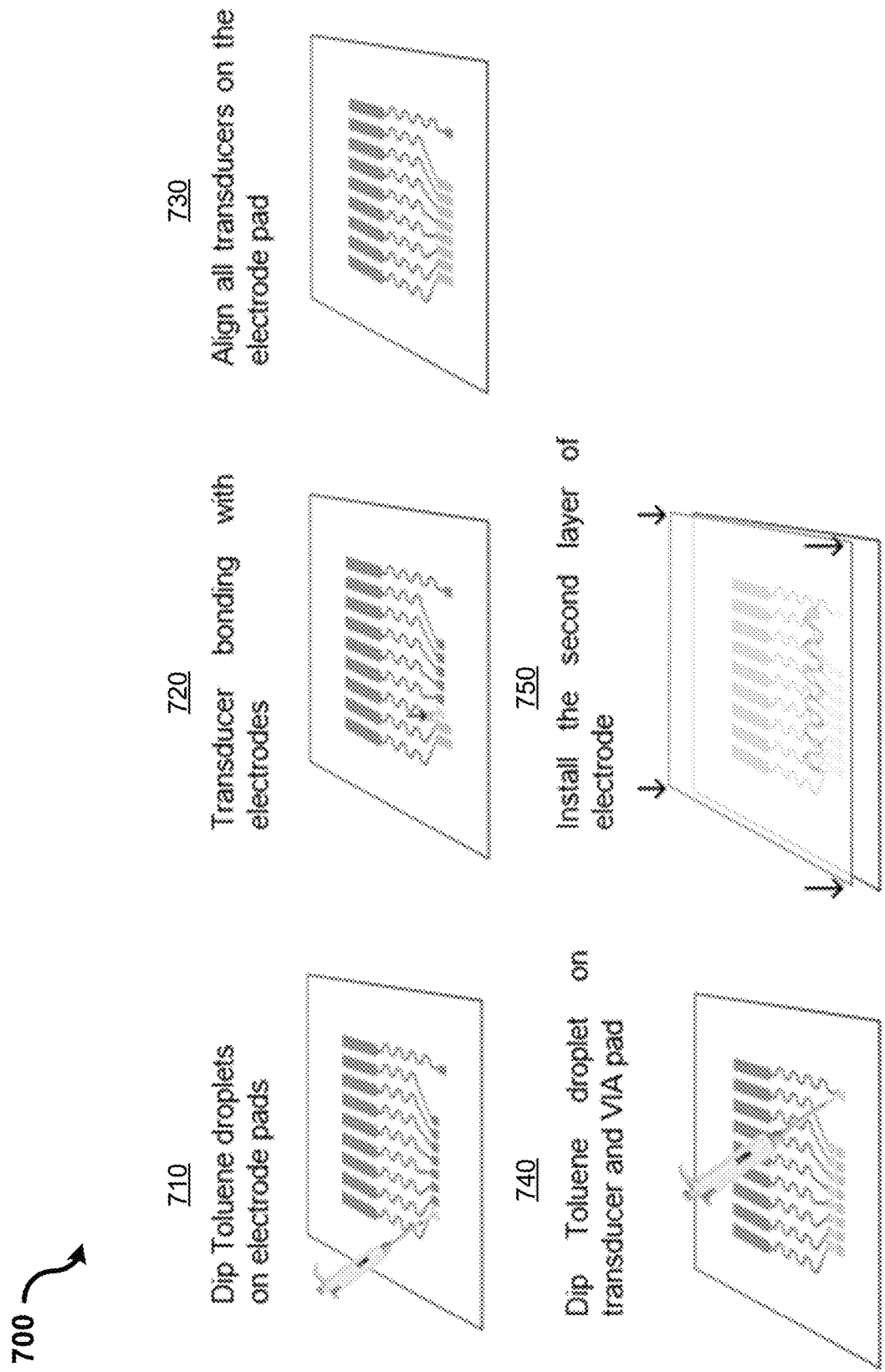
FIG. 7 shows a diagram illustrating a method for assembly ultrasound transducers for example embodiments of a wearable integrated acoustic-electrochemical sensor device, in accordance with the present technology.

For the example implementations, screen-printing was carried out using a semi-automatic MPM-SPM printer (Speedline Technologies, Franklin, MA) and custom stainless-steel stencils developed using AutoCAD software (Autodesk, San Rafael, CA) and produced by Metal Etch Services (San Marcos, CA), with dimensions of 12 in ×12 in and 125 µm thickness. The electrodes were printed layer-by-layer, as illustrated in FIG. 6. Bulk PZT was used for ultrasound transducers, which were diced (Disco Automatic Dicing Saw DAD3220) into 0.8 mm by 3 mm rectangular-shaped pixels and sandwiched by two layers of stretchable silver inks as electrodes. The connection between the transducers and the silver traces was realized by adding a toluene droplet to the printed silver traces and placing the transducers on the softened ink. After attaching the PZT transducers, the screen-printed ground connection was placed on the sensor by dissolving the printed traces in a similar fashion. Details of the transducer assembly process are illustrated in FIG. 7. The biosensor electrodes were subsequently modified by drop casting the respective enzymes and polymer layers. Details of the ink formulation, printing and assembling processes, and the individual drop casting protocols for different biosensors are discussed later in Note 1.

Sensor In Vitro Calibration

For the example implementations, fabricated sensors, including the lactate, glucose, alcohol and caffeine biosensors, and the PZT acoustic sensors, were calibrated separately in in vitro settings. The biosensors were calibrated by using 0.1 M PBS (pH 7.4) or 0.01 M acetate buffer (pH 4.5) with successive spiking of corresponding analytes, and recording the corresponding CA (for lactate, glucose and alcohol) and DPV (for caffeine). Protocols of the example in vitro biosensor calibrations are discussed in detail in Note 2. The calibration of the BP waveform is discussed in Note 3.

Sensor Mechanical Tests

Figure 17:
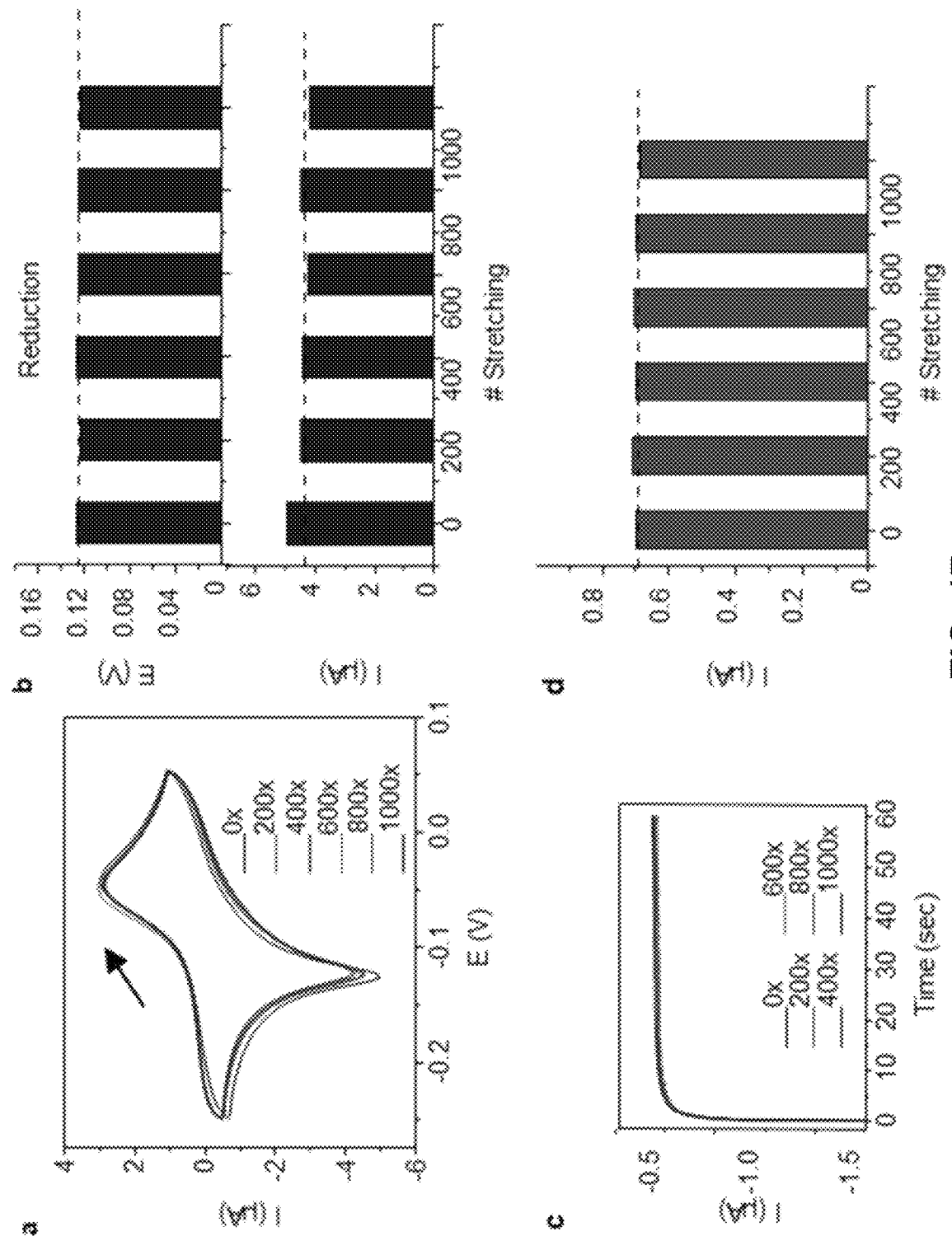
FIG. 17 shows data plots depicting electrode electrochemical stability under repeated stretching tests in example implementations of a wearable integrated acoustic-electrochemical sensor device.
Figure 18:
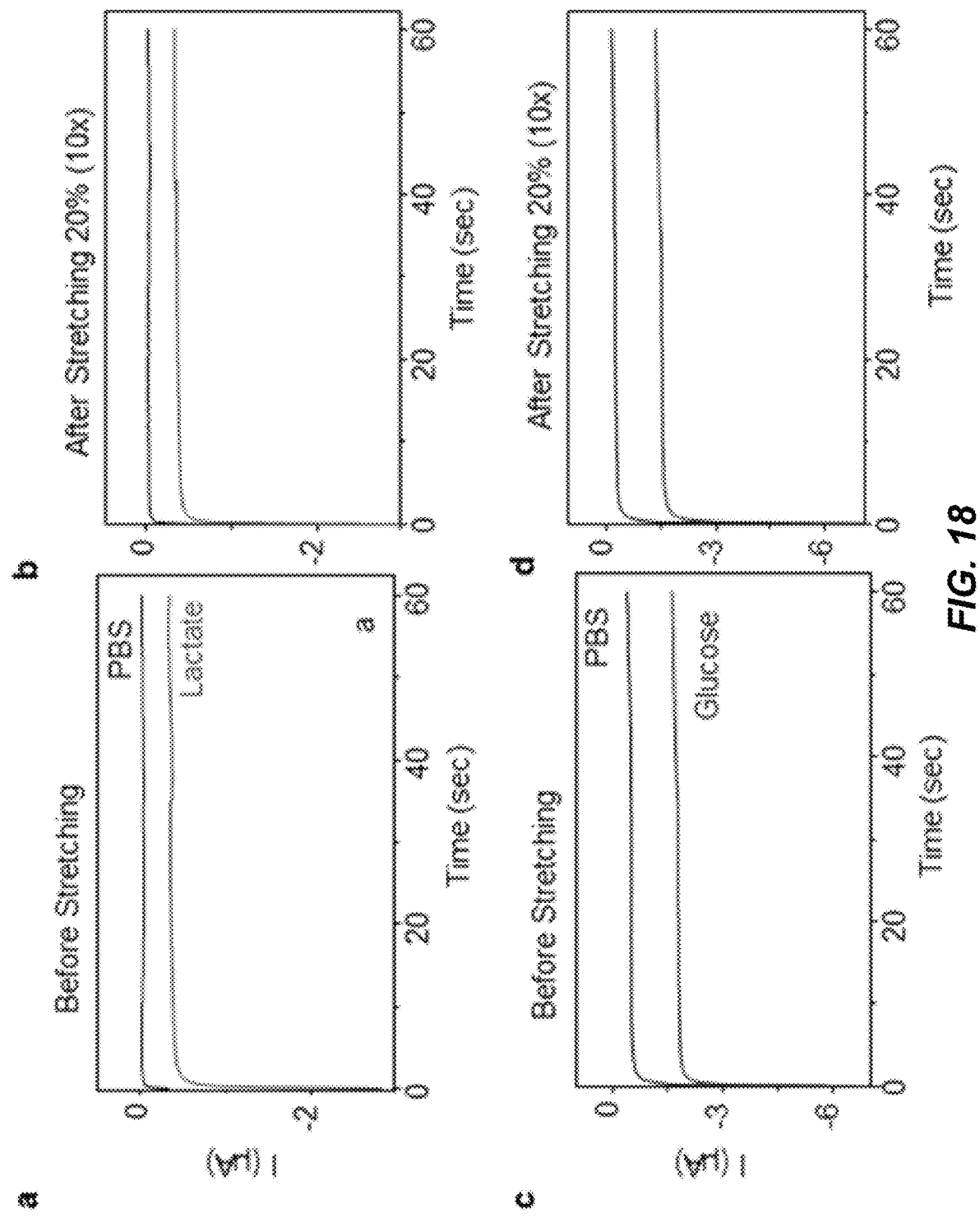
FIG. 18 show data plots depicting sensor electrochemical stability under repeated stretching tests in example implementations of a wearable integrated acoustic-electrochemical sensor device.
Figure 19:
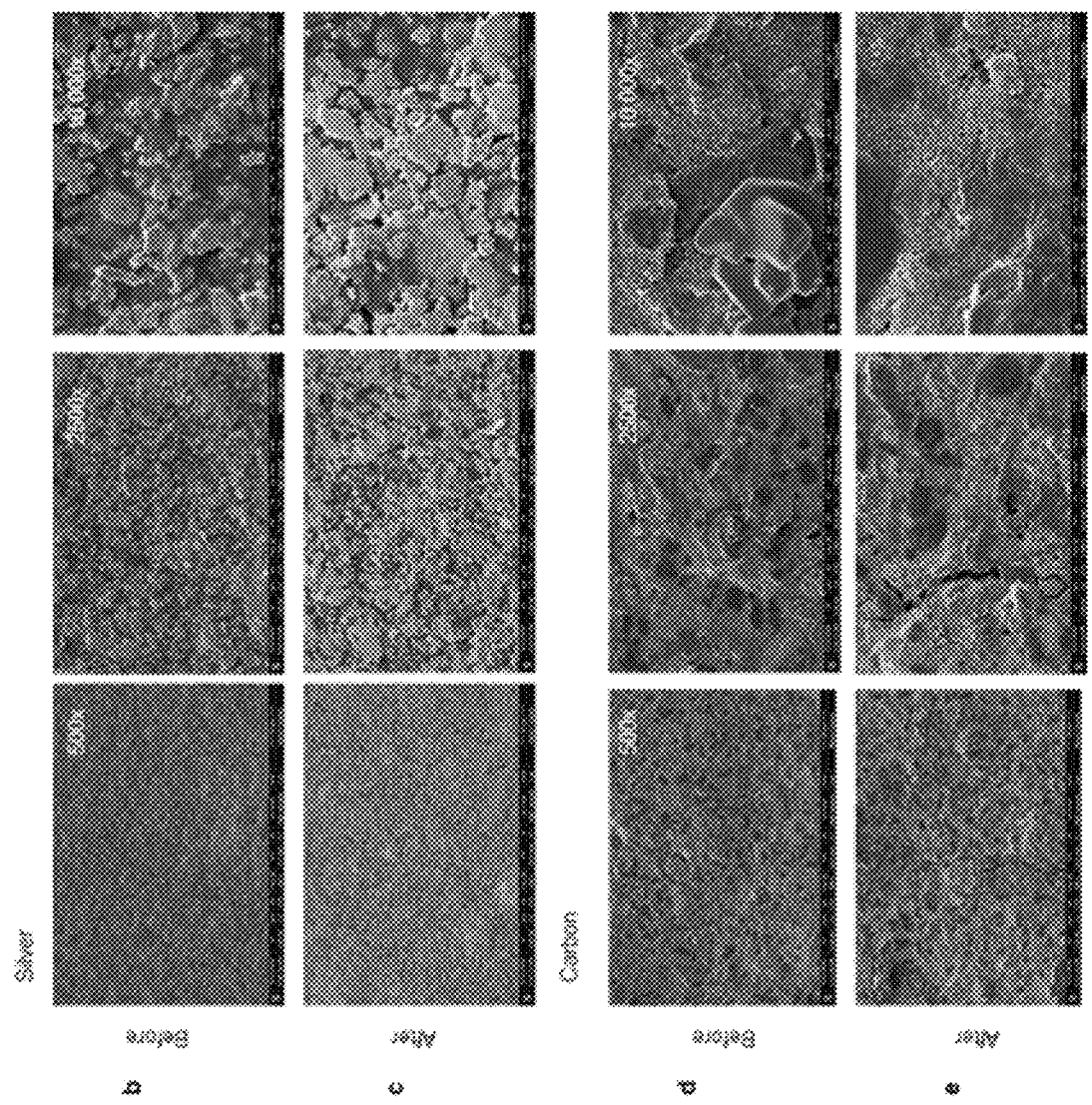
FIG. 19 shows images depicting structural integrity of a stretchable silver and PB/carbon ink composites in example implementations of a wearable integrated acoustic-electrochemical sensor device.
Figure 19:
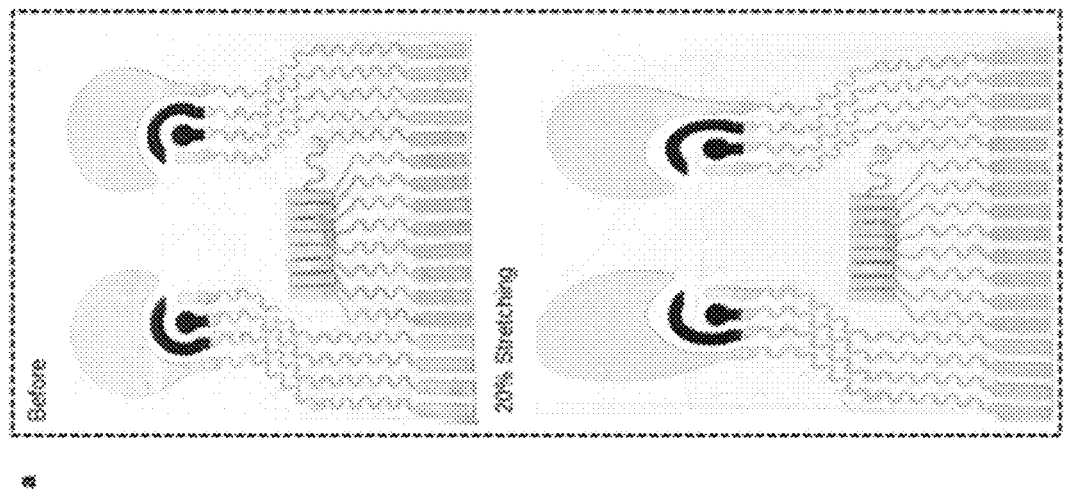
Figure 20:
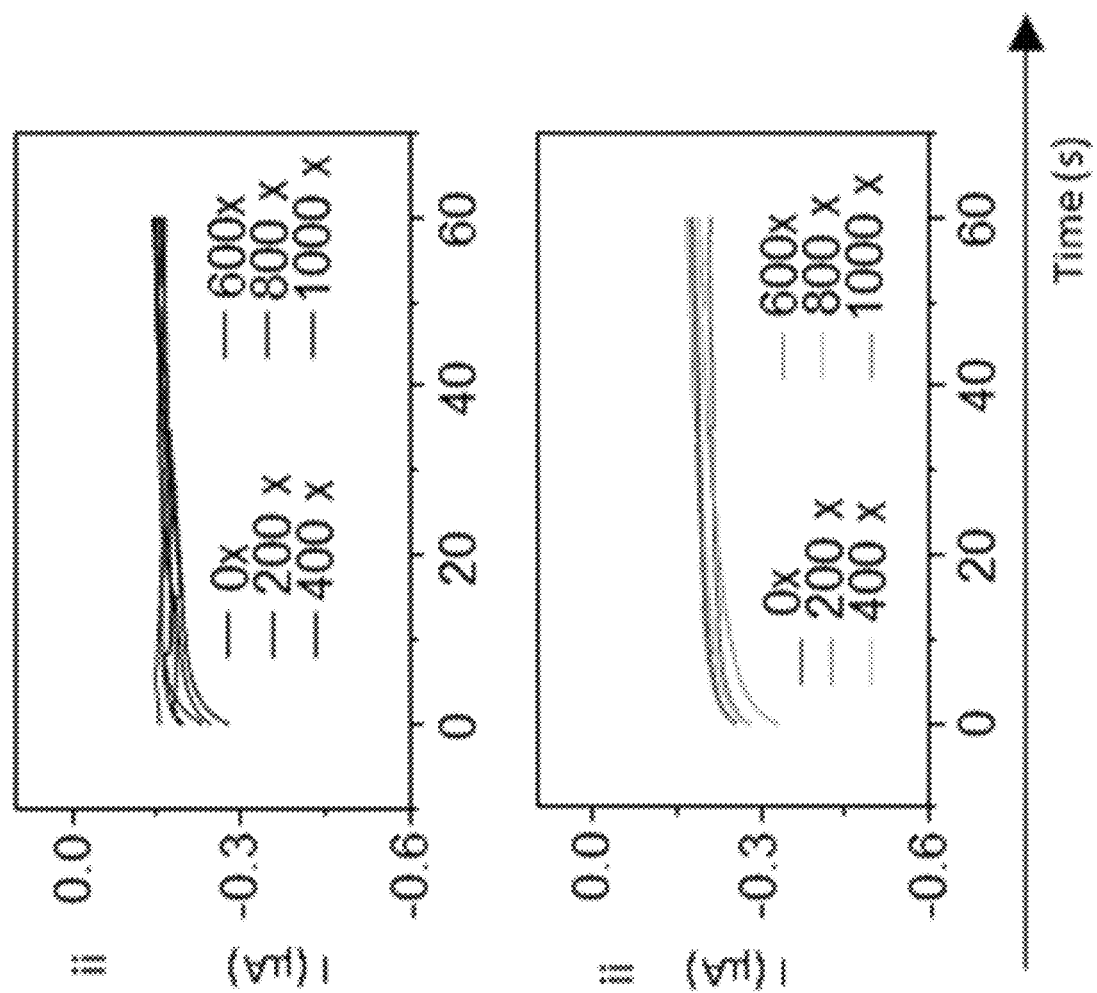
FIG. 20 shows images and data plots illustrating electrochemical performance under mechanical deformation in example implementations of a wearable integrated acoustic-electrochemical sensor device.
Figure 21:
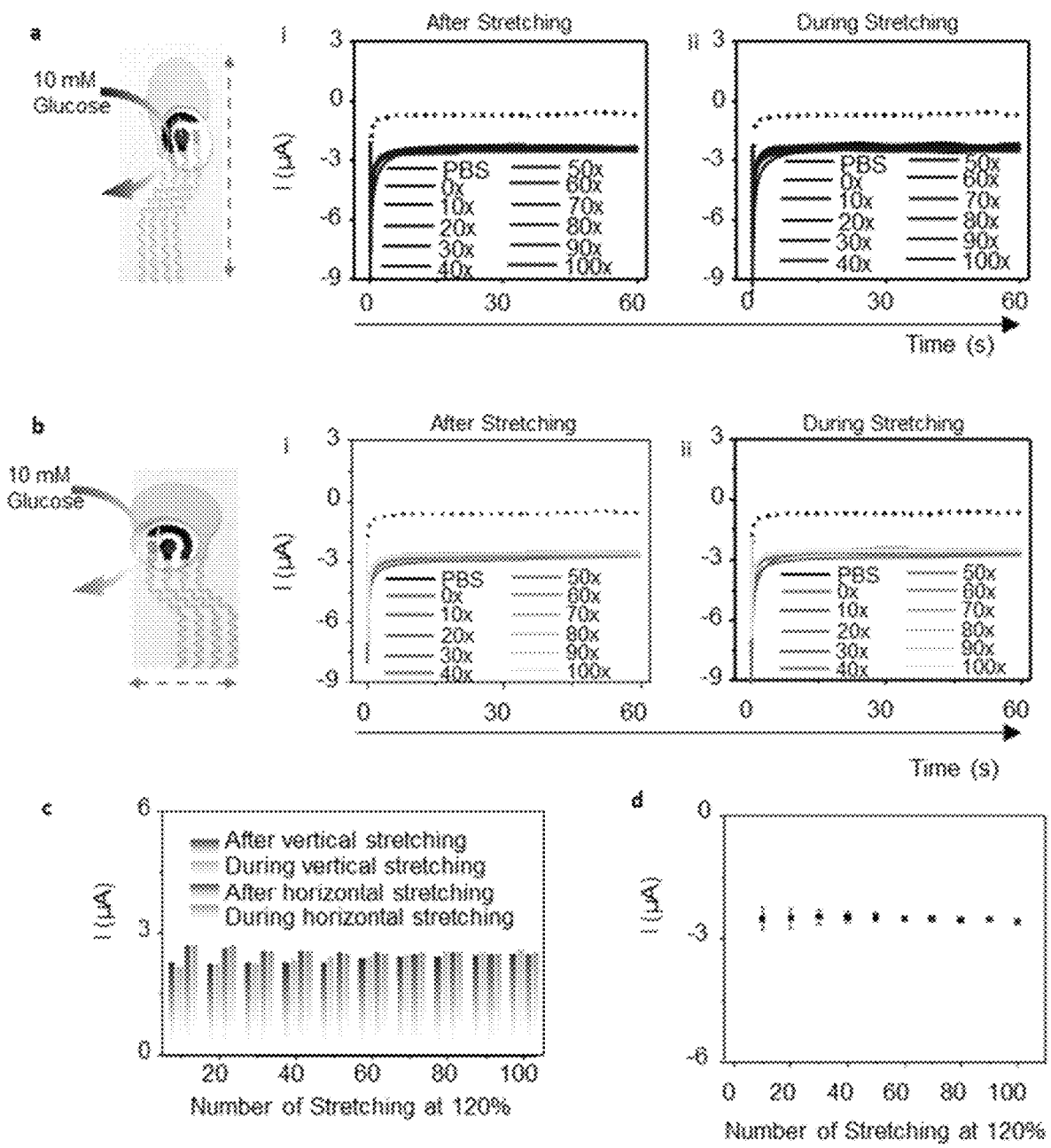
FIG. 21 shows images and data plots illustrating the electrochemical performance of an example GOx modified biosensor under mechanical deformation in example implementations of a wearable integrated acoustic-electrochemical sensor device.

For the example implementations, mechanical testing was conducted via controlled stretching tests. A programmable motorized linear stage (X-LRQ, Zaber Technologies Inc.) was used for stretching the device with controlled strain and speed. One of the edges of the printed device was taped at the fixed end of the stage and the other to the moving end of the stage. The device was firstly stretched at 3 mm/s speed to 120% of its original length in the horizontal direction and release back to its original size at the same speed. This process was programmed to be repeated 200 times, so that the device could be taken from the stage for measurements before remounting back for subsequent stretching. The process was repeated until 1,000 cycles of stretching were completed (FIGS. 17 and 18). This process was repeated for deformations on the vertical directions using the same device. Electrochemical tests under constant deformation of 120% stretching (horizontal and vertical directions) were conducted after every 200 stretching cycles, up to 1000 stretching deformations (FIGS. 20 and 21). The resiliency of the sensor was inspected visually by attaching the device to the skin and subjecting it to various deformations (FIGS. 2G, 2J); the corresponding printed surfaces, before and after repeated stretching, were also characterized via SEM imaging (e.g., FEI Quanta 250), as shown in FIG. 19.

Sensor Crosstalk Tests

For the example implementations, crosstalk between the acoustic and electrochemical signals was analyzed on-body by monitoring the changes in one signal while the other signal was generated intermittently. For analyzing the co-sensor interference from the CA electrochemical measurement to the BP waveform, the BP signals were recorded continuously for at least 4 s in two stages. Initially when the CA was already being performed by applying a potential of −0.2 V to the electrochemical sensors, and when the detection potential was turned on after the BP recording had already started. The interference tests from the BP sensor on the CA measurements were performed in the same fashion for the anodic and cathodic sensors as follows. For analyzing the crosstalk effect of the acoustic signal generation upon the electrochemical signal acquisition, the CA signal was recorded continuously for 180 s while the electric pulses for the BP measurements were delivered to the PZT transducer in an off-on-off-on-off-on pattern with a period of 30 s for each phase. The crosstalk from the differential pulse voltammetry (DPV) to the acoustic signal was evaluated in the same fashion as in the CA tests as follows. The effect of the acoustic signal upon the caffeine sensor was evaluated in two stages, first by recording the DPV signal while the BP recording was being applied, following by terminating the BP signal when the DPV reached the peak potential and by recording the DPV signal prior to initiating the BP acquisition at peak potential. The corresponding data obtained are included in FIGS. 2A-2Q and FIG. 29. Signal generation and data acquisition were performed using μAutolab III electrochemical analyzer (Metrohm) for the chemical sensors and the 5077PR pulser-receiver (Olympus) for the acoustic sensors. The potentiostat was configured with +/−5 V voltage and 1 mA current limit to avoid overcurrent/overvoltage. The device was inspected visually to ensure that the transducers were fully covered by the SEBS substrates for insulation. No capacitive coupling, short-circuiting nor breakdown conduction were observed during the experiment.

Sensor On-Body Test Protocols

Figure 26:
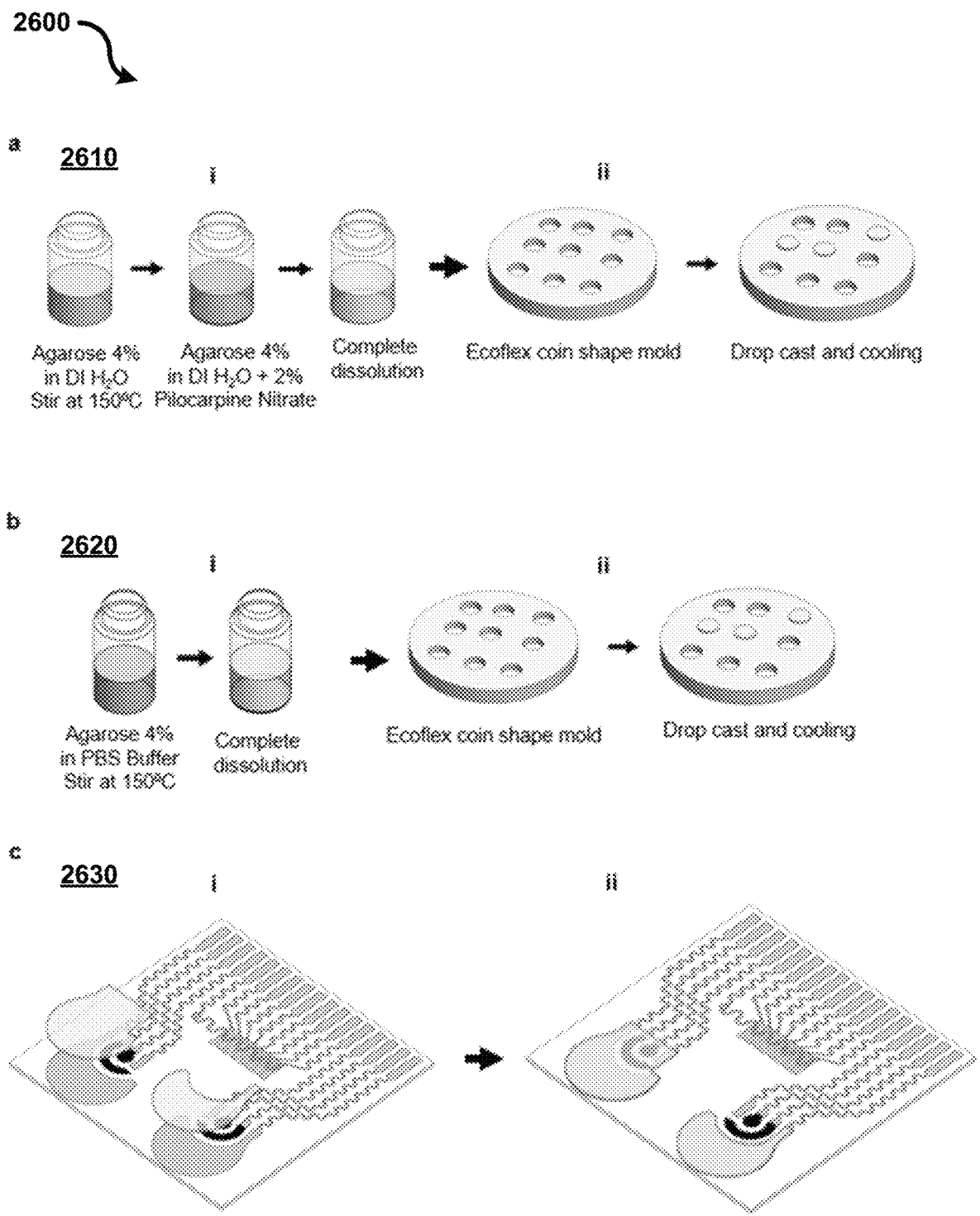
FIG. 26 shows diagrams illustrating an example embodiment of a fabrication method, in accordance with the present technology, for preparing and assembling of hydrogel layers.
Figure 27:
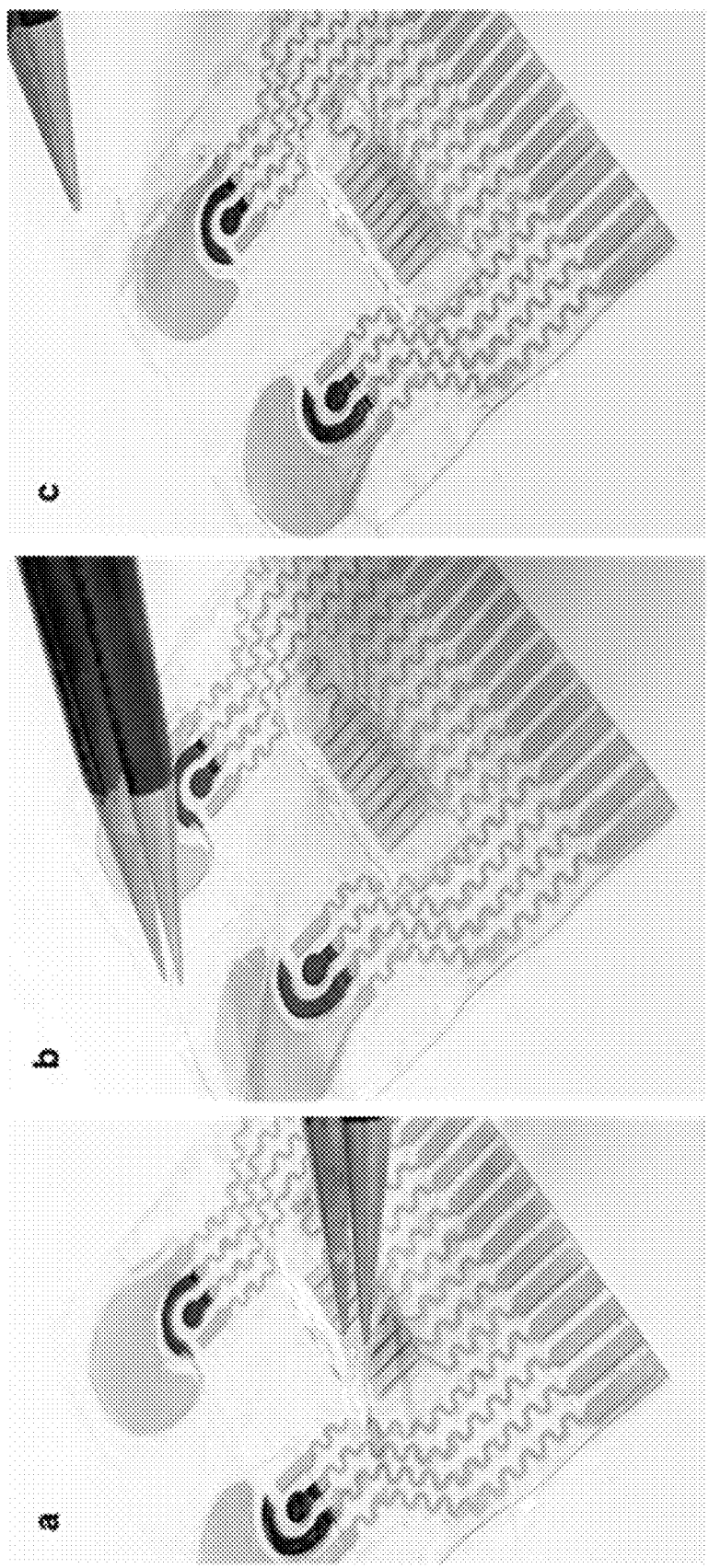
FIG. 27 shows photos depicting an example implementation of assembly of example iontophoretic sensors and ultrasound hydrogels.
Figure 28:
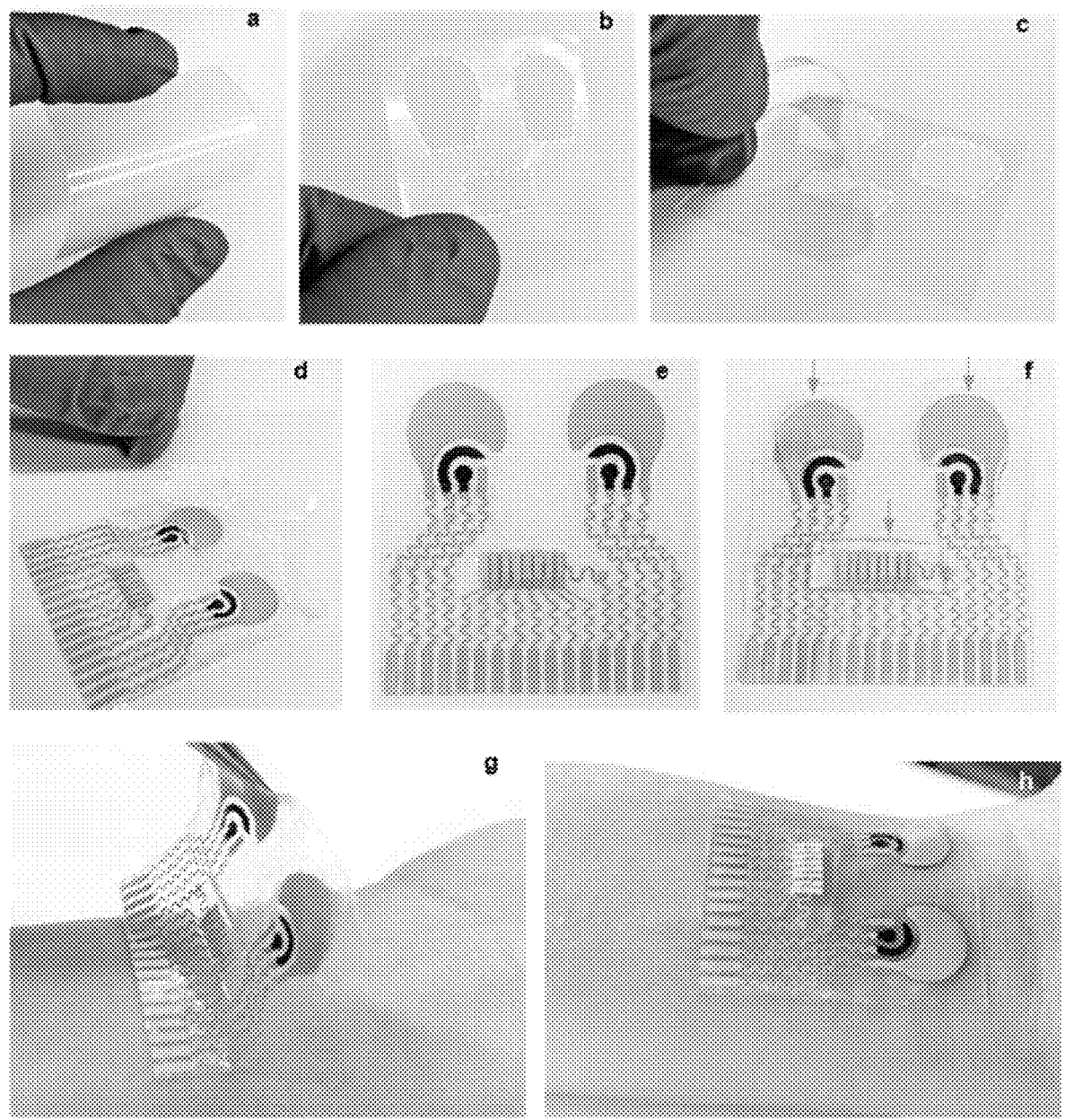
FIG. 28 shows photos depicting an example implementation of a transfer process of an example wearable acoustic-electrochemical sensor device.

Epidermal evaluation of the device was performed on healthy consenting subjects with no prior history of heart conditions, diabetes, or chronic pain, and in strict compliance with the protocol approved by the Institutional review board (IRB) at the University of California, San Diego. The example device was placed on the neck of the volunteers for all on-body evaluations. Prior to every set of measurements using the integrated sensor, the glucose, lactate, alcohol, and BP signals were validated with a commercial glucometer (ACCU-CHEK, USA), blood lactate (NOVA biomedical, USA), breathalyzer (BACtrack S80 Pro) and FDA approved blood pressure cuff (LOVIA, USA), respectively. Caffeine concentrations were estimated by standard addition methodology using the collected sweat (e.g., shown in FIG. 24). Sweat stimulation and ISF extraction were realized simultaneously by using a μAutolab III electrochemical analyzer to apply a current density of 0.3 mA cm$^{-2}$ between the cathode and anode electrodes for 10 min. Prior to sweat generation, a pre-conditioning step was carried out on the skin by applying the same current density using agarose gels in the cathode and anode compartments for 10 min, following by immediate placement of the device with pilocarpine delivery gel on the conditioned area. Before placing the sensor, the skin was thoroughly cleaned with soap and alcohol wipes. The patch was transferred to the skin by using a double-sided clean laser tattoo transfer adhesive (Papilio, TM). Openings were made in the adhesive film to expose the sensors and IP electrodes to the skin. For the measurements, a single device was used for each volunteer to perform the "before" and "after" tests. The device was kept in the volunteer's neck during the entire experiment, unless otherwise specified. Detailed of the hydrogels fabrication methods and skin transfer processes are illustrated in FIGS. 26, 27, and 28.

The example on-body results were acquired using a benchtop CHI 1230A electrochemical analyzer for the biosensors and 5077PR pulser-receiver (Olympus) for the acoustic sensors. Food intake refers to the intake of sugar-rich food (100 g cheesecake, 350 kcal, 22 g sugar). Alcohol intake refers to the intake of alcohol (200 mL wine, alcohol 19% vol.). Caffeine intake refers to the intake of a sugar-free caffeinated drink (248 mL, 80 mg caffeine). Exercise refers to a 30-min exercise session on a stationary bike with constant intensity followed by a 5-min cooling period.

Figure 16:
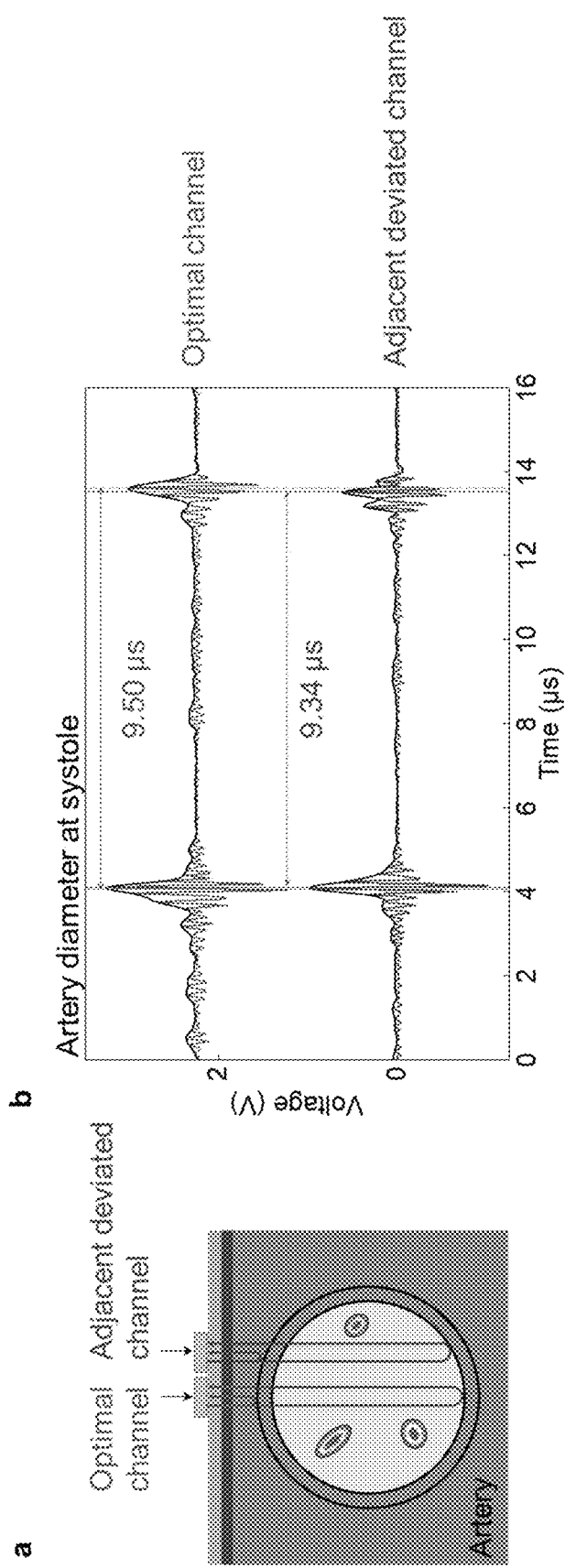
FIG. 16 is a diagram and a data plot illustrating optimal channel selection for accurate artery diameter tracking in example implementations of a wearable integrated acoustic-electrochemical sensor device.

Exercising: BP and lactate signals were acquired before and after exercising for three healthy volunteers. The device was removed from their skin during the 30 min stationary bike exercise and kept in a wet chamber at room temperature. After exercising, and following a 5 min cooling period, the volunteer's neck was cleaned with soap and alcohol pads for replacing the same sensor in the same area. The optimal BP signal after the sensor replacement was selected by testing the PZT array in the BP sensor. The influence of the example device removal/replacement on the signal was studied, as illustrated in FIG. 16.

Alcohol Intake: BP and alcohol levels were measured before and 20 minutes after the alcohol consumption. The device was kept on the volunteer's neck during the entire experiment.

Food Intake: BP and ISF glucose signals were acquired in the fasting state (16 hours) for three healthy volunteers and 15 min after consuming the sugar-rich food. The device was kept on the volunteer's neck during the whole experiment.

Caffeine Intake: Subject volunteer's caffeine levels in sweat were monitored before and 30 min after consuming the sugar-free caffeine drink. The device was kept on the volunteer's neck during the entire experiment. For the on-body tests an agarose gel loaded with acetate buffer pH 4.5 was used, covering only the caffeine sensor. Prior to the caffeine ingestion, stimulated sweat was collected for the standard addition caffeine determination.

Simultaneous Alcohol and Food Intake: The dual modality of the sensor was tested by combining alcohol and food intakes. BP, ISF glucose, and sweat alcohol levels were measured before and after 20 min of the simultaneous consumption of an alcoholic beverage and the sugar-rich food. The device was kept on the volunteer's neck during the whole experiment.

Food Intake and Exercising: The dual modality of the sensor was tested toward the monitoring of blood pressure, glucose, and lactate levels. The subject was first asked to consume a sugar-rich food. Fifteen minutes after the food consumption, ISF glucose, sweat lactate and BP were measured. Next, the device was removed from the subject, kept in a wet chamber at room temperature, and the volunteer was asked to perform the physical exercise on a stationary bicycle for 30 min followed by cooldown for 5 min. After the cooldown interval the subject's skin was cleaned and the same sensor was used for subsequent measurement of the SIF glucose, sweat lactate, and BP levels.

Continuous Lactate and BP Sensing During Exercising: The sensor was further tested by monitoring dynamic changes in BP and sweat lactate while performing continuous physical activity. Subjects with different fitness levels (physically active and non-active) were asked to perform 30 minutes of cycling activity at constant intensity while wearing the sensor. Iontophoresis and the iontophoretic gels were not used for this portion of the study, as sweat was generated spontaneously from the activity. The BP and blood lactate were measured right before the start of the exercise and the initial sweat lactate level was measured 5 min after starting the exercise when sweat was firstly generated. Within ~10 minutes, BP and blood lactate signal were recorded again. The BP and blood lactate were recorded also upon completion of exercising for validation.

For some example embodiments of the wearable acoustic-chemo sensor device 100, some examples of ultrasound transducer structures in accordance the disclosed technology can include features of flexible ultrasound transducers like those that described in U.S. Patent Publication No. 2019/0328354 A1, titled "Stretchable Ultrasonic Transducer Devices," which is incorporated by reference in its entirety as part of the disclosure of this patent document. For some example embodiments of the wearable acoustic-chemo sensor device 100, some examples of electrochemical sensors in accordance the disclosed technology can include features of sensors described in U.S. Pat. No. 9,820,692 B2 and/or U.S. Patent Publication No. 2018/0220967 A1, each titled "Wearable Electrochemical Sensors," and U.S. Patent Publication No. 2017/0325724 A1 entitled "Non-Invasive and Wearable Chemical Sensors and Biosensors," which are incorporated by reference in their entirety as part of the disclosure of this patent document.

Additional designs, data, and discussion of example implementations and example embodiments of wearable, integrated acoustic-electrochemical sensor devices, in accordance with the present technology, are described below.

Note 1. Example Sensor Fabrication Protocols

Fabrication of the Styrene-Ethylene-Butylene-Styrene Block Copolymer (SEBS) Substrate A viscous SEBS resin was prepared by dispersing SEBS beads in toluene with a weight ratio of 1:2. The mixture was left on a linear shaker (Scilogex, SK-L180-E) overnight or until the mixture became transparent and homogeneous. A PET film with non-stick coating was used as the temporary casting substrate, and a doctor blade set at 1 mm height was used to cast the SEBS resin into a sheet on the PET substrate. The cast resin was firstly dried in ambient environment for 1 h, followed by curing in a conventional oven at 80° C. for additional 1 h to remove the excess solvent. The transparent, uniform SEBS film was peeled off from the PET substrate for subsequent sensor fabrication.

Synthesis of the Stretchable Silver and PB Ink

The stretchable silver ink was synthesized by mixing silver flakes, toluene, and SEBS, in a weight ratio of 4:2.37:0.63, in a dual asymmetric centrifugal mixer (Flacktek Speedmixer, DAC 150.1 KV-K) with a speed of 1800 RPM for 10 min or until obtaining a homogeneous ink. The stretchable PB ink was synthesized by mixing super-P carbon black, graphite powder, PB, SEBS and toluene, in a weight ratio of 0.5:3:1:1.26:4.74, in the mixer at 2150 RPM for 10 min or until the ink was homogeneous. Before printing the stretchable inks, the ink viscosity was analyzed visually and, if necessary, (~200 μL) toluene was added and the ink was centrifuged before use.

Printing of the Stretchable Electrodes

The prepared SEBS sheet was used as the stretchable substrate for the printed electrodes. An example embodiment of a fabrication method, e.g., providing a step-by-step printing technique of sensor structures, for example embodiments of the wearable acoustic-chemical sensor device 200 is illustrated in FIG. 6. An example implementation of the method 600 included, firstly, using stretchable silver ink for printing the interconnections, the iontophoresis (IP) electrodes, and the reference electrodes, on the front part of the SEBS substrate. Next, the stretchable PB ink was used to print the working and counter electrodes of the biosensors. The SEBS substrate was then turned over and the interconnections for the transducer array were printed on the backside of the SEBS substrate (opposite to the printed PB ink), with one extra channel reserved for connecting to the common ground of the transducers. A separate piece of SEBS sheet was used to print the ground wire for the transducers. The printed inks were cured in a conventional oven at 80° C. for 10 min after each printing step. Before using the complete printed device, the stretchable silver reference electrodes were treated by adding a droplet (10 μL) of 0.1 M $FeCl_3$ in 0.1 M KCl on the printed surface for 20 seconds to produce the Ag/AgCl layer.

Assembly of the PZT Transducers

The diced PZT transducers can be "solvent soldered" onto the printed current collectors by firstly dissolving the junction regions of the interconnections temporarily with a small volume of toluene (~1 μL), followed by placing the transducers onto the softened trances to physically bond with the composite ink. After placing the transducers onto the wetted interconnections, the assembled device was left drying for 2 minutes in ambient temperature. Afterward, the printed ground wire was carefully aligned with the transducers and solvent soldered to the array, by adding a droplet of toluene on each PZT transducer, in a similar fashion. Lastly, the printed ground was "solvent soldered" to the reserved channel of the interconnection array. Details of the example fabrication method is illustrated in FIG. 7.

Biosensor Working Electrode Modification

Figure 10:
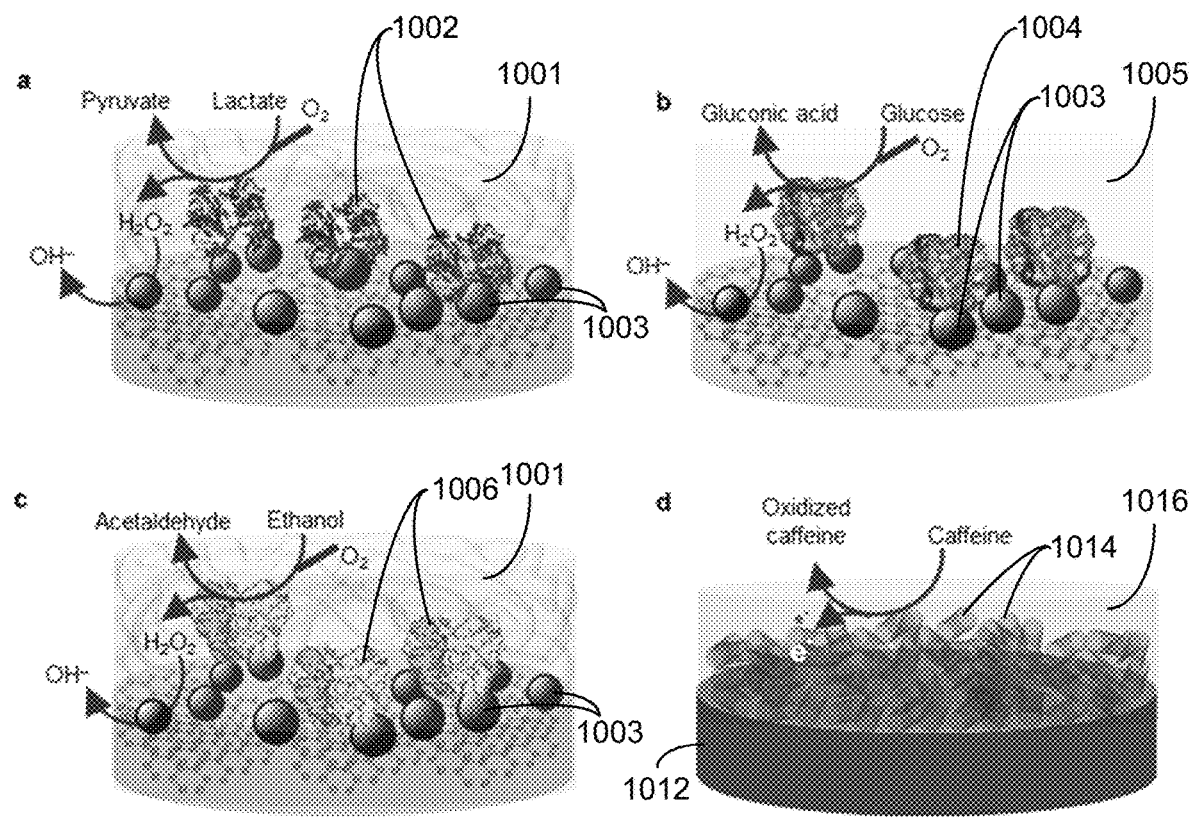
FIG. 10 is a diagram illustrating electrochemical sensor modifications and reaction mechanisms for example embodiments of a wearable integrated acoustic-electrochemical sensor device, in accordance with the present technology.

PBS used in the electrode modification was prepared in 0.1 M with a pH of 7.4. BSA solution was prepared with a concentration of 10 mg/mL in PBS. The chitosan solution was prepared by dissolving chitosan in 0.1 M acetic acid with a concentration of 0.5 wt %. For preparing the lactate biosensor, the chitosan solution was mixed with LOx (40 mg/mL) in BSA solution, in a ratio of 1:1 (v/v), followed by drop casting a 2 μL aliquot of the mixture onto the working electrode surface. For preparing the glucose biosensor, GOx (40 mg/mL) in BSA solution, glutaraldehyde in water (5 wt %) and Nafion in water (0.5 wt %) were mixed in a ratio of 1:1:0.33 (v/v/v), and a 1.5 μL aliquot was drop cast onto the working electrode surface. For preparing the alcohol biosensor, AOx (10-40 units/mg), BSA solution and the chitosan solution were mixed in a ratio of 8:1:1 (v/v/v), and a 4 μL aliquot of the mixture was drop cast to the working electrode surface. After drying at room temperature for 1 hr, 2 μL of the chitosan solution was drop cast to all previously enzyme-modified surfaces. Upon completing the corresponding modification steps, the resulting biosensors were stored at 4° C. overnight before using. For the caffeine sensor, a solution of 0.1 mg/mL of MWCNT was dispersed in 50% EtOH (v/v in DI water) in an ultrasound bath for 10 min, and a 2 μL aliquot of the dispersed solution was drop cast onto the working electrode surface. After drying at room temperature for 1 hr, 2 μL of 0.01% v/v of Nafion in water solution was drop cast onto the previously MWCNT-decorated working electrode and dried at room temperature overnight. Schematic illustrations representing the modified sensor components and corresponding electrochemical reactions for these example embodiments are shown in FIG. 10.

Preparation of the IP Hydrogels

An ECOFLEX mold with multiple circular trenches with a diameter of 18 mm and thickness of at least 1 mm was prepared for forming the hydrogels. The anode hydrogel solution was prepared by dissolving 120 mg agarose in 3 mL of 0.1 M phosphate-buffered saline solution at 150° C. under stirring until the agarose was dissolved. The cathode hydrogel solution was prepared by dissolving 120 mg agarose in 3 mL DI water. After agarose dissolution, the temperature was immediately decreased to 60° C. and 60 mg of pilocarpine was added under continuous stirring. 300 μL aliquots of the hot solutions (cathodic and anodic gels) were added into each circular mold to allow them to solidify. After the solution cooled down in the mold, the gels were cut into the corresponding cathode and anode geometries and stored in a wet chamber at 4° C. before using. Details of the example preparation method are illustrated in FIG. 26.

Note 2. Example Sensor In Vitro Characterization

PBS used in the example in vitro characterization of the sensors is 0.1 M at pH 7.4, unless otherwise noted.

Lactate Sensor

The calibration curve of the lactate sensor was obtained using an initial PBS droplet with 100 μL volume on the sensor surface. The solution was spiked with 1 μL of 0.5 M lactate solution to incrementally increase the concentration of the lactate from 0 to 30 mM with CA at −0.2 V for 60 s after each spiking. The selectivity of the lactate sensor was evaluated by performing CA while spiking the PBS successively with lactate (2 mM), glucose (0.2 mM), ascorbic acid (10 uric acid (60 and acetaminophen (10 The stability of the lactate sensor was examined by performing 10 repetitive CA measurements of 2 mM lactate and calculating its relative response changes in %. The example in vitro characterization data of the lactate sensor is summarized in FIG. 11.

Glucose Sensor

The calibration curve of the glucose sensor was obtained using an initial 100 μL PBS droplet on the sensor surface. The solution was spiked with 1 μL of 0.1 M glucose solution to incrementally increase the concentration of glucose from 0 to 10 mM with CA at −0.2 V for 60 s after each spiking. The selectivity of the glucose sensor was evaluated by performing CA while spiking the PBS successively with glucose (2 mM), lactate (10 mM), ascorbic acid (10 uric acid (10 μM), and acetaminophen (10 μM). The stability of the glucose sensor was examined by performing 10 repetitive CA measurements of 2 mM glucose and calculating its relative response changes in %. The example in vitro characterization data of the glucose sensor is summarized in FIG. 12.

Alcohol Sensor

The calibration curve of the alcohol sensor was obtained using an initial PBS droplet with 100 μL volume on the sensor surface. The solution was spiked with 1 μL of 0.8 M ethanol solution to incrementally increase the concentration of alcohol from 0 to 32 mM with CA at −0.2 V for 60 s after each spiking. The selectivity of the alcohol sensor was evaluated by performing CA while spiking the PBS measured successively with ethanol (20 mM), lactate (10 mM), glucose, (0.2 mM), ascorbic acid (10 μM), uric acid (60 μM), and acetaminophen (10 μM). The stability of the alcohol sensor was evaluated by performing 10 repetitive CA measurements of 2 mM ethanol and calculating its relative response changes in %. The example in vitro characterization data of the alcohol sensor is summarized in FIG. 13.

Caffeine Sensor

DPV was utilized for evaluating the caffeine sensor with the following parameters: accumulation at −1.2 V for 30 s; $E_{initial}$: +0.5 V; $E_{final}$: +1.5 V; $E_{step}$: 0.004 V; $E_{pulse}$: 0.05 V; $t_{pulse}$: 0.05 s; scan rate: 0.02 V/s. For calibration curve tests, 100 μL of 0.01 M acetate buffer (pH 4.5) were used to cover the sensing area of the device. The background response was recorded repeatedly until the signal was stable. The caffeine DPV response was then recorded after each consecutive addition of 1 μL of 1 mM caffeine in DI water for obtaining 10 μM increments of the caffeine concentration, up to 210 μM. The selectivity of the caffeine sensor was evaluated by performing DPV while spiking the acetate buffer successively with caffeine (20 μM), lactate (10 mM), ascorbic acid (10 μM), uric acid (60 μM), and acetaminophen (10 μM). The stability of the caffeine sensor was examined by performing 10 repetitive DPV measurements of 20 μM caffeine and calculating its relative peak current changes in %. The example in vitro characterization data of the caffeine sensor is summarized in FIG. 14. For the example on-body tests an agarose gel loaded with acetate buffer pH 4.5 was used, covering only the caffeine sensor. A standard additions voltammetric method, involving spiking caffeine to a collected sweat sample, is used to validate the amount of caffeine in sweat. This method was used once to construct the calibration plot for correlating directly the wearable patch signal to sweat caffeine concentrations.

Sodium Sensor

Open circuit potential (OCP) was used for evaluating the sodium sensor. For the calibration curve, the sensor was incubated for 30 minutes in an aqueous solution of 10 mM NaCl. After rinsing, the response signals for 100 μL of 0.1, 1, 10 and 100 mM NaCl were recorded by consecutively replacing the solution on the electrode surface. The selectivity of the sodium sensor was evaluated by calibrating the sensor with different KCl concentrations in a similar fashion as the NaCl calibration. The stability of the sodium sensor was examined by recording the response to 0.1 mM NaCl over 1 hour. The reversibility of the sensor was performed by increasing and decreasing the NaCl concentration on the sensor surface from 0.1 mM to 100 mM and back to 0.1 mM.

Note 3. Calibration of Blood Pressure Waveform

The position of the artery walls was represented by the flight time of the echo signals. By continuously tracking the echo shift of the vessel walls, the arterial distension waveform could be recorded (e.g., shown in FIG. 15). Then, based on an established model, the arterial distension waveform could be transferred to blood pressure waveforms.

The arterial blood pressure waveform p(t) is calculated from the vessel distension waveform d(t) as follows (in Equations (1) and (2)):

$$A(t) = \frac{\pi d^2(t)}{4} \tag{1}$$

$$p(t) = p_d \cdot e^{a\left(\frac{A(t)}{A_d} - 1\right)} \tag{2}$$

where A(t) is the cross-sectional area of the artery, and d(t) is the diameter of the target artery. Here, the artery is assumed to be rotationally symmetrical. $p_d$ is the diastolic pressure. $A_d$ is the diastolic arterial cross-section, and a is the rigidity coefficient.

α can be calculated by the following equation (Equation (3)):

$$\alpha = \frac{A_d \ln(p_s / p_d)}{A_s - A_d} \tag{3}$$

where $A_s$ is the systolic arterial cross-section, and $p_s$ is the systolic pressure. The $p_d$ and $p_s$ are measured by the commercial blood pressure cuff from the brachial site. Using the above equations and a brief calibration for α, $p_d$, and $p_s$ the accurate pressure waveform p(t) can be obtained.

It is noted that the human blood vessel is assumed to be elastic with negligible viscoelasticity. For subjects with normal local vascular conditions or with slight local atherosclerosis, the diameter of the vessel does not lag behind the pressure waveforms.

Note 4. Simultaneous Monitoring of ISF and Sweat Analytes Via Iontophoresis

An iontophoretic system has been used for the simultaneous ISF extraction (cathode) and sweat stimulation by pilocarpine delivery (anode). The extraction and delivery operations are performed at the same time based on two mechanisms, as described in detail in previously published work. In brief, a low-intensity electrical current is applied to the skin using two electrodes (cathode and anode). Iontophoretic gels with different compositions are located under each electrode. On the anode compartment, a pilocarpine-loaded gel is used for stimulating the sweat. Pilocarpine is delivered inside the skin by electrical repulsion as the pilocarpine molecule is positively charged and a positive current is applied at the anode. Then, localized sweat production occurs only in the stimulated area where the pilocarpine drug was delivered (anode). Since no sweat stimulant drug is present on the cathode compartment, no sweat is produced under the cathode electrode. The iontophoretic gel, located in the cathode compartment, is loaded with PBS buffer and a negatively charged current is applied to attract the positively charged ions from the ISF under the skin to the outside. A flow of negatively charged ions is also attracted to the skin surface in the anode compartment; however, as the skin is naturally negatively charged, there is a net flow of ISF toward the cathode, which carries all small neutral molecules in the same direction. ISF glucose can thus be detected in the cathodic compartment. Accordingly, the electroosmotic convective flow is responsible for the ISF glucose extraction exclusively on the cathode compartment while the target sweat analyte is detected at the anode.

Note 5. SEM Analysis from Mechanical Deformation

For examining the morphological change of the printed composite electrode before and after stretching, two sets of samples for the SEM imaging were prepared, before and after the 1500 times of stretching. For example, the change in the apparent surface morphology can be caused by several factors, including the difference in the individual samples, the contrast, and brightness of the SEM image being taken, as well as the most importantly, any physical damage caused by the stretching deformation. A key element to examine was if there was any cracking, peeling, or delamination, on the surface of the electrode. As shown in FIG. 18, the printed silver composite, mainly used as the reference electrode and the interconnection for the electrochemical sensors and the PZT chips, has no apparent cracking, peeling, or delamination from the substrate. The Prussian blue-carbon ink, used for the working and auxiliary electrodes of the electrochemical sensors, has shown minor cracking on the surface of the electrode. Such behavior is expected as the formulation of the carbon-PB ink includes a high loading of small-size, highly porous materials, which made the composite less stretchable compared to the silver-based ink. However, due to the small size and high active surface area of the working electrode, such minor morphological change should have a negligible effect on the sensing results and upon the sensitivity. To support this view, chronoamperometric data in FIGS. 2G-2L shows that the current response of the electrochemical. sensor is not affected by the repeated stretching. Thus, the electrochemical performance of the sensor was not impaired by the mechanical deformation. The acoustic transducers, based solely on the silver ink, rely mainly on the temporal resolution of the signals instead of its intensity, and was also not affected by the stretching deformation. Furthermore, additional mechanical tests to measure the example sensor's performance during deformation were implemented (e.g., as shown in FIGS. 20 and 21). The example results also indicate no hysteresis due to the applied strain on the printed electrodes. Thus, the example sensor was able perform normally within the designed level of deformation. As a wearable epidermal sensor, for some examples, the usage of the example sensor could be up to a week, or in other examples, the usage of the example sensor could be up to a month; the example sensor was tested over 1000 times of repeated deformation at the strain of 20%, which is presumed to be extreme and unlikely to occur in real life. Compared to bending and twisting, stretching deformation applies the most mechanical stress to the printed materials. Due to the use of hydrogels, abrasion on the electrode is also less likely to occur. The repeated stretching tests were thus used as the most rigorous test for the durability of the sensor. Overall, the aforementioned supporting data reflect the stable and durable performance of the integrated sensor.

Note 6. Sodium Ion Selective Electrode

The sodium selective membrane cocktail composition included 1 mg sodium ionophore X, 0.55 mg Na-TFPB, 33 mg PVC, and 65.45 mg DOS dissolved in 660 μL of THF (Fisher Chemical). The cocktail was thoroughly mixed to dissolve all the components. The reference cocktail was prepared by dissolving 78.1 mg PVT (Quimidroga S.A.) and 50 mg NaCl in 1 mL methanol. Next, a 3 μL aliquot of the sodium selective membrane cocktail was drop-casted onto the working carbon electrode and the reference electrode was modified by 3 μL aliquot of the reference cocktail, followed by 1 μL of polyurethane (Tecoflex® SG-80A) dissolved in THF (15% w/w). The modified Na-sensors were left to dry overnight before use. Chemicals were obtained from Sigma Aldrich (St. Louis, MO), except when specified otherwise.

FIG. 6 shows a diagram illustrating a fabrication method 600 for a layer-by-layer printing and assembling of an integrated sensor, in accordance with the present technology. At a process 610, the method 600 includes using stretchable silver and PB ink to print the pattern over the SEBS substrate. At a process 620, the method 600 includes printing the stretchable serpentine interconnection using the silver ink. At a process 620, the method 600 includes printing of the iontophoresis (IP) electrodes and the reference electrodes using the silver ink. At a process 630, the method 600 includes printing the counter (curved) and working electrodes (round) using the PB ink. At a process 640, the method 600 includes printing an insulating layer to define the working electrode area and insulate the interconnections using the SEBS resin. At a process 650, the method 600 includes flipping the SEBS substrate backside up and printing the interconnects (e.g., serpentine interconnects) for the transducers and ground using the silver ink. At a process 660, the method 600 includes using a conductive ink solvent (e.g., silver ink solvent) as an adhesive to bond the transducer chips at terminuses of the silver interconnects. At a process 670, the method 600 includes using the conductive ink solvent to as an adhesive to bond a ground wire structure to the other side of the transducers and connect it to the reserved ground interconnect. After the process 670 of the method 600, the partially fabricated device is ready for sensor modifications. The method 600 can optionally include a process 680 to flip the sensor and implement a sensor surface modification method to tailor the sensors for sensing targeted analytes.

FIG. 7 shows a diagram illustrating a method 700 for assembly of ultrasound transducers for some example embodiments of the wearable acoustic-electrochemical sensor devices, in accordance with the present technology. At a process 710, the method 600 includes depositing an organic solvent (e.g., dipping toluene droplets) on the connection pad of the interconnects, e.g., using a pipette to partially dissolve the silver traces. At a process 720, the method 700 includes placing the transducer on the softened pad for bonding. At a process 730, the method 700 includes repeating the processes 710 and 720 and aligning all the transducers along the pattern. At a process 740, the method 700 includes depositing an organic solvent (e.g., dipping toluene droplets) on transducers and the ground interconnect pad, e.g., using a pipette. At a process 750, the method 700 includes applying the ground wire to the transducers and connecting to the ground interconnect pad.

Figure 8:
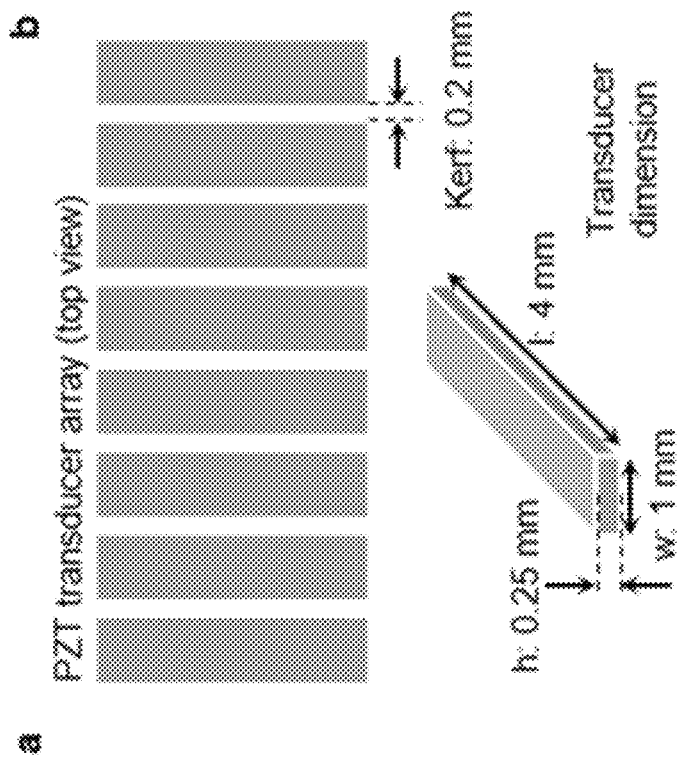
FIG. 8 shows a diagram and an image depicting example transducer dimensions and conformability for example embodiments of a wearable integrated acoustic-electrochemical sensor device, in accordance with the present technology.
Figure 8:
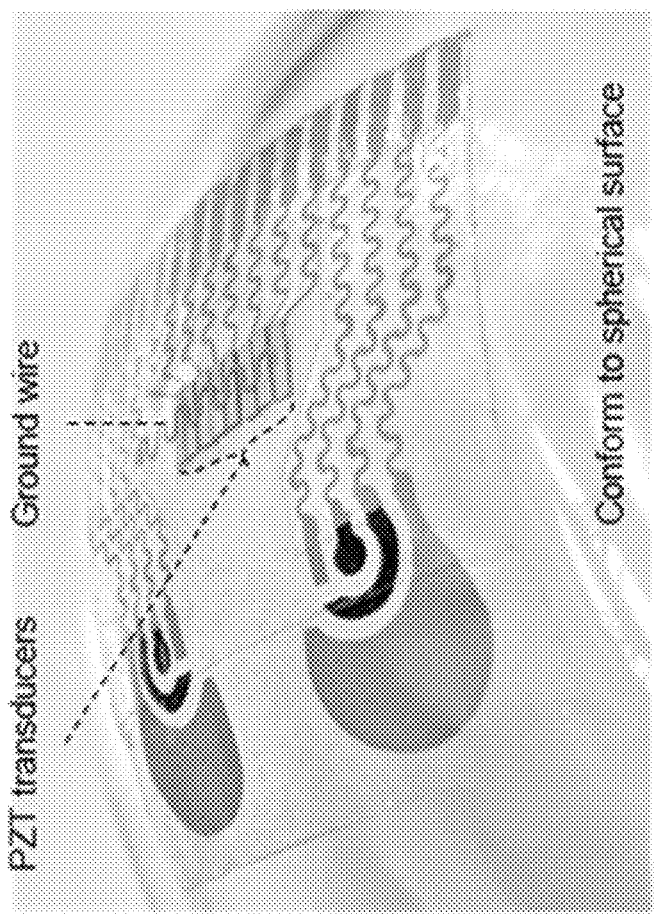

FIG. 8 shows a diagram and an image depicting transducer dimensions and conformability. Diagram (a) of FIG. 8 shows dimensions of example PZT transducer pixels and a transducer array of the PZT transducers, including one example of the size and spacing of the transducer pixels in the array. For example, eight PZT transducer pixels are configured to have a height of about 250 μm, a width of about 1 mm, and a length (or depth) of about 4 mm; and each of these PZT transducer pixels are spaced apart by about 200 The aspect ratio of each pixel is controlled to be smaller than 0.3 (w, l>3 h) to ensure that the PZT vibration is in thickness mode with accurate frequency range or particular frequency. For example, the aspect ratio of the ultrasound transducer array pixels can ensure the acoustic transducer material (e.g., PZT) vibration is in thickness mode in a frequency range of 2 MHz to 10 MHz, and preferably, for example, a frequency range of 5 MHz to 9 MHz. Also, for example, the aspect ratio of the ultrasound transducer array pixels can ensure the acoustic transducer material vibration is in thickness mode at a particular frequency, such as 7 MHz. The ideal frequency or frequency range is selected based on a balance between signal acquisition interests and acquisition system complexities, e.g., as a higher frequency of the acoustic signals may provide for better image quality, but the higher the frequency requires more complexity in the acquisition system (due to higher acquisition rates). Image (b) of FIG. 8 shows a photo of the device on a spherical surface to demonstrate the conformability of the fabricated transducer array.

Figure 9:
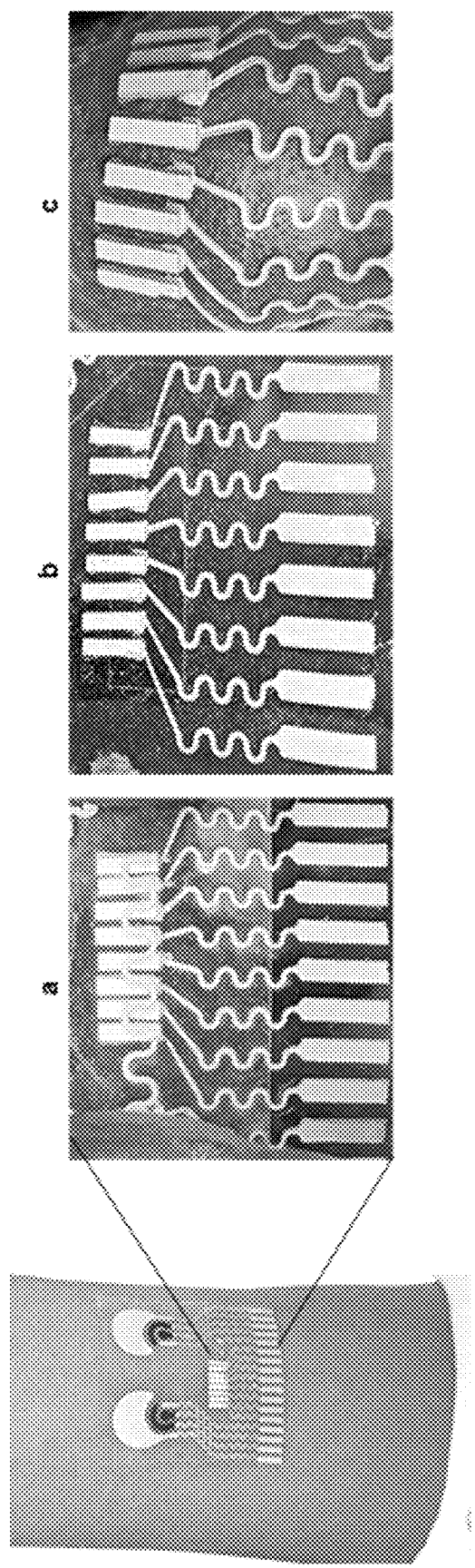
FIG. 9 shows images depicting adhesion of example piezoelectric lead zirconate titanate (PZT) transducers to a substrate of an example embodiment of a wearable integrated acoustic-electrochemical sensor device.

FIG. 9 shows images depicting adhesion of the PZT transducers to the substrate. Photos (a-c) are images of the pristine device before any deformation. Image (a) shows the device during horizontal stretching. Image (b) shows the device under indentation. Image (c) shows the PZT transducers remained well attached to the printed silver traces after the deformations.

FIG. 10 shows diagrams illustrating example electrochemical sensor electrode modifications and reaction mechanisms. The examples shown in FIG. 10 only illustrate the modified working electrode, but it is understood that the electrochemical sensor also includes one or more additional electrodes, e.g., such as a reference electrodes and/or a counter electrode, to perform the described electrochemical reactions.

FIG. 10, diagram (a) illustrates an example lactate sensor modification. The example lactate sensor includes a printed, flexible (e.g., stretchable and/or bendable) carbon-based electrode with embedded Prussian blue (PB) redox mediator probe 1003 for hydrogen peroxide reduction. The PB-embedded electrode 1003 is modified with lactate oxidase (LOx) enzymes 1002 immobilized with a drop-cast polymer, e.g., chitosan stabilizer 1001. As shown in diagram (a), a LOx reaction with lactate leads to the formation of hydrogen peroxide and pyruvate. Further, a PB-based electrode transducer transforms the hydrogen peroxide product to hydroxyl ions (OH—) for selective lactate detection. For example, when lactate is present at the lactate sensor, the LOx reaction leads to the formation of hydrogen peroxide and pyruvate, which the hydrogen peroxide is further reduced by the PB and its reductive current detected at the carbon-based electrode. The current can be therefore correlated with the lactate concentration upon calibration.

FIG. 10, diagram (b) illustrates glucose sensor modification. The example glucose sensor includes a printed, flexible (e.g., stretchable and/or bendable) carbon-based electrode with embedded Prussian blue (PB) redox mediator probe 1003 for hydrogen peroxide reduction. The PB-embedded electrode 1003 is modified with glucose oxide (GOx) enzymes 1004 cross-linked with glutaraldehyde and immobilized with Nafion to form a glutaraldehyde/Nafion layer 1005. As shown in diagram (b), the GOx reaction with glucose leads to the formation of hydrogen peroxide and gluconic acid. The PB-based electrode transducer offers specific detection of the peroxide product towards selective glucose detection. For example, when glucose is present at the glucose sensor, the GOx reaction leads to the formation of hydrogen peroxide and gluconic acid, which the hydrogen peroxide is further reduced by the PB and its current detected at the carbon-based electrode. The current can be therefore correlated with the glucose concentration upon calibration.

FIG. 10, diagram (c) illustrates alcohol sensor modification. The example alcohol sensor includes a printed, flexible (e.g., stretchable and/or bendable) carbon-based electrode with embedded Prussian blue (PB) redox mediator probe 1003 for hydrogen peroxide reduction. The PB-embedded electrode 1003 is modified with alcohol oxidase (AOx) enzymes 1006 immobilized with a drop-cast polymer, e.g., chitosan stabilizer 1001. As shown in diagram (c), the AOx reaction with its ethanol substrate results in the formation of hydrogen peroxide and acetaldehyde. The PB-based electrode transducer offers specific detection of the peroxide product towards selective alcohol detection. For example, when ethanol is present at the alcohol sensor, the AOx reaction leads to the formation of hydrogen peroxide and acetaldehyde, which the hydrogen peroxide can be further reduced by the PB and its reductive current detected at the carbon-based electrode. The current can be therefore correlated with the ethanol concentration upon calibration.

FIG. 10, diagram (d) illustrates caffeine sensor modification. The example caffeine sensor includes a screen-printed, flexible (e.g., stretchable and/or bendable) carbon-based electrode 1012 modified with carbon nanotubes (CNTs) 1014 immobilized with Nafion 1016, e.g., for increase effective electrochemical active area. As shown in diagram (d), the anodic oxidation of the caffeine analyte results in the production of uric acid and electron flow. The DPV peak current corresponds to the caffeine concentrations. For example, when caffeine is present at the caffeine electrode, the sensor is scanned via differential pulse voltammetry from 0.8-1.8 V and the oxidation peak current of caffein is measured, corresponding to the oxidation of caffeine at the applied high potential on the surface of the CNT electrodes. The concentration of the caffeine can be correlated with the peak current upon calibration.

Figure 11:
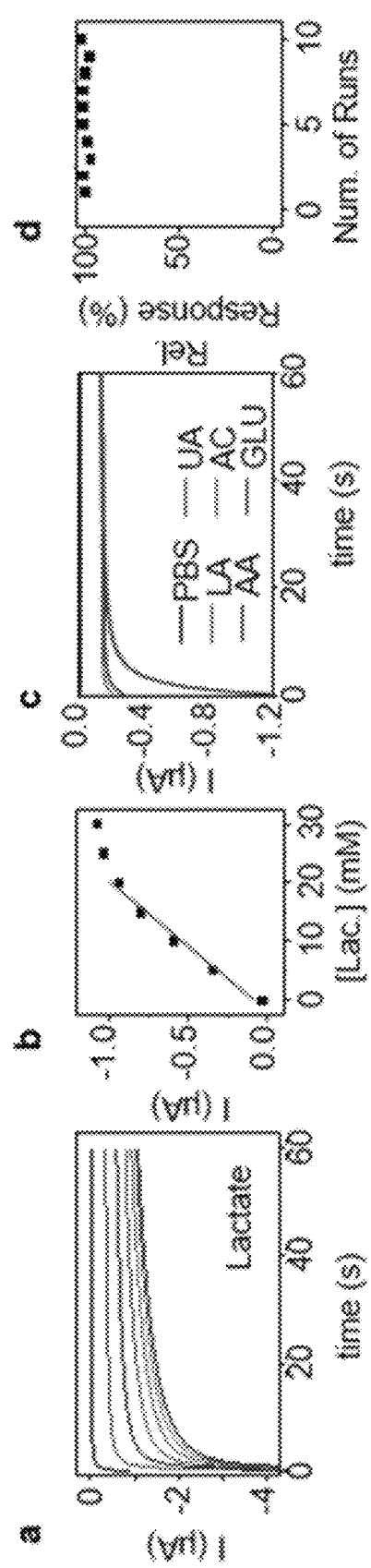
FIG. 11 shows data plots depicting an in vitro characterization of a lactate sensor in example implementations of a wearable integrated acoustic-electrochemical sensor device.

FIG. 11 shows data plots depicting example in vitro characterization data of an example lactate sensor. Plot (a) shows the lactate sensor's amperometric response to successive additions of 5 mM lactate from 0 to 30 mM. Plot (b) shows a lactate calibration curve based on the data of Plot (a). Plot (c) shows the evaluation of the lactate sensor selectivity in the presence of lactate (LA, 2 mM), glucose (GLU, 0.2 mM), ascorbic acid (AA, 10 μM), uric acid (UA, 60 μM) and acetaminophen (AC, 10 μM). Plot (d) shows the stability of the lactate: 10 repetitive measurements of 2 mM lactate.

Figure 12:
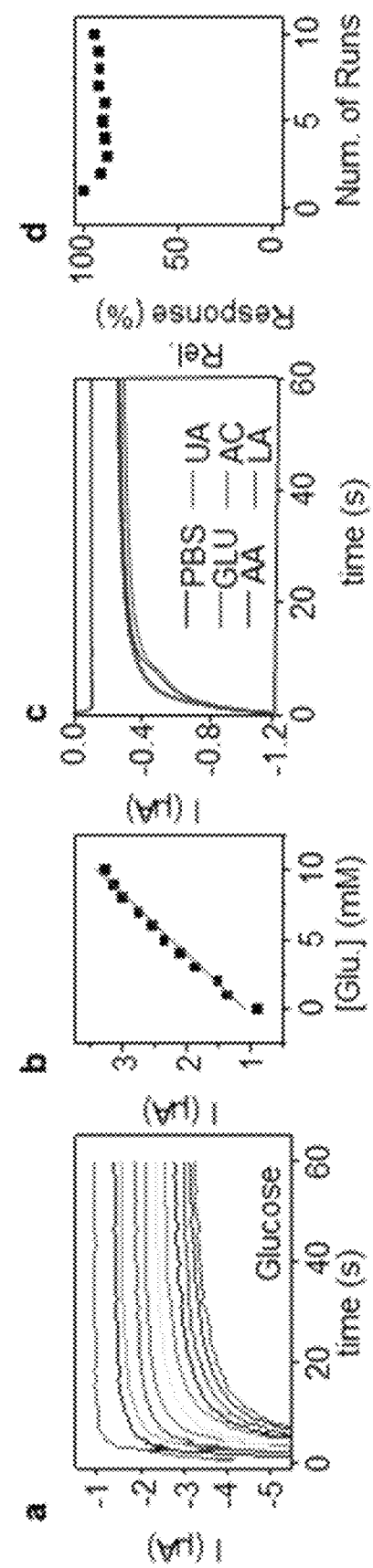
FIG. 12 shows data plots depicting an in vitro characterization of a glucose sensor in example implementations of a wearable integrated acoustic-electrochemical sensor device.

FIG. 12 shows data plots depicting example in vitro characterization data of an example glucose sensor. Plot (a) shows the glucose sensor's amperometric response to successive 1 mM glucose additions from 0 to 10 mM. Plot (b) shows the glucose calibration curve based on the data of Plot (a). Plot (c) shows the evaluation of the glucose sensor selectivity in the presence of GLU (2 mM), LA (10 mM), AA (10 µM), UA (10 µM) and AC (10 µM). Plot (d) shows the stability of the glucose sensor: 10 repetitive measurements of 2 mM glucose.

Figure 13:
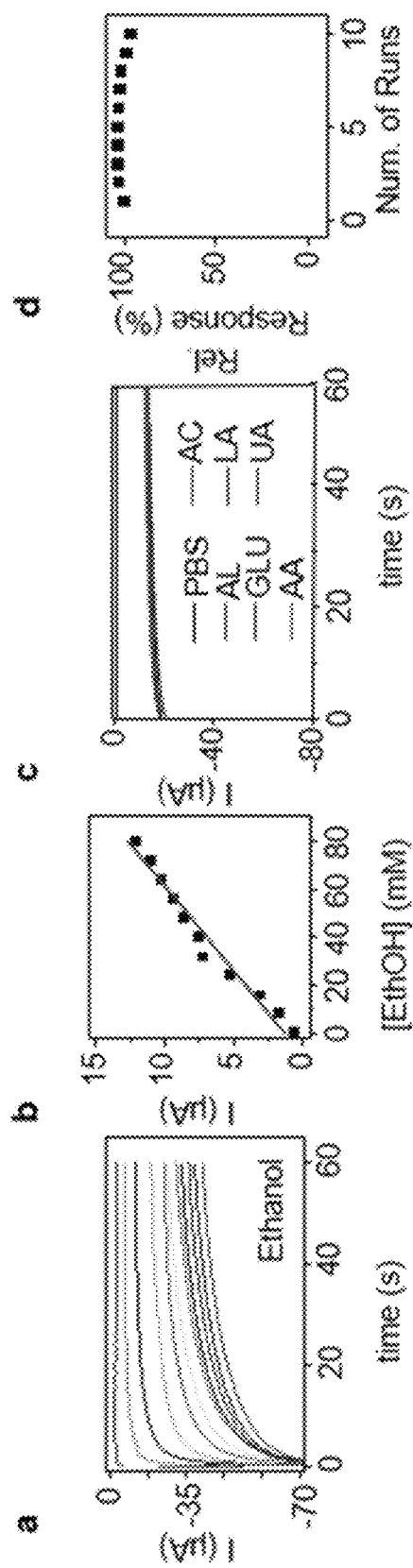
FIG. 13 shows data plots depicting an in vitro characterization of an alcohol sensor in example implementations of a wearable integrated acoustic-electrochemical sensor device.

FIG. 13 shows data plots depicting example in vitro characterization data of an example alcohol sensor. Plot (a) shows the glucose sensor's amperometric response to successive 8 mM ethanol increments from 0 to 80 mM. Plot (b) shows the calibration curve of the alcohol sensor based on the data of Plot (a). Plot (c) shows a selectivity test in the presence of AL (20 mM), GLU (0.2 mM), AA (10 µM), LA (10 mM), UA (60 µM) and AC (10 µM). Plot (d) shows the stability of the alcohol sensor: 10 repetitive measurements of 20 mM alcohol.

Figure 14:
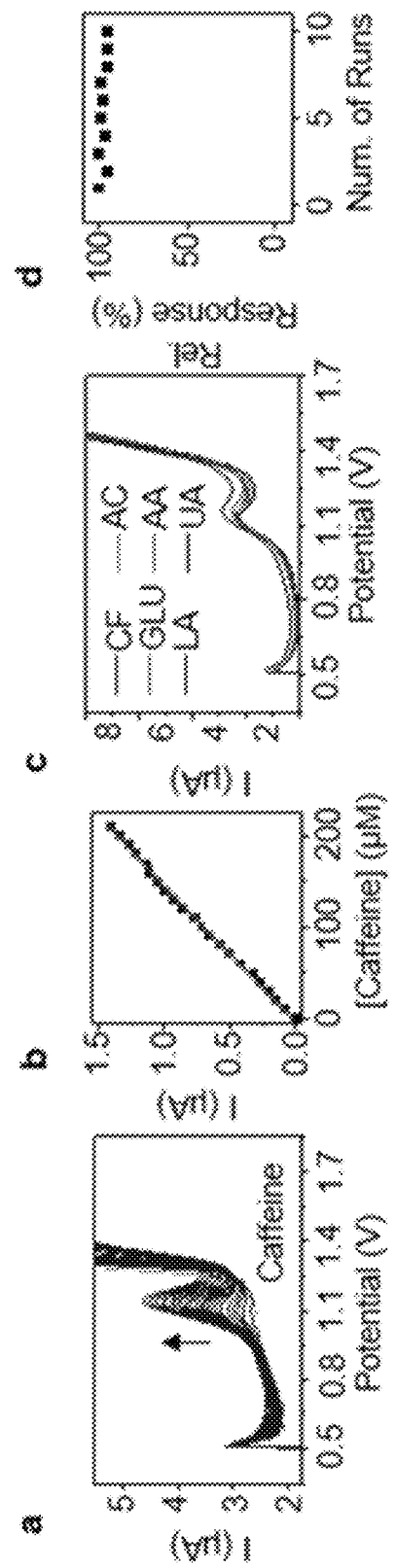
FIG. 14 shows data plots depicting an in vitro characterization of a caffeine sensor in example implementations of a wearable integrated acoustic-electrochemical sensor device.

FIG. 14 shows data plots depicting example in vitro characterization data of an example caffeine sensor. Plot (a) shows the caffeine sensor's DPV response of increasing caffeine additions in 10 µM steps from 0 to 200 µM. Plot (b) shows a corresponding caffeine calibration curve based on the data of Plot (a). Plot (c) shows the evaluation of the caffeine sensor selectivity in the presence of CF (20 µM), GLU (0.2 mM), LA (10 mM), AA (10 µM), UA (60 µM) and AC (10 µM). Plot (d) shows the stability of the caffeine sensor: 10 repetitive DPV measurements of 20 µM caffeine.

Figure 15:
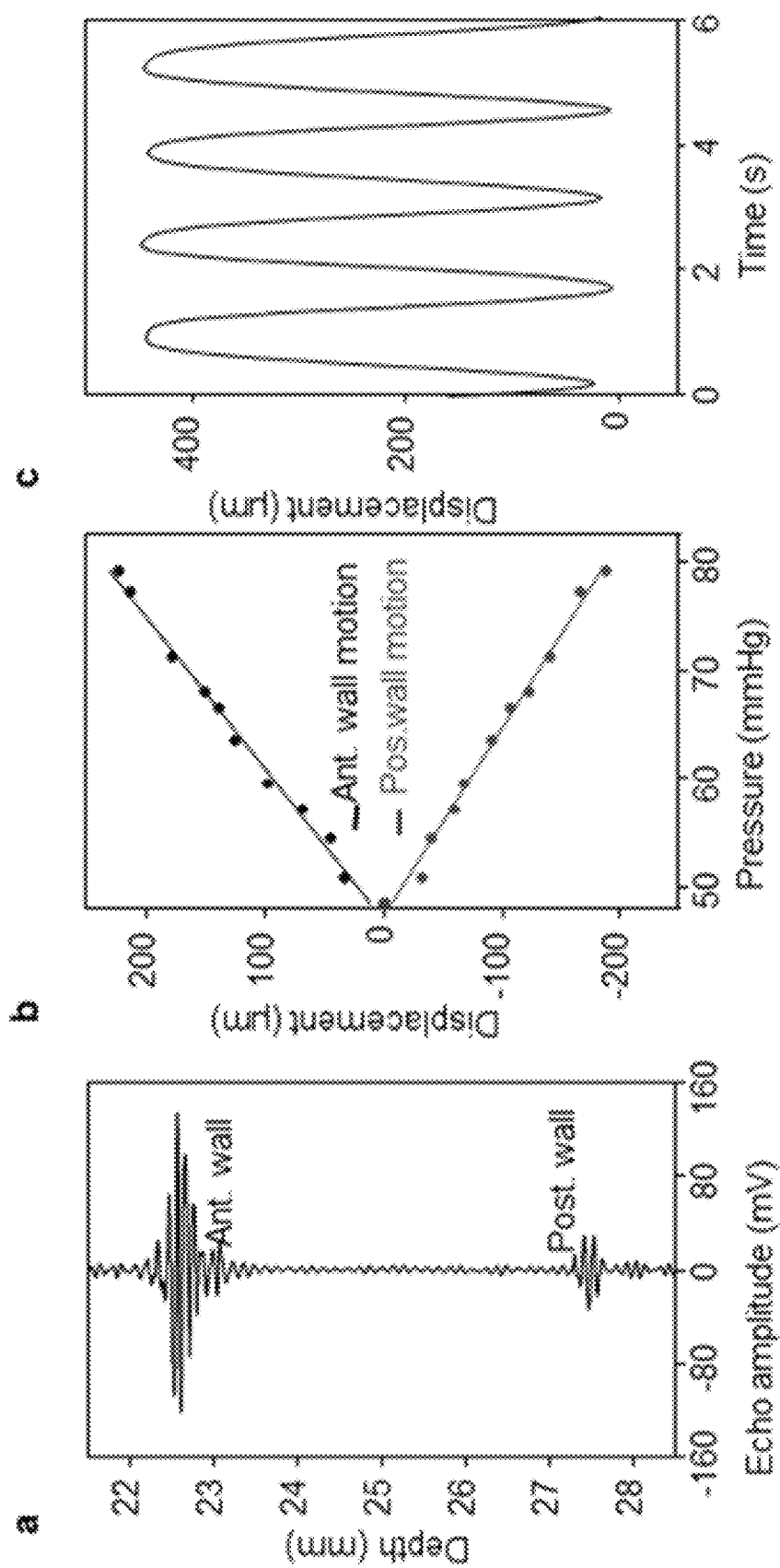
FIG. 15 shows data plots depicting ultrasound transducer characterization on phantom in example implementations of a wearable integrated acoustic-electrochemical sensor device.

FIG. 15 shows data plots depicting ultrasound transducer characterization on a phantom. Plot (a) depicts a radio frequency signal showing the anterior wall and posterior wall of the carotid artery phantom. Plot (b) shows vessel wall displacement with increased intravascular pressure on phantom. Plot (c) shows periodic vessel distension induced by the inflator.

FIG. 16 shows a diagram and a data plot illustrating optimal channel selection for accurate artery diameter tracking. Diagram (a) shows the optimal channel was determined by calculating the time of flight (ToF) of the ultrasound signal. Data plot (b) shows the raw RF signal showing different ToF values from two adjacent transducers. In the example implementations, only the maximum ToF between anterior wall and posterior wall would be recognized as the 'diameter' of the artery. Thus, the accurate diameter tracking could be guaranteed by the channel selection.

FIG. 17 shows data plots depicting electrode electrochemical stability under repeated stretching tests. Plots (a) and (b) show the CV response of the PB electrode every 200 cycles in a 1000-cycle, 20% strain stretching test [plot (a)] and the corresponding reduction peak potentials and peak currents [plot (b)]. Plots (c) and (d) show the CA response at −0.2 V applied anodic potential of the PB electrode every 200 cycles in a 1000-cycle, 20% strain stretching test [plot (a)], and the corresponding end-point currents [plot (d)]. Electrochemical tests were performed in 0.1M PBS with pH 7.4, against an Ag/AgCl reference electrode.

FIG. 18 shows data plots depicting sensor electrochemical stability under repeated stretching tests. Plots (a-b) show the response of modified lactate sensor to 2 mM lactate before (a) and after (b) 10 cycles of 20% stretching. Plots (c-d) show the response of modified glucose sensor to 10 mM glucose before (a) and after (b) 10 cycles of 20% stretching. CA was recorded using a potential of −0.2 V in 0.1 M PBS with pH 7.4.

FIG. 19 shows images depicting structural integrity of the stretchable silver and PB/carbon ink composites. Image (a) is a photograph of the device before and after stretched to 120%. Images (b)-(e) depict scanning electron micrograph (SEM) images in different magnifications of the silver trace before (b) and after (c) 1000 cycles of 20% stretching, and of the carbon trace before (d) and after (e) 1000 cycles of 20% stretching.

FIG. 20 shows images and data plots illustrating electrochemical performance under mechanical deformation. Panel (a) shows an image (i) and a data plot (ii) of the example sensor under 20% vertical strain and of the electrochemical response (e.g., chronoamperometry at −0.2V in PBS 0.1M, pH 7) under 20% stretching every 200 stretching cycles until 1000 cycles (RSD=18.6%). Panel (a) shows an image (i) and data plot (ii) of the example sensor under 20% horizontal strain and of the electrochemical response (e.g., chronoamperometry at −0.2V in PBS 0.1M, pH 7) under 20% stretching every 200 stretching cycles until 1000× (RSD=15.8%).

FIG. 21 shows images and data plots illustrating the electrochemical performance of the GOx modified biosensor under mechanical deformation. Panel (a) shows an image and data plots depicting the example sensor under 20% vertical strain and the electrochemical response of the sensor to 10 mM glucose after stretching the sensor vertically 100 times at 120% and recording the signal every 10 stretching cycles (RSD=3.45%) in data plot (i), and the response while the sensor was under stress, after every 10-stretching deformation (RSD=5.42%) in data plot (ii). Panel (b) shows an image and data plots depicting the example sensor under 20% horizontal strain and the electrochemical response of the sensor to 10 mM glucose after stretching the sensor horizontally 100 times at 120% and recording the signal every 10 stretching cycles (RSD=2.33%) in data plot (i), and the response under stress after every 10-stretching deformation (RSD=3.14%) in data plot (ii). Panel (c) shows a data plot depicting the variation of current response to 10 mM glucose for all deformations (RSD=5.18%). Panel (d) shows a data plot depicting the error associated to each deformation cycle including all deformations; higher error is associated to the first cycles.

Figure 22:
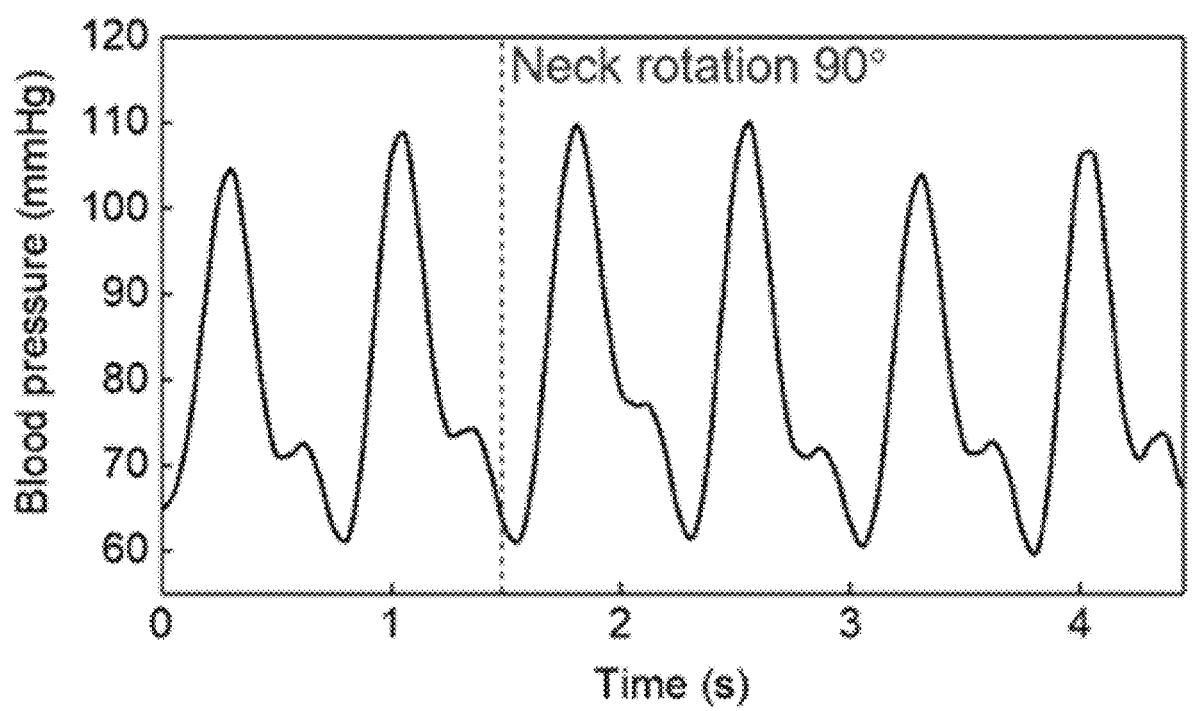
FIG. 22 shows a data plot depicting the BP signal measured on-body while turning the neck 90° to the side, with no obvious change of signal quality, conducted in example implementations of an example embodiment of a wearable integrated acoustic-electrochemical sensor device.

FIG. 22 shows a data plot depicting the BP signal from an example wearable acoustic-chem sensor device measured on-body while turning the neck 90° to the side, with no obvious change of signal quality.

Figure 23:
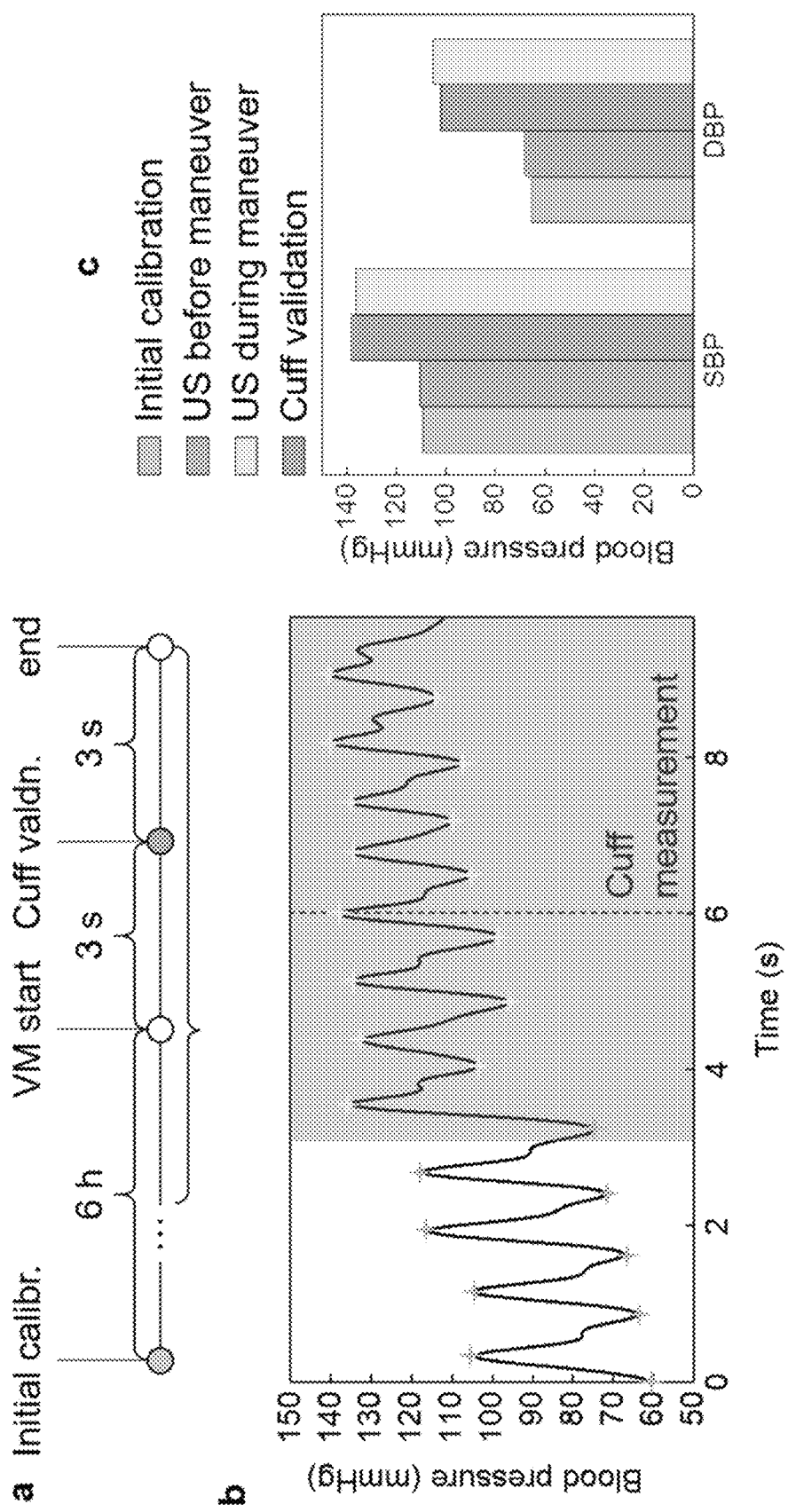
FIG. 23 shows data plots depicting the BP variation during the Valsalva maneuver, conducted in example implementations of an example embodiment of a wearable integrated acoustic-electrochemical sensor device.

FIG. 23 shows data plots depicting the BP variation from an example wearable acoustic-chem sensor device during the Valsalva maneuver. Plot (a) depicts the event timeline of the BP signal recording during a Valsalva maneuver. Plot(b) depicts the BP waveform during the initial phase of the Valsalva maneuver. A sudden increase in BP is observed. The local peaks (systolic BP) and troughs (diastolic BP) were indicated (blue points—before maneuver, yellow points—during maneuver). Plot (c) depicts comparison of the systolic and diastolic BP to the initial cuff calibration, the average BP before and during the maneuver measured by the patch, and the validation using the cuff during the maneuver.

Figure 24:
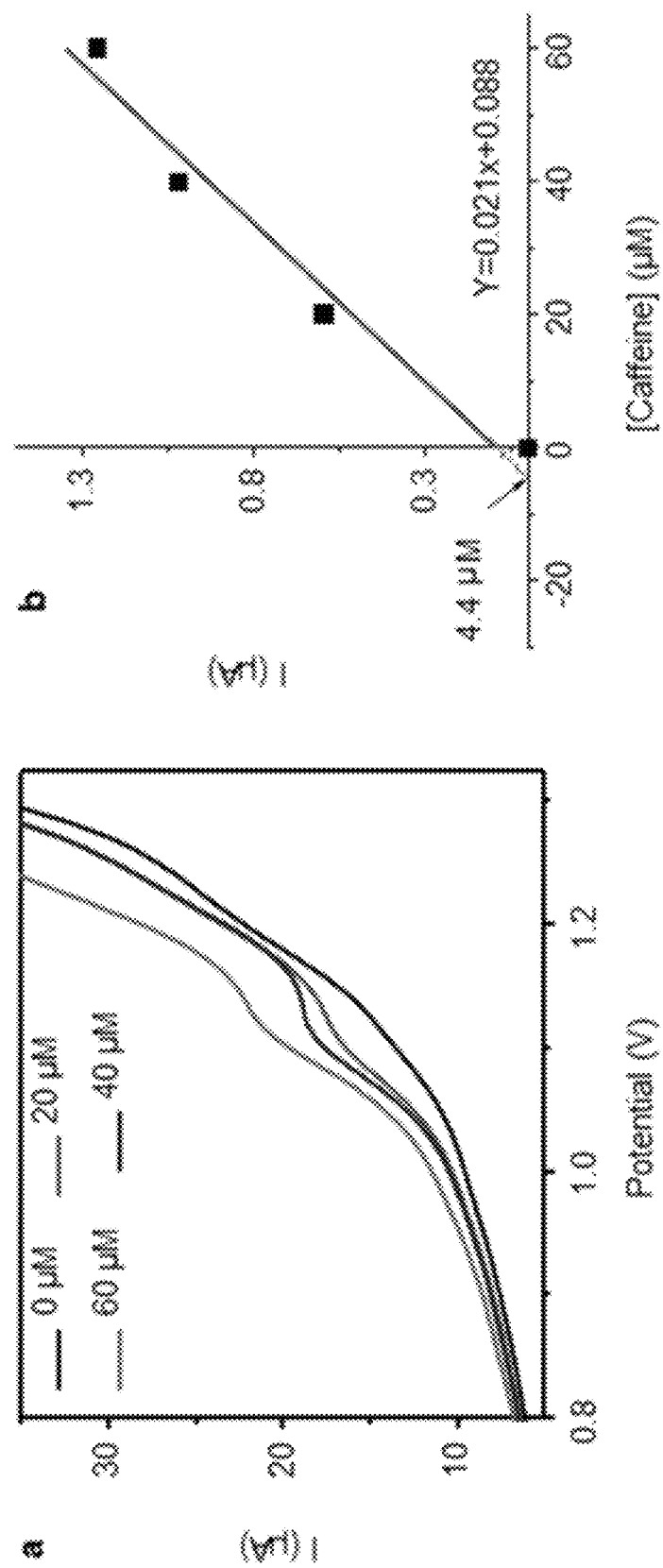
FIG. 24 shows data plots depicting standard additions to determine caffeine concentration in sweat in example implementations.

FIG. 24 shows data plots depicting standard additions to determine caffeine concentration in sweat. Plot (a) depicts differential pulse voltammetry (DPV) of caffeine in collected sweat (after drinking 114 mg caffeine). Increasing concentrations of caffeine were added to the collected sweat and the respective calibration curve was used to analyze the initial caffeine concentration in sweat in the Plot (b) calibration curve. The horizontal axis shows the concentration range used in the test. The vertical axis shows the current change after each addition.

Figure 25:
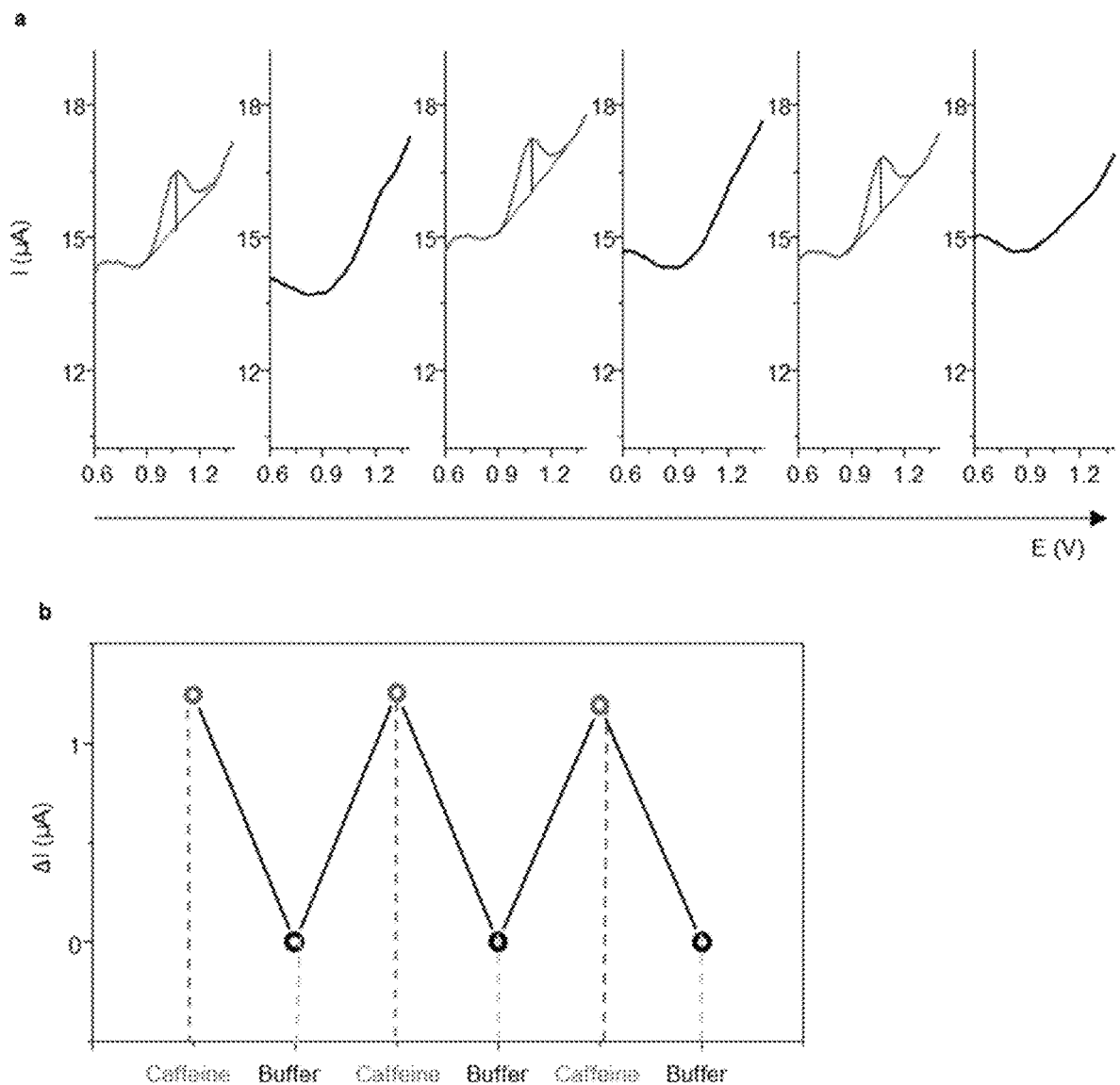
FIG. 25 shows data plots depicting a reversibility test for an example voltammetric caffeine sensor in example implementations of a wearable integrated acoustic-electrochemical sensor device.

FIG. 25 shows data plots depicting the reversibility test for the voltammetric caffeine sensor. Solutions containing only acetate buffer 0.01M, pH 4.5 and 200 µM of caffeine in the same buffer were measured alternately. Plot (a) depicts DPV for caffeine (green) followed by the DPV of the acetate buffer. Every time the solution was wiped from the electrode surface, and surface rinsed with buffer for the next measurement of buffer or caffeine. Plot (b) depicts peak current for each caffeine measurement compared with the buffer alone; the buffer signal was normalized to zero.

FIG. 26 shows diagrams depicting an example embodiment of a method 2600 for preparation and assembly of the hydrogel layers. Diagram (a) of FIG. 26 depicts an anode hydrogel preparation process 2610 of the method 2600. At step (i) of process 2610, the method 2600 includes keeping a mixture of 4% agarose and DI water under continuous stirring (e.g., at 150° C.) until complete dissolution, then adding the 2% pilocarpine nitrate under stirring. At step (ii) of the process 2610, the method 2600 includes depositing (e.g., drop-casting) a volume (e.g., 300 µL) of the solution in the mold (e.g., ECOFLEX molds). After cooling, for example, the viscous solution on the mold became a solid coin shape hydrogel. Diagram (b) of FIG. 26 depicts cathode hydrogel preparation 2620 of the method 2600. At step (i) of the process 2620, the method 2600 includes keeping the mixture of 4% agarose and 0.1 M PBS (pH 7.4) buffer at continuous stirring (e.g., at 150° C.) until observing complete agarose dissolution. At step (ii) of the process 2620, the method 2600 includes depositing (e.g., drop-casting) a volume (e.g., 300 µL) of the solution in ECOFLEX molds. After cooling, for example, the viscous solution on the mold became a solid coin shape hydrogel. Diagram (c) of FIG. 26 depicts hydrogel assembly process 2630 of the method 2600. At step (i) of the process 2630, the method 2600 includes cutting coin shape anode and cathode hydrogel disks with the shape of the screen-printed pattern of the anode and cathode respectively. At step (ii) of the process 2630, the method 2600 includes, after the shape was provided, placing the anode hydrogel on the left side and placing the cathode hydrogel on the right side.

FIG. 27 shows photos depicting the assembly of iontophoretic and ultrasound hydrogels for an example embodiment of a wearable acoustic-electrochemical sensor device. Photo (a) depicts an example commercial solid gel pad for ultrasound inspection integrated on device. The picture shows a freestanding cut piece of solid gel. The hydrogels for cathode and anode were cut into the shape of the IP electrodes. Photo (b) depicts the example solid gel pad after the shape was provided, and photo (c) depicts the anode hydrogel was placed on the left side and the cathode hydrogel was placed in the right side.

FIG. 28 shows photos depicting a transfer process of the example wearable acoustic-electrochemical sensor device of FIG. 27. Photo (a) depicts double-sided tattoo adhesive. Photo (b) depicts opening for the sensing areas. Photo (c) depicts removing the first protective layer from the double-sided tattoo adhesive with opening for the sensing areas. Photo (d) depicts applying adhesive to the tattoo; Photo (e) depicts after removing the second protective layer from the applied adhesive. Photo (f) depicts placing the hydrogels and US gel. Photos (g) and (h) depict transferring to the body.

Figure 29:
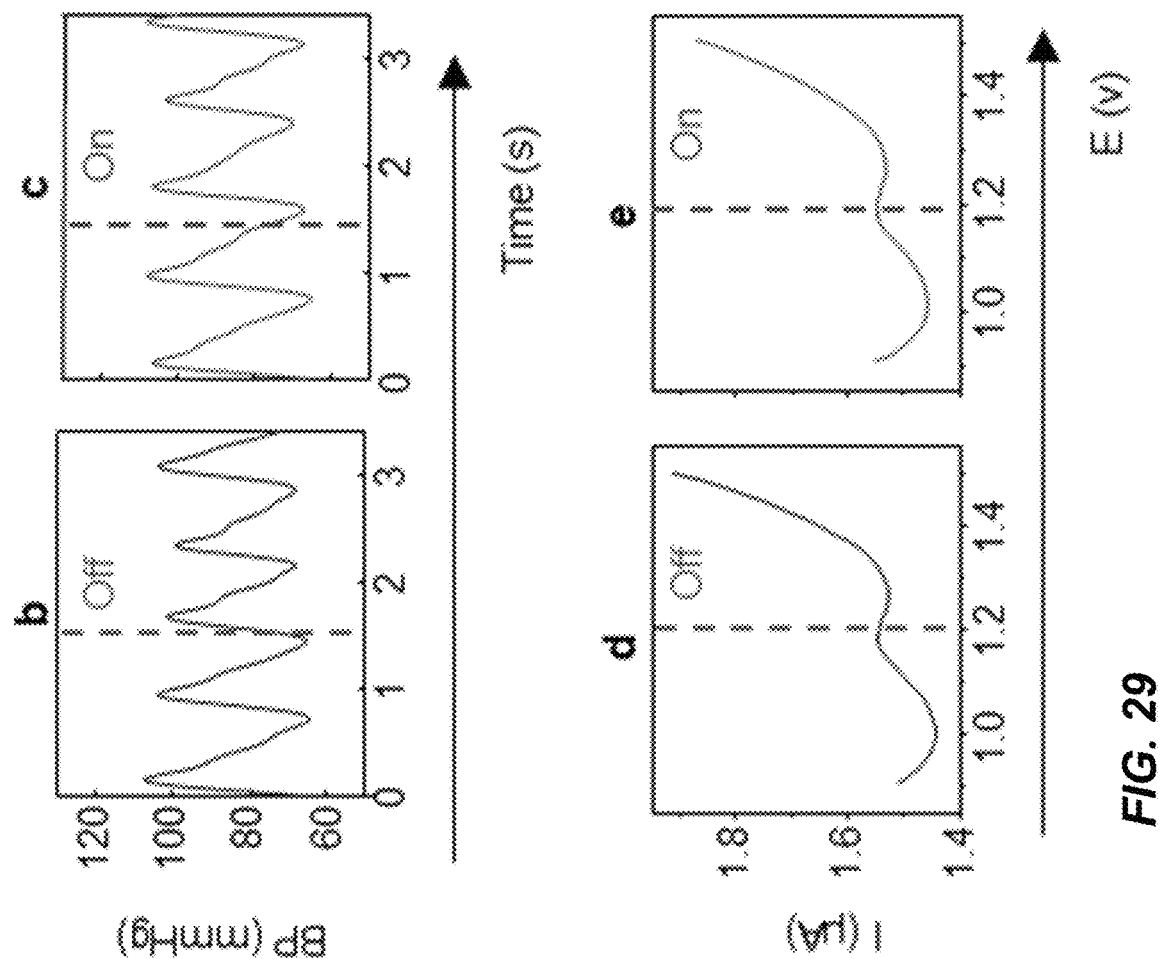
FIG. 29 shows a diagram and data plots depicting characterization of an example multimodal wearable sensor in example implementations.

FIG. 29 shows a diagram and data plots depicting an example characterization of an example multimodal wearable sensor. Diagram (a) depicts signal interference study between the sweat caffeine electrochemical sensor (left side) and the BP transducer, including data plot (b) depicting BP signal recording while initially sweeping the potential for caffeine detection followed by terminating the sweeping (off), and data plot (c) depicting BP signal recording while the potential sweeping for caffeine detection is off followed by initiating the sweeping (on). The effect of the BP signal on the caffeine detection was also investigated. Data plot (d) depicts DPV was recording for caffeine detection while the BP was active, following by terminating the BP signal acquisition (off). Data plot (e) depicts DPV recording for caffeine detection while the BP was inactive, following by initiating the BP signal acquisition (on).

Figure 30:
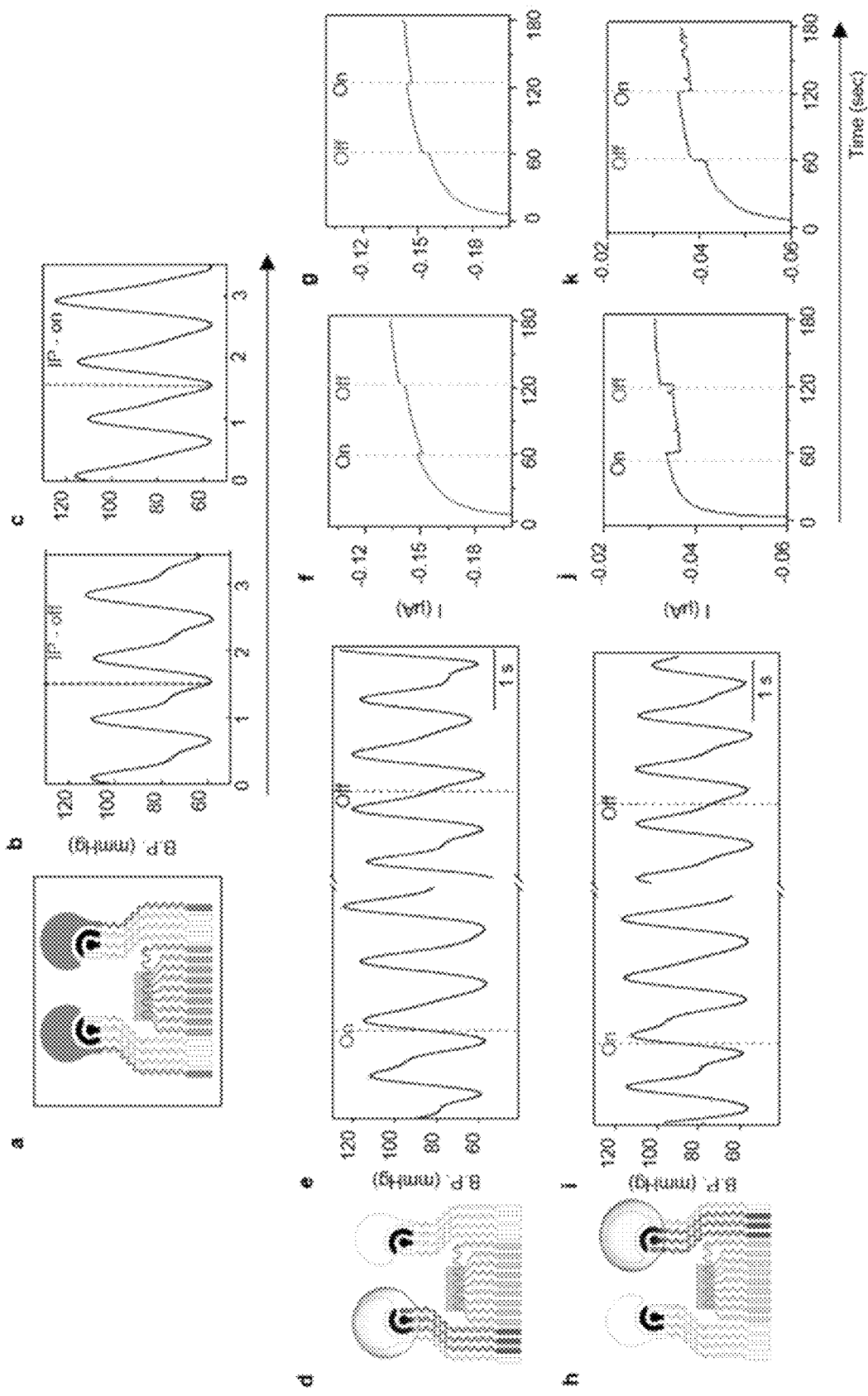
FIG. 30 depicts diagrams and data plots illustrating on body cross-talking evaluation of the example multimodal wearable sensor in example implementations.

FIG. 30 shows diagrams and data plots illustrating an example on body cross-talking evaluation of an example multimodal wearable sensor. Diagram (a) depicts signal interference study between iontophoretic current (0.3 mA/cm2) applied between cathode and anode (dark orange color) and blood pressure device (light orange color). Data plot (b) depicts blood pressure wave form recorded when the IP current was initially on, and next turned off. Data plot (c) depicts blood pressure waveform recorded when the IP current was initially off and then turned on. Diagram (d) depicts cross talking study between detection potential for glucose (dark green) and the blood pressure ultrasound device (light green). Data plot (e) depicts BP signal recorded while the detection potential was initially off, followed by turning the detection potential (−0.2V) on (red dotted line) and off (blue dotted line). Data plot (f) and (g) depict glucose signal recording while applying an on/off ultrasound cycle every 60 seconds during 3 min. Diagram (h) depicts cross talking study between the lactate detection potential (dark blue) and the blood pressure ultrasound device (light blue). Data plot (i) depicts BP signal recorded while the detection potential was initially off, followed by turning the detection potential −0.2V on (red dotted line) and off (blue dotted line). Data plot (j) depicts lactate signal recording while applying the ultrasound cycle on/off every 60 seconds during 3 min. Data plot (k) depicts lactate signal recording while applying the ultrasound cycle off/on every 60 seconds during 3 min.

Figure 31:
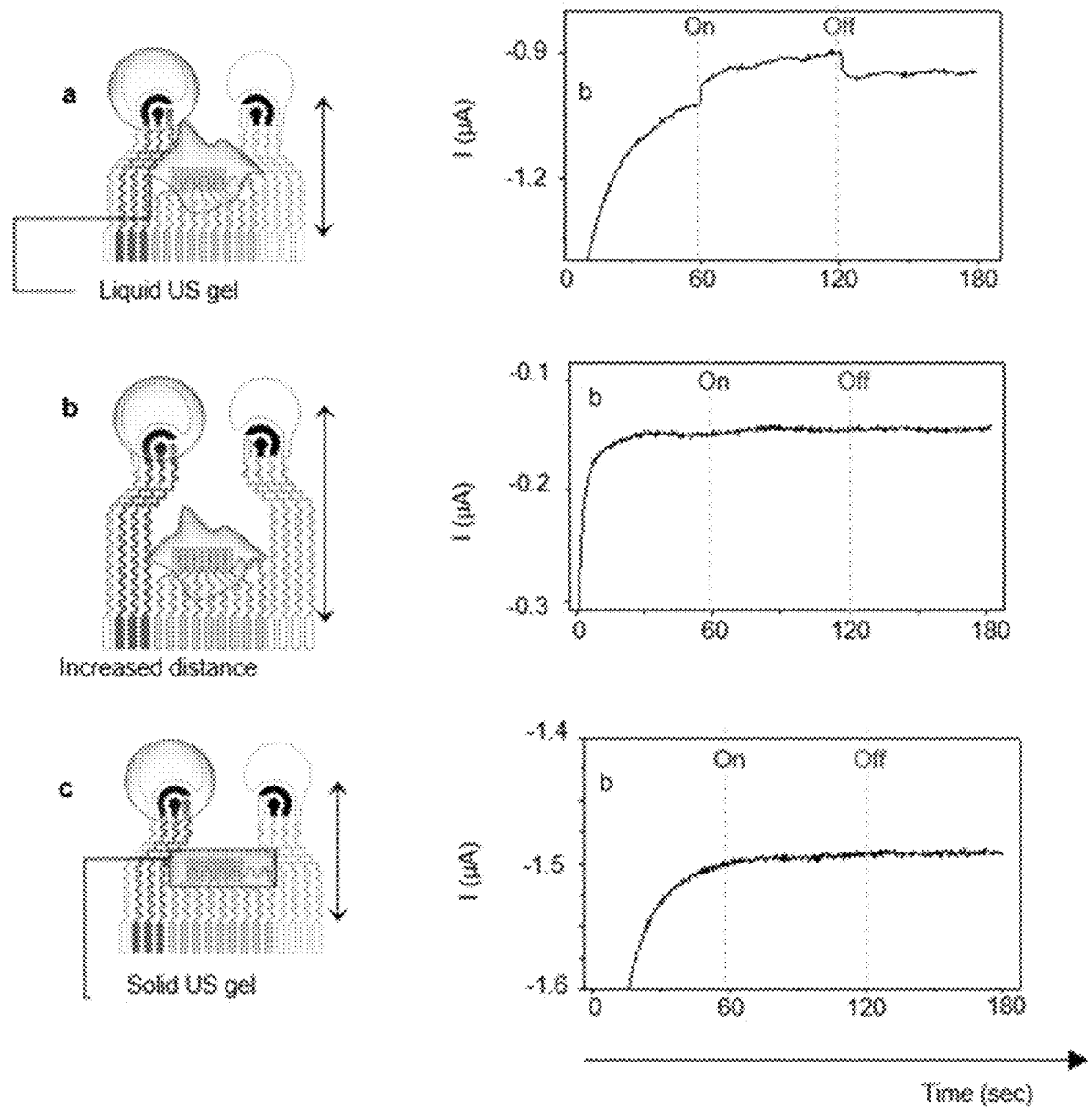
FIG. 31 shows diagrams and data plots depicting an in vitro cross-talking evaluation of the example multimodal wearable sensor in example implementations.

FIG. 31 shows diagrams and data plots depicting an example in vitro cross-talking evaluation of an example multimodal wearable sensor. In vitro measurements were performed using the agarose-PBS hydrogel and the ultrasound gel placed over the blood pressure transducers. Panel (a) shows a diagram and data plot depicting the PBS hydrogel and ultrasound gel were in contact while the ultrasound pulse was turned on and off (right), respectively. A decreasing (more positive current) was observed when the gels were in contact. Panel (b) shows a diagram and data plot depicting a different design with increased distance between the gels were used in vitro with the same amount of ultrasound gel, due to the physical distance, no cross talking was observed (right). Panel (c) shows a diagram and data plot depicting the same design (with shorter distance between the blood pressure and chemical sensors) was used with a solid hydrogel and no apparent cross talking was observed (right).

Figure 32:
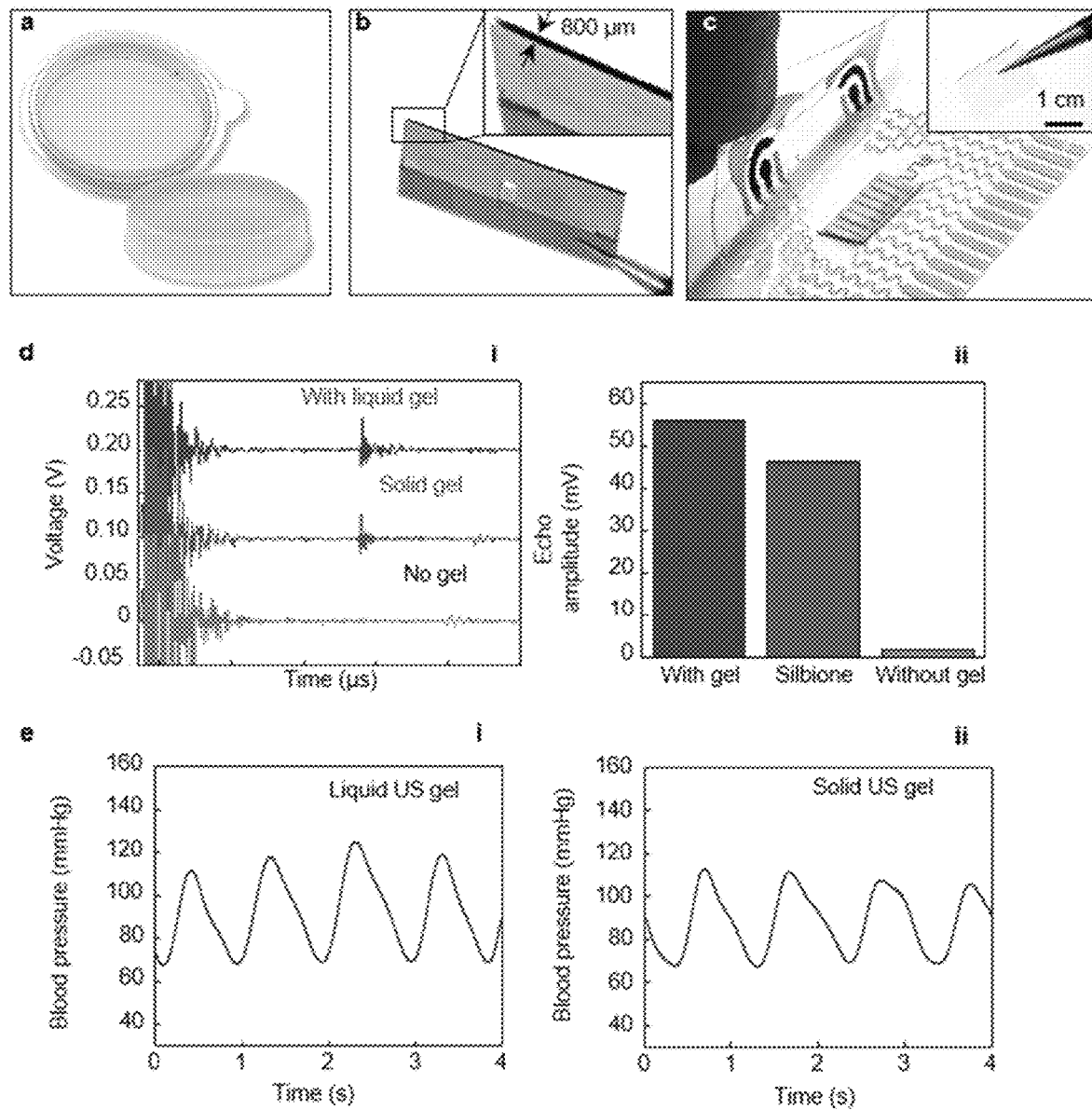
FIG. 32 shows images and data plots depicting preparation and test results of an example solid ultrasound gel in example implementations.

FIG. 32 shows images and data plots depicting an example implementation for preparing and testing an example solid ultrasound gel. Image (a) depicts the commercial solid gel pad for ultrasound inspection. Image (b) depicts the razor blades used to cut thin slice of solid ultrasound gel; the insert shows the gap between the blades are 800 Image (c) depicts integrated solid gel on device. The insert in the image (c) shows a freestanding cut piece of solid gel. Panel (d) includes data plots depicting ultrasound penetration intensity test with a pulse-echo test that is performed in data plot (i) using a phantom ECOFLEX with the liquid and solid ultrasound gel and in the absence of the gel; the respective echo amplitude is compared in data plot (ii). Panel (e) includes data plots depicting on body experiment comparing the BP waveform measured with liquid [data plot (i)] and solid ultrasound gel [data plot (ii)].

Figure 33:
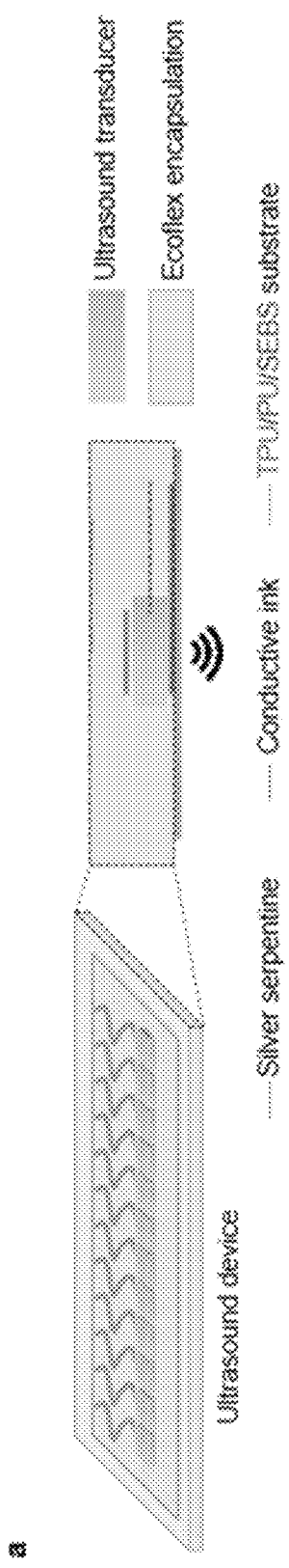
FIG. 33 shows a diagram and data plots depicting the effect of an example embodiment of a substrate on ultrasound transmission.
Figure 33:
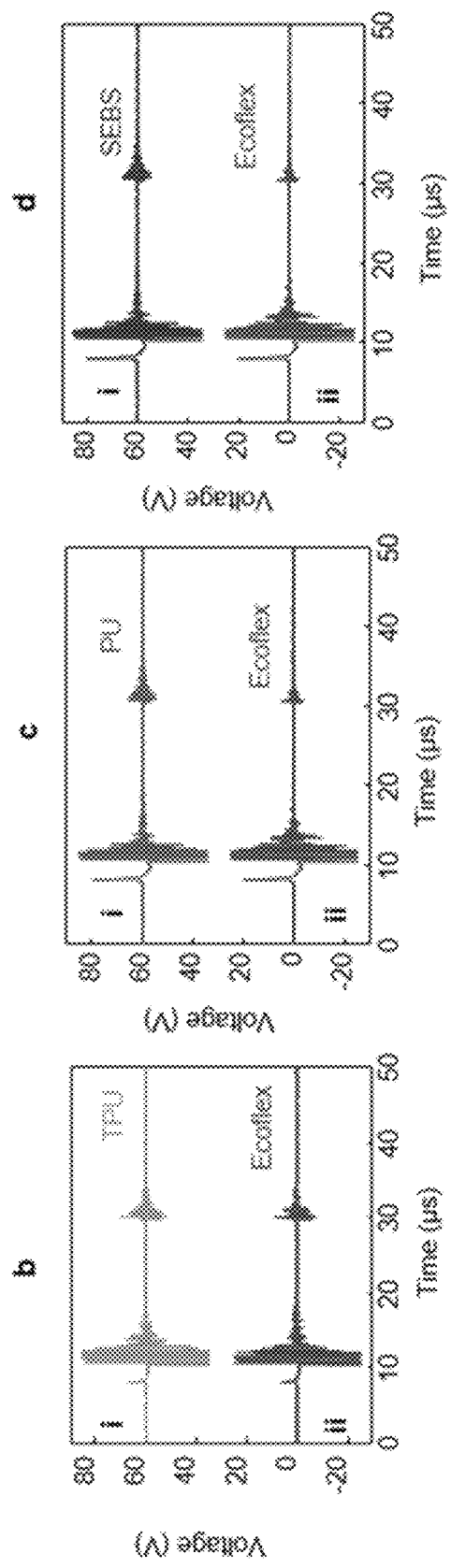

FIG. 33 shows a diagram and data plots depicting the effect of an example substrate for a wearable, integrated acoustic-electrochemical sensor device on ultrasound transmission. Substrates with certain ultrasound impedance will result in a different ultrasound penetration intensity. Diagram (a) depicts an illustration of an example fabrication process. A pulse-echo test was performed on different materials as substrates, including Thermoplastic Polyurethane (TPU), polyurethane (PU), styrene-ethylene-butylene-styrene block copolymer (SEBS), and ECOFLEX. Data plot (b) shows example data of pulse echoes for TPU (plot (i)) and ECOFLEX (plot (ii)); data plot (c) shows example data of pulse echoes for PU (plot (i)) and ECOFLEX (plot (ii)); and data plot (d) shows example data of pulse echoes for SEBS (plot (i)) and ECOFLEX (plot (ii)). The echo signal intensity is directly compared for the ultrasound penetration.

FIG. 34 shows data plots depicting on body evaluation for caffeine intake. Data plots in panel (a) depict an on-body evaluation of BP changes for a volunteer with no habitual caffeine intake (caffeine intolerant), before and after caffeine sugar free beverage consumption (right), and the bar graph represent the sensor validation using a commercial cuff (white) and BP readings obtained with ultrasound transducer (orange). Data plots in panel (b) depict an on-body evaluation of BP changes for a volunteer with regular caffeine intake habits (caffeine tolerant), before and after caffeine sugar free beverage consumption (right), and the bar graph represent the sensor validation using a commercial cuff (white) and BP readings obtained with ultrasound transducer (orange).

Figure 35:
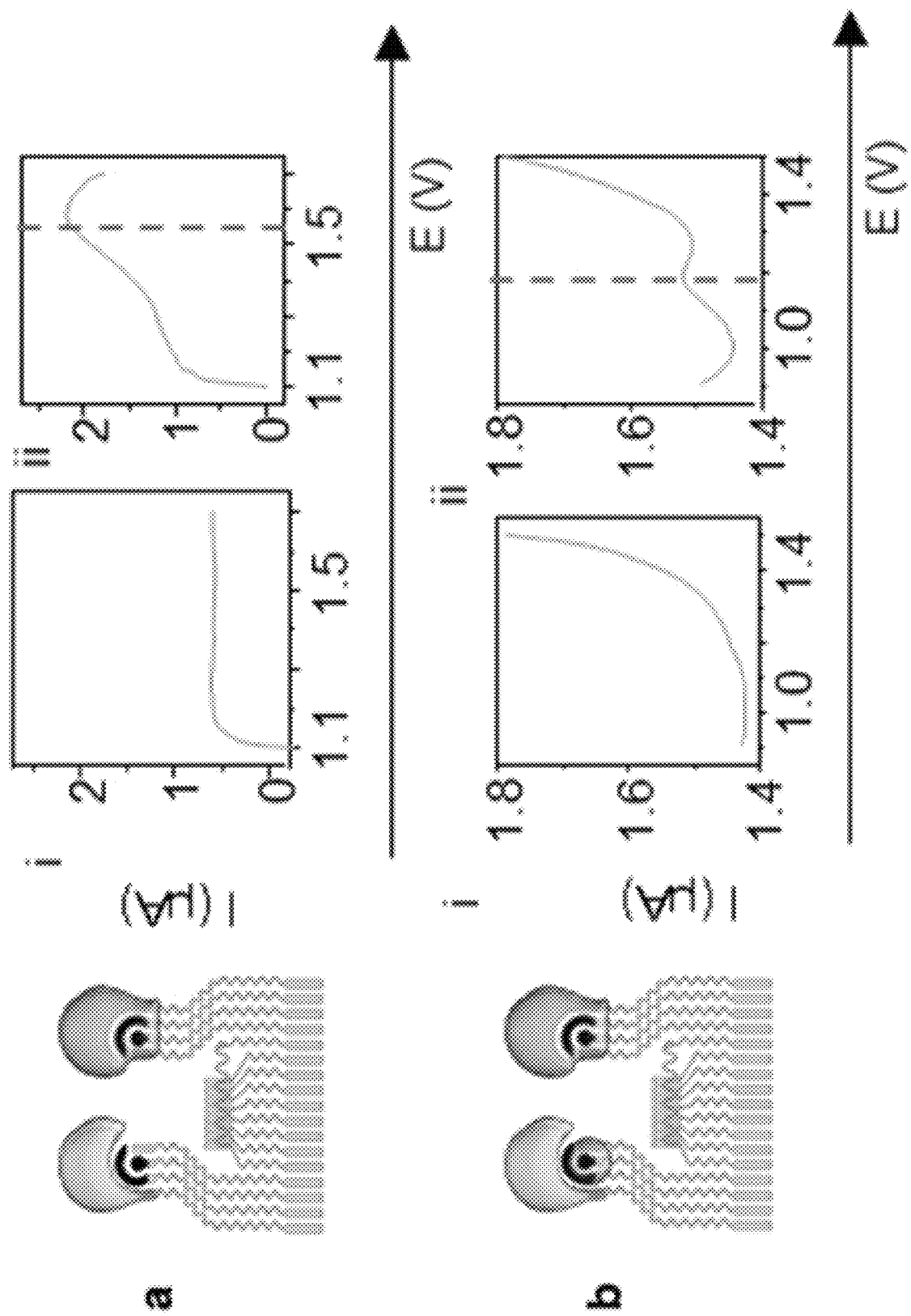
FIG. 35 shows diagrams and data plots illustrating example implementations of on-body caffeine detection and pH variation.

FIG. 35 shows diagrams and data plots illustrating on-body caffeine detection and pH variation. Panel (a) shows a diagram and data plots (i) and (ii) that show a gel configuration for caffeine detection in stimulated sweat without the use of acetate buffer over the caffeine sensor; the baseline before caffeine intake presents no peak (data plot(i)), while the caffeine peak is presented at 1.6V when the caffeine sensor is in direct contact with sweat (~pH 7) (data plot (ii)). Panel (b) shows a diagram and data plots (i) and (ii) that show the gel configuration using an acetate buffer pH 4.5 loaded agarose gel on the caffeine sensor (green gel); the baseline before caffeine intake presents no peak (data plot (i)), while a defined caffeine peak is presented at 1.2V when the caffeine sensor is in contact with the acetate buffer gel (data plot(ii)).

Figure 36:
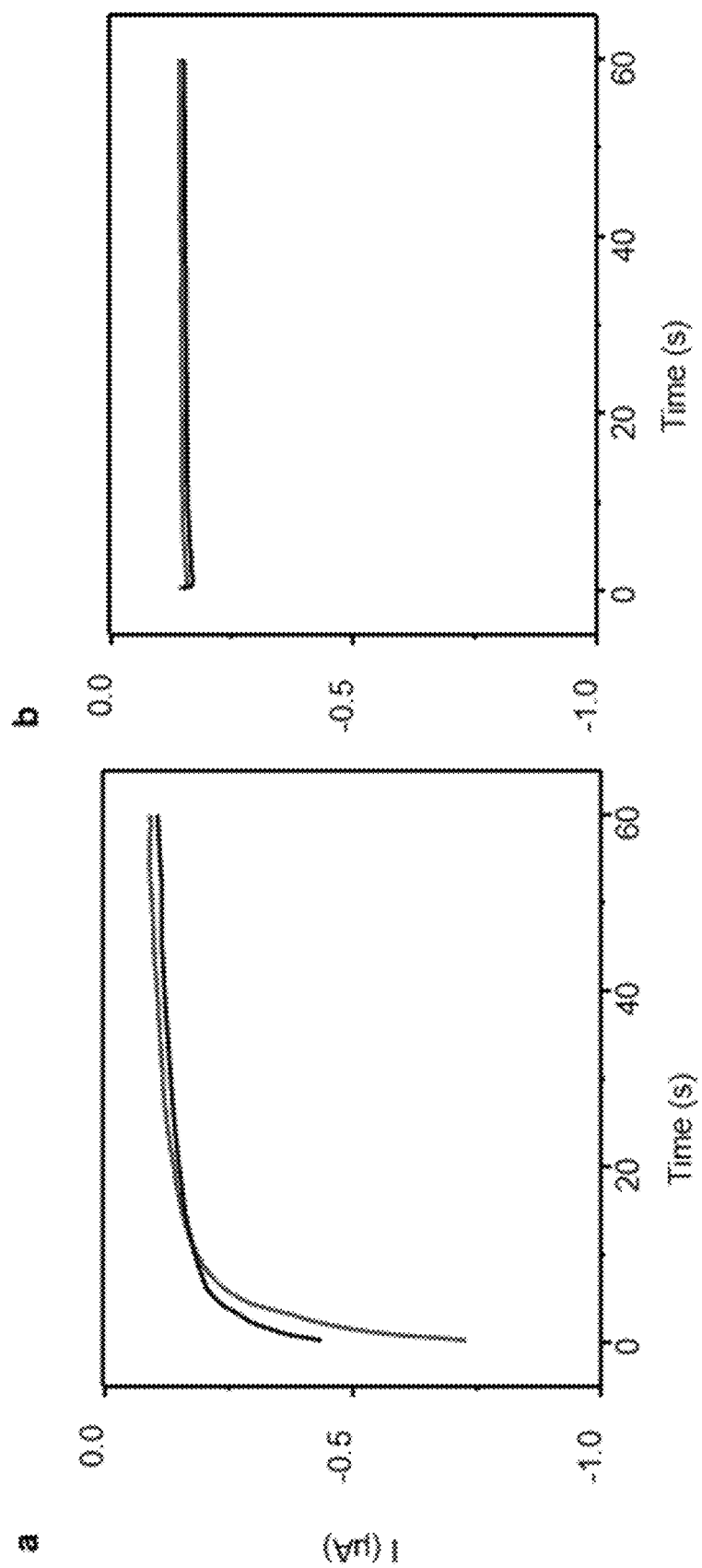
FIG. 36 shows data plots illustrating example control experiments of electrochemical sensing without a sensing recognition layer.

FIG. 36 shows data plots illustrating control experiments: electrochemical sensors without the sensing recognition layer. Plot (a) depicts the cathode sensor signal recorded after the first ISF extraction (red line) and after the second ISF extraction (black line). Plot (b) depicts the anode sensor signal recorded in the first sweat stimulation (red line) and during the second sweat stimulation (black line). The applied potential was −0.2 V.

Figure 37:
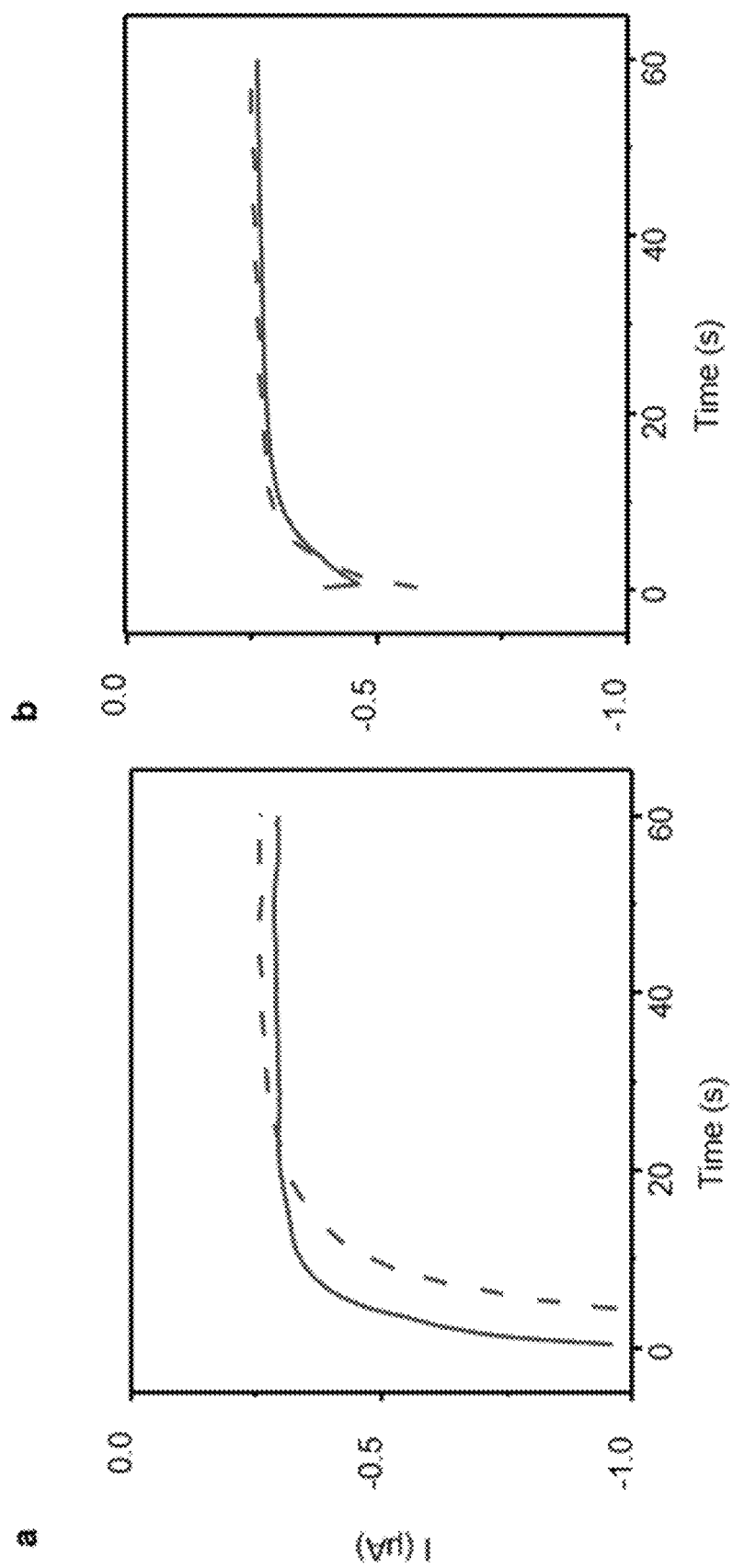
FIG. 37 shows data plots depicting example control experiments for characterizing response for lactate and glucose recordings without exercise and food ingestion.

FIG. 37 shows data plots depicting control experiments: response for lactate and glucose recording without exercise and food ingestion. Plot (a) depicts the lactate sensor response after the first sweat stimulation (green dash line) and second sweat stimulation (green solid line). Plot (b) depicts the glucose sensor response after the first ISF extraction (red dash line) and second ISF extraction (red solid line). The applied potential was −0.2 V.

Figure 38:
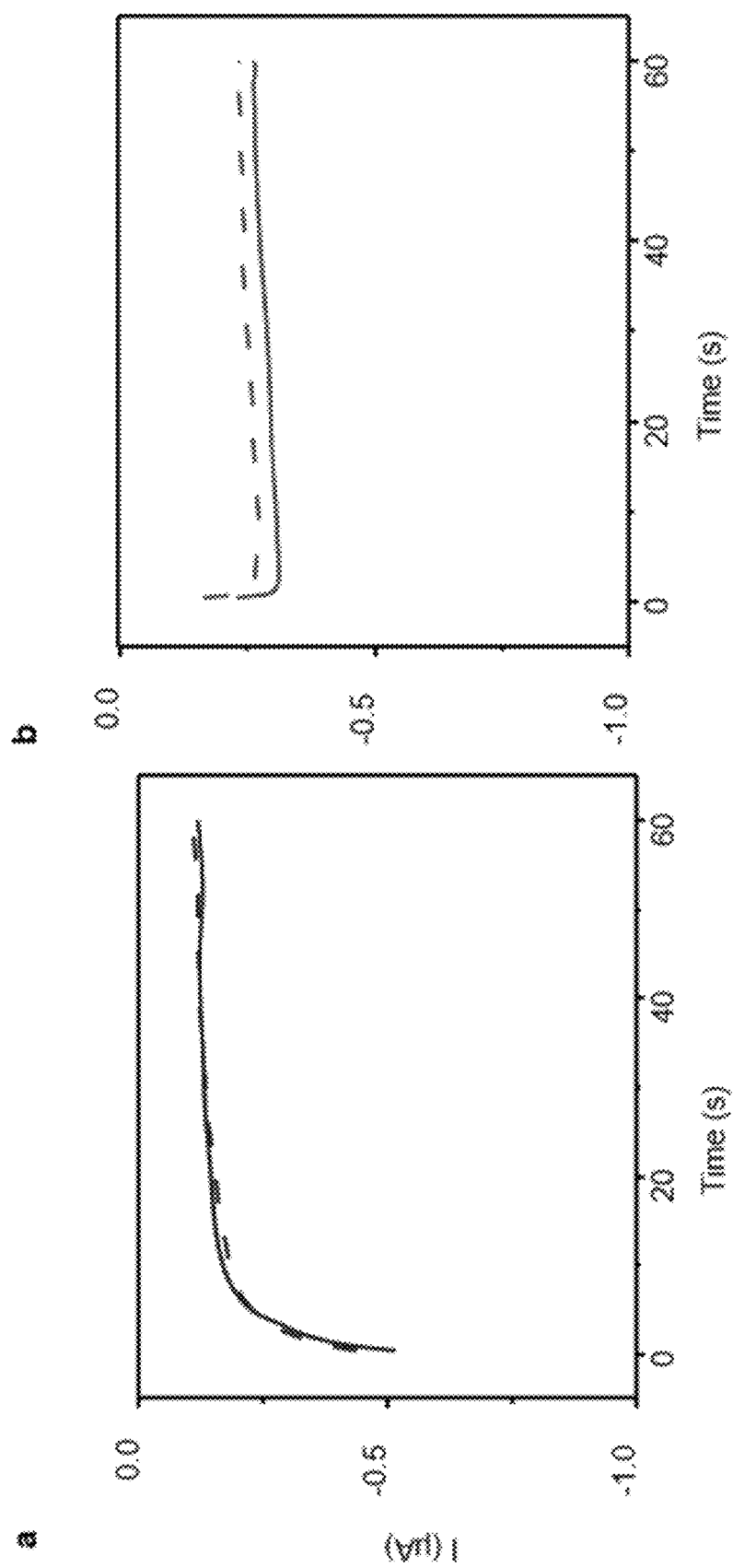
FIG. 38 shows data plots depicting example control experiments for characterizing response for alcohol and glucose recordings without alcohol and food ingestion.

FIG. 38 shows data plots depicting control experiments: response for alcohol and glucose recording without alcohol and food ingestion. Plot (a) depicts the alcohol the first sweat stimulation (blue dash line) and second sweat stimulation (blue solid line). Plot (b) depicts the response of the glucose sensor after the first ISF extraction (red dash line) and second ISF extraction (red solid line). The applied potential was −0.2 V.

FIG. 39A shows an image depicting the design of an epidermal sensor patch for the simultaneous monitoring of blood pressure along with sweat alcohol, caffeine and lactate, and ISF glucose chemical markers. The example epidermal sensor patch of FIG. 39A can be configured similar to the example embodiment of the wearable acoustic-chem sensor device 100J, shown in FIG. 1J. For example, the epidermal sensor patch can include a blood pressure sensor comprising an array of ultrasonic transducers, and a plurality of electrochemical sensors to non-invasively and electrochemically detect biomarker levels from biofluids, such as sweat and/or interstitial fluid (ISF). The example physiological sensor and electrochemical sensors of the epidermal sensor patch are in electrical connection with electrical contact sites via electrical interconnections. The example epidermal sensor patch is configured for simultaneous monitoring of four analytes: glucose ("G"), lactate ("L"), caffeine ("C"), and alcohol ("A") at four distinct working electrodes of the electrochemical sensors.

In some implementations, for example, the epidermal sensor patch of FIG. 39A can be used for detection and/or monitoring of sepsis in a patient user. Sepsis is a leading cause of acute hospital mortality, e.g., affecting more than 30 million people worldwide every year and causing approximately six million deaths. In the United States, sepsis is estimated to cost nearly $24 billion, which is the most expensive condition presently treated in the U.S. hospital environment. Sepsis can involve two components: unrecovered arterial hypotension (e.g., with mean arterial pressure (MAP) of less than 70 mmHg) and hyperlactatemia (e.g., with lactate level greater than 2 mmol/L). These two components can persist despite adequate fluid resuscitation. Yet, sepsis is potentially preventable and treatable if identified early with rapid treatment initiation. Studies have shown that early sepsis detection can impact overall survival, as survival decreases with every hour delay in initiation of effective antimicrobials.

Existing techniques and technologies for monitoring sepsis are limited and difficult to implement, let alone lacking a singular, integrated device that monitors multiple biomarkers of sepsis in a non-intrusive, non-invasive manner. For instance, sepsis monitoring can include common blood pressure monitoring using the peripheral cuff that straps around a user's arm and inflates for a singular measurement; since this technique is slow and uncomfortable to users, it is typically limited to one blood pressure measurement every five minutes. Also, for instance, to obtain measurements for analyte markers, such as lactate, sodium, glucose or other, current techniques involve the highly invasive blood draw and/or an arterial catheter.

FIG. 39B shows another diagram of the example epidermal sensor patch for continuous and simultaneous monitoring of sepsis by blood pressure sensing coupled with electrochemical sensing of three analytes: lactate in sweat, sodium in sweat, and glucose in ISF.

FIG. 39C shows a diagram illustrating the sensing mechanism, e.g., for monitoring of sepsis, using the example epidermal sensor patch of FIG. 39B. For example, the electrochemical sensor for monitoring of lactate from sweat can implement amperometry based on a LOx-modified working electrode (e.g., see FIG. 10, panel (a)) proximate a counter electrode and reference electrode; and iontophoretic electrode can be used to assist in stimulating the sweat from the skin. Also, for example, the electrochemical sensor for monitoring of sodium (or other electrolytes) from sweat can implement potentiometry using an example ISE working electrode and Ag/AgCl reference electrode. Further, for example, the electrochemical sensor for monitoring of glucose from ISF can implement an iontophoretic current to extract ISF from skin and amperometry for detection of glucose in the ISF based on a GOx-modified working electrode (e.g., see FIG. 10, panel (b)) proximate a counter electrode and reference electrode. Moreover, for example, the blood pressure sensor can include an array of ultrasound transducers that generate ultrasound signals transmitted toward a pulsating artery, where movement of the anterior wall (ant-wall) and posterior wall (post-wall) of the artery can cause return ultrasound signals (echoes), where peaks shifts are used to determine one or more parameters associated with blood pressure.

FIG. 39D shows data plots depicting example amperometric current data of lactate sensing obtained from an example implementation of sepsis monitoring of a subject using the example epidermal sensor patch of FIG. 39B.

FIG. 39E shows data plots depicting example ultrasound signal data obtained from an example implementation of sepsis monitoring of a subject using the example epidermal sensor patch of FIG. 39B.

FIG. 39F shows data plots depicting example amperometric current data of glucose sensing obtained from an example implementation of sepsis monitoring of a subject using the example epidermal sensor patch of FIG. 39B.

FIG. 39G shows data plots depicting example data of an on-body implementation of an example epidermal sensor patch, as in FIG. 39B, which monitored the subject's blood pressure and at least one analyte (e.g., lactate) before, during and after exercise.

FIG. 40 shows an image and an illustrative diagram depicting the design of an example embodiment of a stretchable integrated blood pressure-electrochemical sensing patch device for the simultaneous detection of sweat sodium and lactate, and blood pressure. Image (a) is a photo image of the sensor on the body. Diagram (b) is an illustration depicting the example sensor's acoustic and electrochemical sensing components. Lactate and sodium sensors are located at the cathodic compartment. A three-electrodes system is used for lactate detection (red circle) and a two-electrode system is used for sodium detection (blue square). The blood pressure sensor is located in the center on the patch (black square).

Figure 41:
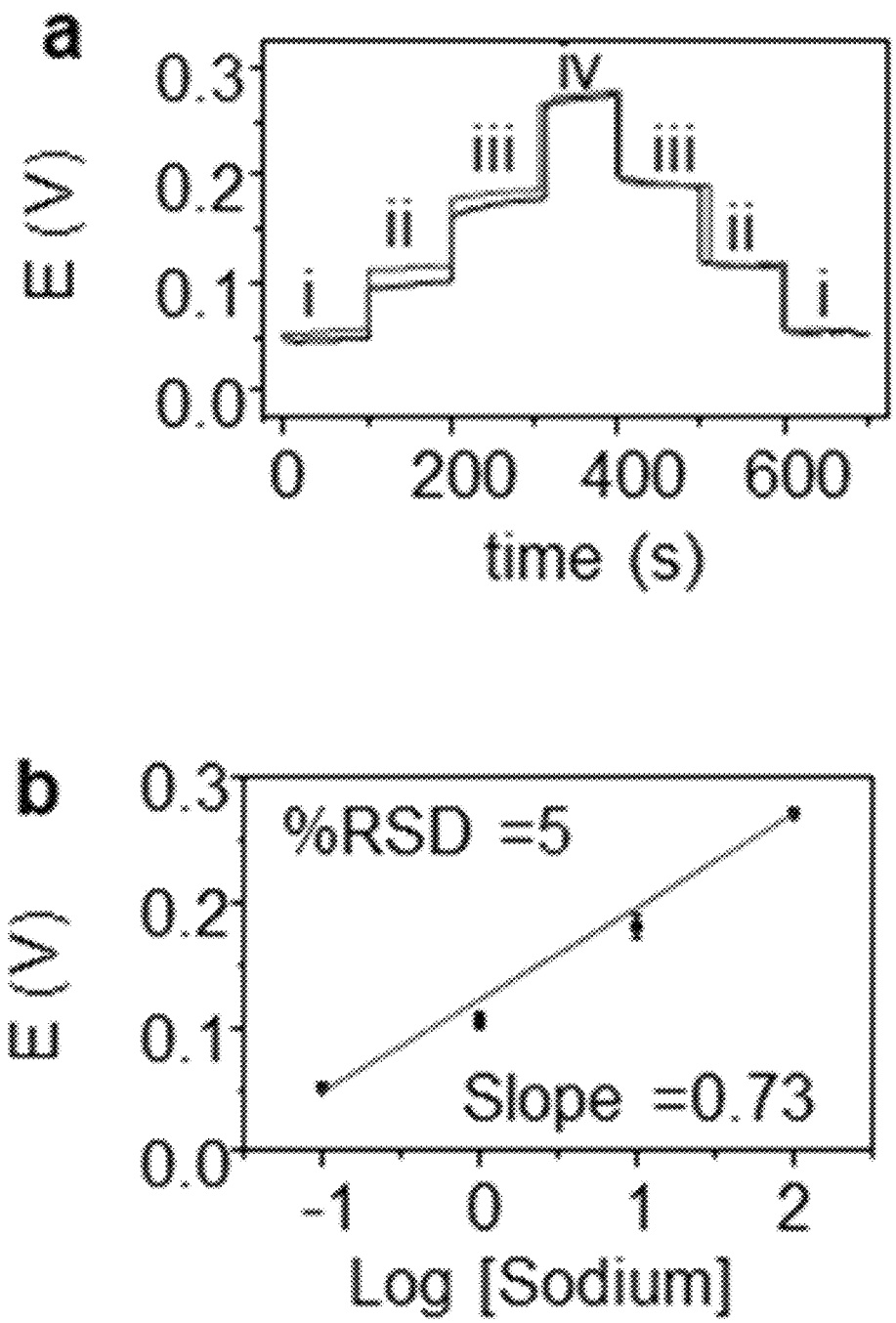
FIG. 41 shows data plots depicting an in vitro characterization of a sodium sensor in example implementations of a wearable integrated acoustic-electrochemical sensor device.

FIG. 41 shows data plots depicting in vitro characterization of a sodium sensor in example implementations. Plot (a) depicts the reversibility test for the sequential increasing and decreasing NaCl concentrations in a single sensor. The reversibility was realized for two sensors (red and black curves) using i, 0.1 mM, ii, 1 mM, iii, 10 mM and iv, 100 mM of NaCl. Plot (b) shows a calibration curve for the response of the sodium sensor to concentrations i-iv. (n=5, RSD=5%, Slope=0.73, r2=0.99).

Figure 42:
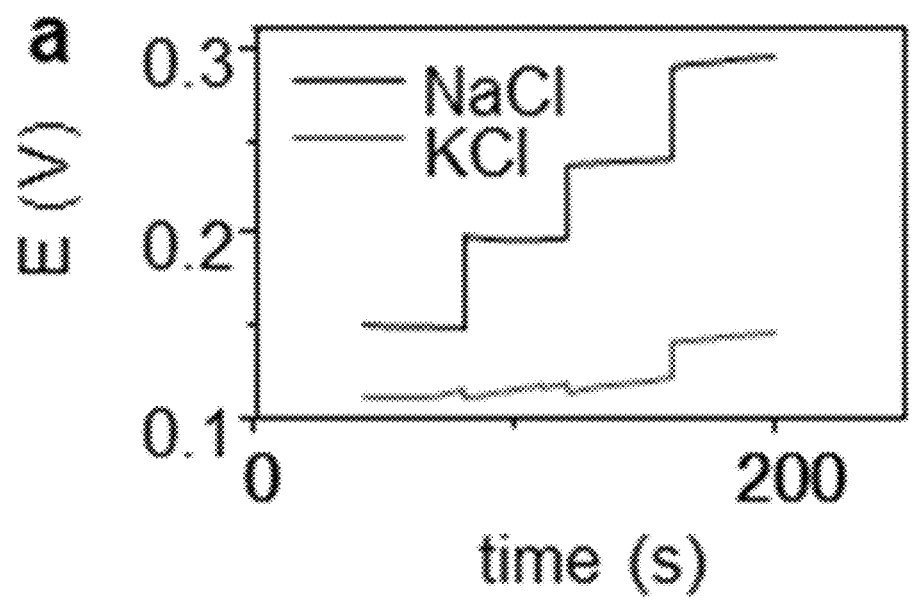
FIG. 42 shows data plots depicting an in vitro characterization of a sodium sensor in example implementations of a wearable integrated acoustic-electrochemical sensor device.
Figure 42:
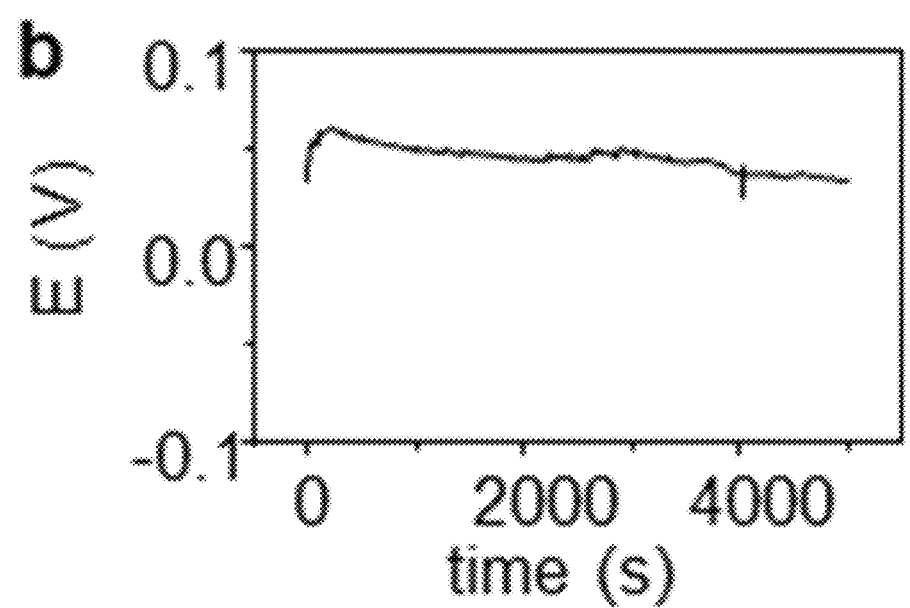

FIG. 42 shows data plots depicting another in vitro characterization of a sodium sensor in example implementations. Plot (a) depicts the interference test comparing the potentiometric sensor response to NaCl vs KCl, using increasing concentrations of 0.1, 1, 10, and 100 mM of NaCl (black curve) and KCL (red curve). Plot (b) depicts the stability of the sodium potentiometric response during a continuous 75 min monitoring of 0.1 mM NaCl.

Figure 43:
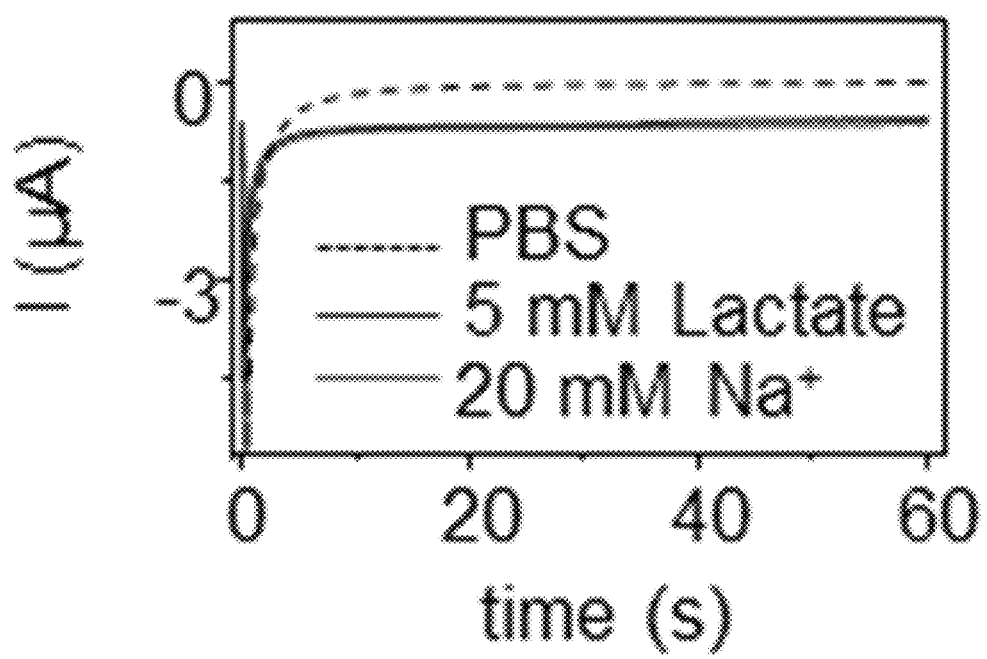
FIG. 43 shows a data plot depicting an in vitro characterization of a lactate sensor in the presence of sodium in example implementations of a wearable integrated acoustic-electrochemical sensor device.
Figure 44:
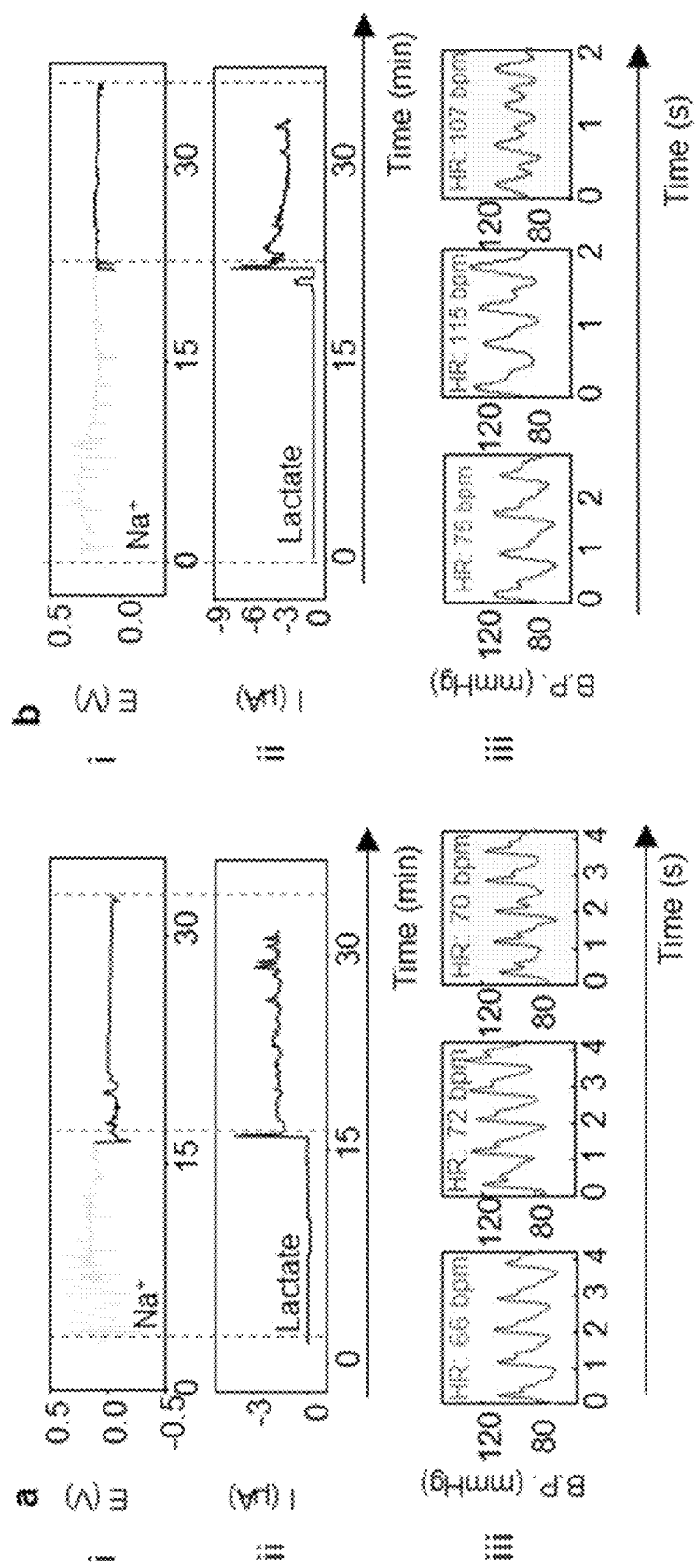
FIG. 44 shows data plots depicting an example implementation of continuous sodium/lactate//BP/HR performance.

FIG. 43 shows a data plot depicting an in vitro characterization of a lactate sensor in the presence of sodium in example implementations. Effect of sodium upon the amperometric response of the lactate sensor. A stable PBS baseline was acquired at −0.2V (dotted line) followed by the addition of 5 mM lactate (blue curve), and subsequent addition of 20 mM NaCl (red curve).

FIG. 44 shows data plots depicting continuous sodium/lactate/BP/HR performance. Data plots (a) depict continuous signal recording showing sweat sodium profile [data plot (i)] and lactate profile [data plot (ii)] during stationary biking for fit subject, and depict BP/HR signal recording before (green), during (red), and after (purple) stationary biking [data plot (iii)]. Data plots (b) depict continuous signal recording showing sweat sodium profile [data plot (i)] and lactate profile [data plot (ii)] during stationary biking for a sedentary subject, and depict BP/HR signal recording before (green), during (red), and after (purple) stationary biking [data plot (iii)].

Figure 45:
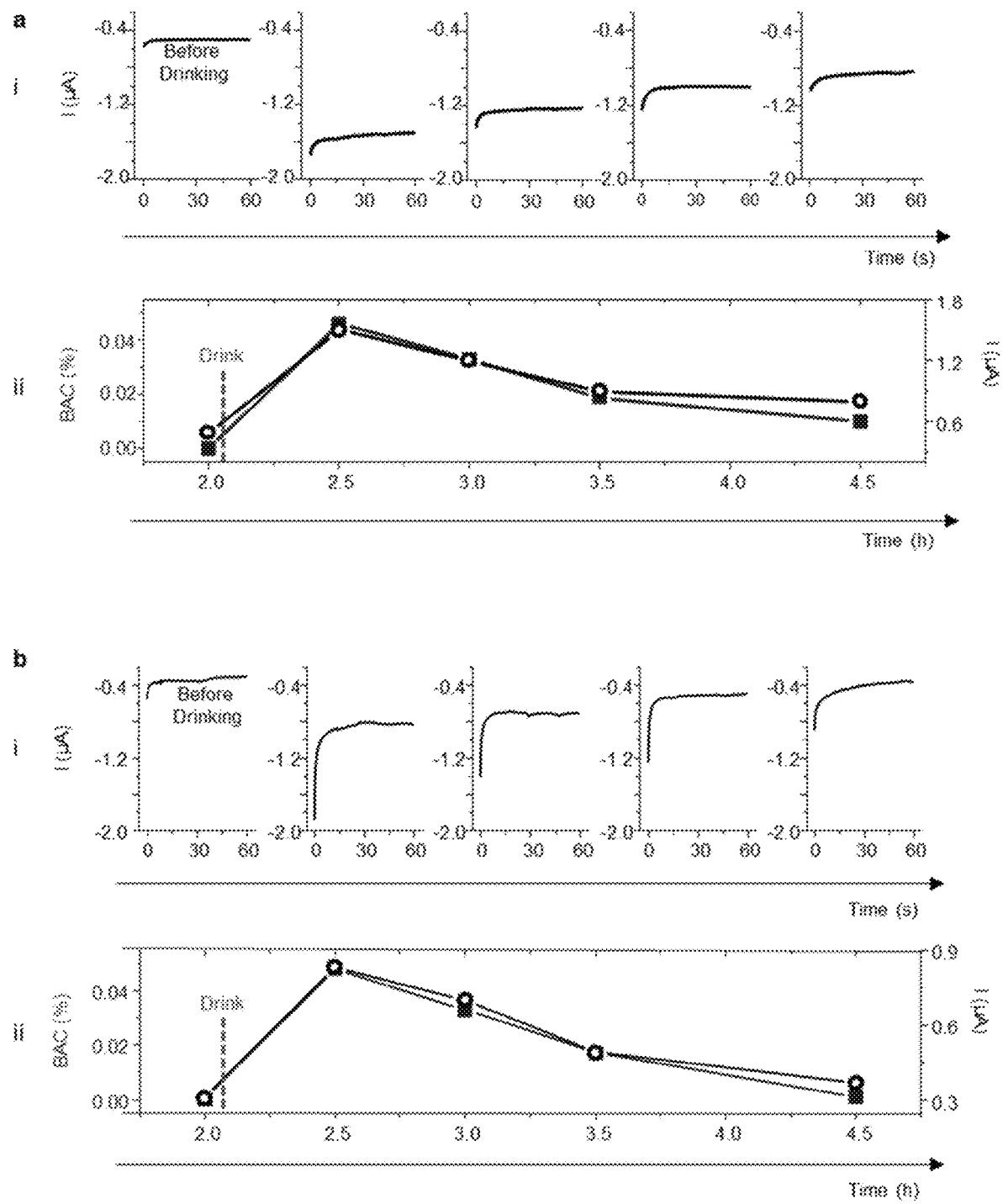
FIG. 45 shows data plots depicting an example implementation of continuous alcohol monitoring in stimulated sweat for two volunteers.

FIG. 45 shows data plots depicting continuous alcohol monitoring in stimulated sweat for two volunteers. Plots (a) and (b) depict continuous alcohol monitoring was performed by measuring alcohol levels in sweat every 10 minutes. Sweat was stimulated before drinking alcohol by performing 10 minutes IP, followed by 5 minutes waiting time for sweat generation. Chronoamperometry was performed and the fifth amperogram was taken (i). Therefore, the total time for the final signal was 30 minutes. After every sweat stimulation a breathalyzer was used to measure BAC. Sweat was stimulated every 10 minutes until ~zero BAC, and the correlation between sweat alcohol (black plot) and blood alcohol (blue plot) is shown in the bottom plot (ii).

Figure 46:
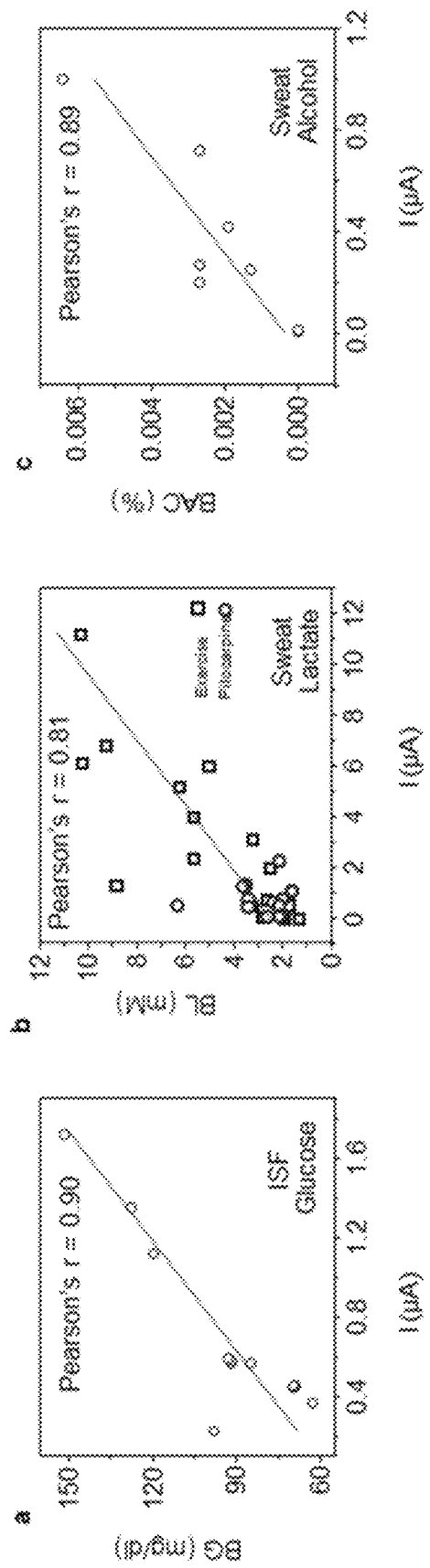
FIG. 46 shows data plots depicting correlation curves for sweat and ISF analytes in example implementations.

FIG. 46 shows data plots depicting correlation curves for sweat and ISF analytes. Plot (a) depicts the correlation curve for ISF glucose and blood glucose (n=13). Plot (b) depicts the correlation curve for sweat lactate and blood lactate=32 (n=18). Plot (c) depicts a correlation curve for sweat alcohol and blood alcohol (n=10).

EXAMPLES

In some embodiments in accordance with the present technology (example A1), a sensor device includes one or more ultrasound sensors for sensing a physiological characteristic; and one or more electrochemical sensors for sensing a chemical characteristic, wherein the ultrasound sensor and the electrochemical sensor share a substrate.

Example A2 includes the sensor device as in any of examples of A1-A14, wherein the one or more ultrasound sensors measure one or more of a blood pressure or a heart rate.

Example A3 includes the sensor device as in any of examples of A1-A14, further comprising a temperature sensor.

Example A4 includes the sensor device as in any of examples of A1-A14, further comprising an electrocardiogram (ECG) sensor.

Example A5 includes the sensor device as in any of examples of A1-A14, further comprising a pressure sensor.

Example A6 includes the sensor device as in any of examples of A1-A14, further comprising a mechanical strain sensor.

Example A7 includes the sensor device as in any of examples of A1-A14, further comprising one or more additional sensors including a temperature sensor; an electrocardiogram (ECG) sensor; a pressure sensor; and/or a mechanical strain sensor.

Example A8 includes the sensor device as in any of examples of A1-A14, wherein the one or more electrochemical sensors measure one or more of a sodium concentration; a potassium concentration; a glucose concentration; and/or a lactate concentration.

Example A9 includes the sensor device as in any of examples of A1-A14, wherein the ultrasound sensor includes a blood pressure sensor and the electrochemical sensor includes a lactate sensor, wherein the sensor monitors for septic shock.

Example A10 includes the sensor device as in any of examples of A1-A14, wherein the ultrasound sensor includes a blood pressure sensor.

Example A11 includes the sensor device as in any of examples of A1-A14, wherein the electrochemical sensor includes a lactate sensor.

Example A12 includes the sensor device as in any of examples of A1-A14, wherein the substrate includes one or more of: ECOFLEX®; polydimethylsiloxane (PDMS); and/or polyurethane.

Example A13 includes the sensor device as in any of examples of A1-A14, wherein the sensor device is structured to be a wearable or attachable to a user.

Example A14 includes the sensor device as in example A12 or any of examples of A1-A13, wherein the wearable sensor is worn on the epidermis.

In some embodiments in accordance with the present technology (example B1), a wearable, acoustic-electrochemical sensor device includes a flexible substrate comprising an electrically insulative material, the flexible substrate capable of attaching and conforming to skin; an electrochemical sensor comprising two or more electrodes disposed on the flexible substrate, the two or more electrodes including a first electrode to detect a signal associated with an analyte by an electrochemical detection, and a second electrode configured as a counter electrode or a reference electrode; a physiological sensor comprising an array of acoustic transducers disposed on the flexible substrate and a ground wire coupled to and spanning across each acoustic transducer of the array, the array of acoustic transducers including an acoustic transduction material, wherein the physiological sensor is configured to direct acoustic signals from the array of acoustic transducers toward a blood vessel in or beneath the skin to detect a hemodynamic parameter of the blood vessel; and an array of electrical interconnection structures disposed on the flexible substrate, wherein at least one of the electrical interconnection structures is configured as a ground electrical interconnection structure, and wherein the ground wire of the physiological sensor spans from the array of acoustic transducers to the ground electrical interconnection structure, wherein the sensor device is operable to simultaneously detect and monitor one or more analyte markers and physiological markers.

Example B2 includes the sensor device of any of examples B1-B20, wherein the array of acoustic transducers of the physiological sensor is spaced apart from the electrochemical sensor by a distance of at least 0.1 cm.

Example B3 includes the sensor device of any of examples B1-B20, wherein the physiological sensor is configured on a first side of the flexible substrate configured to attach to the skin, and the electrochemical sensor is configured on a second side of the flexible sensor opposite to the first side, such that the electrochemical sensor is able to be exposed to a biofluid deposited on the electrochemical sensor.

Example B4 includes the sensor device of any of examples B1-B20, wherein the physiological sensor includes a hydrogel material coupled to the array of acoustic transducers and configured to propagate an acoustic signal generated at the acoustic transducers to the skin and to propagate a returned acoustic echo received from the skin to the acoustic transducers.

Example B5 includes the sensor device of any of examples B1-B20, wherein the electrochemical sensor includes a functionalization layer disposed at least partially on the first electrode that includes one or more molecules to catalyze a chemical reaction or bind to the analyte for the electrochemical detection at the first electrode, and wherein the wearable, acoustic-electrochemical sensor device further comprises: a second electrochemical sensor comprising two or more electrodes disposed on the flexible substrate, the two or more electrodes of the second electrochemical sensor including a third electrode to detect a second signal associated with a second analyte by a second electrochemical detection, and a fourth electrode configured as a counter electrode or a reference electrode, wherein the second analyte is different than the analyte detectable at the first electrode.

Example B6 includes the sensor device of any of examples B1-B20, wherein the second electrode is configured as the reference electrode, and wherein the two or more electrodes of the electrochemical sensor include a third electrode configured as the counter electrode.

Example B7 includes the sensor device of example B6 or any of examples B1-B20, wherein the two or more electrodes of the electrochemical sensor include a fourth electrode configured as an iontophoresis (IP) electrode, the IP electrode operable to facilitate extraction of interstitial fluid of the skin or induce excretion of sweat from the skin.

Example B8 includes the sensor device of example B7 or any of examples B1-B20, wherein the electrochemical sensor includes a hydrogel coupled to the IP electrode, wherein the hydrogel entraps one or more chemicals able to cause extraction of the interstitial fluid or excretion of the sweat upon controlled release from the hydrogel by an electrical potential applied at the IP electrode.

Example B9 includes the sensor device of example B6 or any of examples B1-B20, wherein two or more electrodes are printed electrodes, wherein the first electrode and the counter electrode comprise a Prussian Blue, and wherein the reference electrode comprise a silver ink.

Example B10 includes the sensor device of any of examples B1-B20, wherein the electrical interconnection structures are configured as serpentine interconnection structures that allow for stretching and bending on the flexible substrate.

Example B11 includes the sensor device of any of examples B1-B20, wherein the acoustic transduction material includes at least one of piezoelectric lead zirconate titanate (PZT), lead magnesium niobate-lead titanate (PMN-PT), or polyvinylidene difluoride (PVDF).

Example B12 includes the sensor device of example B11 or any of examples B1-B20, wherein each transducer pixel includes an aspect ratio of 0.3 or smaller based on a height dimension to a width dimension, such that aspect ratio is able to control vibration of the acoustic transduction material to be in a thickness mode with a particular frequency or frequency range.

Example B13 includes the sensor device of example B12 or any of examples B1-B20, wherein the particular frequency is 7 MHz; or wherein the frequency range includes 5 MHz to 9 MHz.

Example B14 includes the sensor device of any of examples B1-B20, wherein the flexible substrate includes at least one of a styrene-ethylene-butylene-styrene block copolymer (SEBS), a styrene-isoprene-styrene block copolymer (SIS), or a styrene-butylene-styrene block copolymer (SBS).

Example B15 includes the sensor device of any of examples B1-B20, wherein the flexible substrate includes at least one of ECOFLEX®, polydimethylsiloxane (PDMS), thermoplastic polyurethane (TPU), polyurethane (PU), or polyethylene vinyl acetate (PEVA).

Example B16 includes the sensor device of any of examples B1-B20, wherein the flexible substrate is structured to include a first substrate layer and a second substrate layer that is attached to a side of the first substrate layer, wherein each of the first substrate layer and the second substrate layer comprises a first region and a second region, wherein the physiological sensor is coupled to the first region of the first substrate layer, and the electrochemical sensor is coupled to the second region of the second substrate layer, wherein the second substrate layer includes an opening at the first region such that physiological sensor is exposed through the opening of the second substrate layer.

Example B17 includes the sensor device of any of examples B1-B20, wherein the hemodynamic parameter includes blood pressure or blood flow.

Example B18 includes the sensor device of any of examples B1-B20, further comprising one or more additional sensors including a temperature sensor, an electrocardiogram (ECG) sensor, a pressure sensor, or a mechanical strain sensor.

Example B19 includes the sensor device of any of examples B1-B20, wherein the physiological sensor comprising the acoustic transducers is operable to detect blood pressure of a user of the wearable, acoustic-electrochemical sensor device, and wherein the electrochemical sensor is operable to detect lactate of the user, such that the sensor device is operable to monitor for septic shock.

Example B20 includes the sensor device of any of examples B1-B19, wherein the analyte includes lactate, cortisol, glucose, alcohol, caffeine, or an electrolyte.

In some embodiments in accordance with the present technology (example C1), a method for fabricating a wearable, acoustic-electrochemical sensor device includes providing a flexible substrate; producing a pattern of electrode structures on the flexible substrate; producing a pattern of electrical interconnection structures on the flexible substrate; producing a pattern of electrical contact site structures on the flexible substrate, wherein the electrical interconnection structures are each coupled between an electrode structure of the pattern of electrode structures and an electrical contact site structure of the pattern of electrical contact site structures; producing an electrically insulating layer over the flexible substrate covering the pattern of electrical interconnection structures and without covering at least a portion of each electrode structure and at least a portion of each electrical contact site structure; and producing an acoustic transducer on the flexible substrate by: flipping the flexible substrate backside up and producing a second pattern of electrical interconnection structures and a second pattern of electrical contact site structures on the backside of the flexible substrate, soldering (e.g., adhering, bonding) a pattern of transducer chip structures, by using a conductive ink solvent as an adhesive to bond a structure, at terminuses of the electrical interconnection structures, wherein at least one of the electrical interconnection structures of the second pattern does not include a soldered transducer chip structure so as to serve as a reserved ground interconnect, and soldering (e.g., adhering, bonding) an electrical ground structure, using a solvent, to a first side of the transducer chip structures that spans across the pattern of transducer chip structures to the reserved ground interconnect.

Example C2 includes the method of any of examples C1-C14, wherein the flexible substrate includes at least one of a styrene-ethylene-butylene-styrene block copolymer (SEBS), a styrene-isoprene-styrene block copolymer (SIS), a styrene-butylene-styrene block copolymer (SBS), polydimethylsiloxane (PDMS), thermoplastic polyurethane (TPU), polyurethane (PU), polyethylene vinyl acetate (PEVA), or ECOFLEX®.

Example C3 includes the method of any of examples C1-C14, wherein the producing the pattern of electrode structures includes printing the electrode structures using an electrically conductive ink material.

Example C4 includes the method of example C3 or any of examples C1-C14, wherein the printing the electrode structures includes using one or both of a silver ink and Prussian Blue ink to print the pattern of electrode structures over the flexible substrate.

Example C5 includes the method of any of examples C1-C14, wherein the electrode structures include at least one working electrode and one or more of (i) at least one of an iontophoresis (IP) electrode, (ii) at least one of a reference electrode, or (iii) at least one of a counter electrode.

Example C6 includes the method of example C5 or any of examples C1-C14, wherein the at least one of the IP electrode and/or the at least one of the reference electrode is printed using a silver ink.

Example C7 includes the method of example C5 or any of examples C1-C14, wherein the at least one working electrode and/or the at least one of the counter electrode is printed using a Prussian Blue ink.

Example C8 includes the method of any of examples C1-C14, wherein the producing the pattern of electrical interconnection structures includes printing serpentine interconnection structures using an electrically conductive ink, wherein the printed serpentine interconnection structures allow for stretching and bending of the pattern of electrical interconnection structures on the flexible substrate.

Example C9 includes the method of example C8 or any of examples C1-C14, wherein the serpentine interconnection structures are printed using a silver ink.

Example C10 includes the method of any of examples C1-C14, wherein the producing an electrically insulating layer includes printing a resin comprising a styrene-ethylene-butylene-styrene block copolymer (SEBS) material.

Example C11 includes the method of any of examples C1-C14, further comprising: chemically modifying an exposed surface of at least one electrode structure to configure an electrochemical sensor for sensing a target analyte.

Example C12 includes the method of any of examples C1-C14, wherein the producing the second pattern of electrical interconnection structures includes printing serpentine interconnection structures using an electrically conductive ink, wherein the printed serpentine interconnection structures allow for stretching and bending of the second pattern of electrical interconnection structures on the flexible substrate.

Example C13 includes the method of example C12 any of examples C1-C14, wherein the serpentine interconnection structures are printed using a silver ink.

Example C14 includes the method of any of examples C1-C13, wherein the soldering the transducer chips includes depositing an organic solvent by dripping droplets of the organic solvent on an interface between the terminuses of the electrical interconnection structures and the transducer chips.

In some embodiments in accordance with the present technology (example D11), a method for fabricating an acoustic transducer for a wearable acoustic sensor device includes: providing a flexible substrate; producing a pattern of electrical interconnection structures and a pattern of electrical contact site structures on the flexible substrate, wherein the electrical interconnection structures are coupled to the electrical contact site structures at one end; depositing an organic solvent at a terminus location of the electrical interconnection structures to partially dissolve the electrically conductive material of the electrical interconnection structures at the terminus location, wherein at least one of the electrical interconnection structures does not receive the deposited organic solvent, such that the at least one of the electrical interconnection structures that does not receive the deposited organic solvent is to serve as a ground interconnect; producing an array of acoustic transducer structures coupled to the pattern of electrical interconnection structures, where, for each acoustic transducer structure, placing an acoustic transducer structure at the terminus location to allow bonding of the acoustic transducer structure to a respective electrical interconnection structure; depositing an organic solvent at a portion of a surface of the acoustic transducer structures to partially dissolve an acoustic transduction material of the acoustic transducer structures; and attaching a wire across each of the acoustic transducer structures to connect to the ground interconnect.

Example D2 includes the method of any of examples D1-D6, wherein the acoustic transduction material includes at least one of piezoelectric lead zirconate titanate (PZT), lead magnesium niobate-lead titanate (PMN-PT), or polyvinylidene difluoride (PVDF).

Example D3 includes the method of any of examples D1-D6, wherein the producing an array of acoustic transducer structures includes depositing a bonding material for bonding with the acoustic transducer structure to be placed.

Example D4 includes the method of example D3 or any of examples D1-D6, wherein the bonding material includes an electrically conductive ink.

Example D5 includes the method of any of examples D1-D6, wherein the depositing the organic solvent includes dripping droplets of the organic solvent on the terminus location.

Example D6 includes the method of any of examples D1-D6, wherein the organic solvent includes one or more of toluene, xylene, benzene, cyclopentane, n-pentane, cyclohexane, cyclohexanone, ethylbenzene, acetone, methanol, ethanol, isopropanol, tetrahydrofuran, dimethyl sulfoxide, or the mixture thereof.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A wearable, acoustic-electrochemical sensor device, comprising:
   a flexible substrate comprising an electrically insulative material, the flexible substrate capable of attaching and conforming to skin;
   an electrochemical sensor comprising two or more electrodes disposed on the flexible substrate, the two or more electrodes including a first electrode to detect a signal associated with an analyte by an electrochemical detection, and a second electrode configured as a counter electrode or a reference electrode;
   a physiological sensor comprising an array of acoustic transducers disposed on the flexible substrate and a ground wire coupled to and spanning across each acoustic transducer of the array, the array of acoustic transducers including an acoustic transduction material, wherein the physiological sensor is configured to direct acoustic signals from the array of acoustic transducers toward a blood vessel in or beneath the skin to detect a hemodynamic parameter of the blood vessel; and
   an array of electrical interconnection structures disposed on the flexible substrate, wherein at least one of the electrical interconnection structures is configured as a ground electrical interconnection structure having a serpentine pattern, and wherein the ground wire of the physiological sensor includes the serpentine pattern and spans from the array of acoustic transducers to the ground electrical interconnection structure,
   wherein the sensor device is operable to simultaneously detect and monitor one or more analyte markers and physiological markers.

2. The sensor device of claim 1, wherein the array of acoustic transducers of the physiological sensor is spaced apart from the electrochemical sensor by a distance of at least 0.1 cm.

3. The sensor device of claim 1, wherein the physiological sensor is configured on a first side of the flexible substrate configured to attach to the skin, and the electrochemical sensor is configured on a second side of the flexible sensor opposite to the first side, such that the electrochemical sensor is able to be exposed to a biofluid deposited on the electrochemical sensor.

4. The sensor device of claim 1, wherein the physiological sensor includes a hydrogel material coupled to the array of acoustic transducers and configured to propagate an acoustic signal generated at the acoustic transducers to the skin and to propagate a returned acoustic echo received from the skin to the acoustic transducers.

5. The sensor device of claim 1, wherein the electrochemical sensor includes a functionalization layer disposed at least partially on the first electrode that includes one or more molecules to catalyze a chemical reaction or bind to the analyte for the electrochemical detection at the first electrode, and wherein the wearable, acoustic-electrochemical sensor device further comprises:
   a second electrochemical sensor comprising two or more electrodes disposed on the flexible substrate, the two or more electrodes of the second electrochemical sensor including a third electrode to detect a second signal associated with a second analyte by a second electrochemical detection, and a fourth electrode configured as a counter electrode or a reference electrode, wherein the second analyte is different than the analyte detectable at the first electrode.

6. The sensor device of claim 1, wherein the second electrode is configured as the reference electrode, and wherein the two or more electrodes of the electrochemical sensor include a third electrode configured as the counter electrode.

7. The sensor device of claim 6, wherein the two or more electrodes of the electrochemical sensor include a fourth electrode configured as an iontophoresis (IP) electrode, the IP electrode operable to facilitate extraction of interstitial fluid of the skin or induce excretion of sweat from the skin.

8. The sensor device of claim 7, wherein the electrochemical sensor includes a hydrogel coupled to the IP electrode, wherein the hydrogel entraps one or more chemicals able to cause extraction of the interstitial fluid or excretion of the sweat upon controlled release from the hydrogel by an electrical potential applied at the IP electrode.

9. The sensor device of claim 6, wherein two or more electrodes are printed electrodes, wherein the first electrode and the counter electrode comprise a Prussian Blue, and wherein the reference electrode comprise a silver ink.

10. The sensor device of claim 1, wherein each of the electrical interconnection structures is configured as serpentine interconnection structures that allow for stretching and bending on the flexible substrate.

11. The sensor device of claim 1, wherein the acoustic transduction material includes at least one of piezoelectric lead zirconate titanate (PZT), lead magnesium niobate-lead titanate (PMN-PT), or polyvinylidene difluoride (PVDF).

12. The sensor device of claim 1, wherein the array of acoustic transducers is configured as an array of transducer pixels comprising piezoelectric lead zirconate titanate (PZT), and wherein each transducer pixel includes an aspect ratio of 0.3 or smaller based on a height dimension to a width dimension, such that aspect ratio is able to control vibration of the acoustic transduction material to be in a thickness mode with a particular frequency or frequency range.

13. The sensor device of claim 12, wherein the particular frequency is 7 MHz; or wherein the frequency range includes 5 MHz to 9 MHz.

14. The sensor device of claim 1, wherein the flexible substrate includes at least one of a styrene-ethylene-butylene-styrene block copolymer (SEBS), a styrene-isoprene-styrene block copolymer (SIS), or a styrene-butylene-styrene block copolymer (SBS).

15. The sensor device of claim 1, wherein the flexible substrate includes at least one of ECOFLEX®, polydimethylsiloxane (PDMS), thermoplastic polyurethane (TPU), polyurethane (PU), or polyethylene vinyl acetate (PEVA).

16. The sensor device of claim 1, wherein the flexible substrate is structured to include a first substrate layer and a second substrate layer that is attached to a side of the first substrate layer, wherein each of the first substrate layer and the second substrate layer comprises a first region and a second region, wherein the physiological sensor is coupled to the first region of the first substrate layer, and the electrochemical sensor is coupled to the second region of the second substrate layer, wherein the second substrate layer includes an opening at the first region such that physiological sensor is exposed through the opening of the second substrate layer.

17. The sensor device of claim 1, wherein the hemodynamic parameter includes blood pressure or blood flow.

18. The sensor device of claim 1, further comprising one or more additional sensors including a temperature sensor, an electrocardiogram (ECG) sensor, a pressure sensor, or a mechanical strain sensor.

19. The sensor device of claim 1, wherein the physiological sensor comprising the acoustic transducers is operable to detect blood pressure of a user of the wearable, acoustic-electrochemical sensor device, and wherein the electrochemical sensor is operable to detect lactate of the user, such that the sensor device is operable to monitor for septic shock.

20. The sensor device of claim 1, wherein the analyte includes lactate, cortisol, glucose, alcohol, caffeine, or an electrolyte.

* * * * *